United States Patent
Shimizu et al.

(10) Patent No.: US 10,721,127 B2
(45) Date of Patent: Jul. 21, 2020

(54) COMMUNICATION SYSTEM AND COMMUNICATION METHOD

(71) Applicant: FUJITSU LIMITED, Kawasaki-shi, Kanagawa (JP)

(72) Inventors: Toshihiro Shimizu, Kawasaki (JP); Kohta Nakashima, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 201 days.

(21) Appl. No.: 16/040,843

(22) Filed: Jul. 20, 2018

(65) Prior Publication Data
US 2019/0044807 A1 Feb. 7, 2019

(30) Foreign Application Priority Data
Aug. 2, 2017 (JP) .................. 2017-149628

(51) Int. Cl.
*H04L 12/24* (2006.01)
*H04L 12/44* (2006.01)
(Continued)

(52) U.S. Cl.
CPC .......... *H04L 41/0826* (2013.01); *H04L 12/44* (2013.01); *H04L 12/462* (2013.01);
(Continued)

(58) Field of Classification Search
CPC ............. H04L 41/0826; H04L 49/1515; H04L 12/462; H04L 41/12; H04L 49/1523; H04L 49/358; H04L 12/44
See application file for complete search history.

(56) References Cited

U.S. PATENT DOCUMENTS

| 2013/0022047 A1* | 1/2013 | Nakashima | H04L 49/65 370/392 |
| 2015/0092599 A1* | 4/2015 | Nakashima | H04L 41/12 370/254 |

(Continued)

FOREIGN PATENT DOCUMENTS

| JP | 2000-20501 | 1/2000 |
| JP | 2010-211553 | 9/2010 |

OTHER PUBLICATIONS

Toshihiro Shimizu et al, "Acceleration of All-to-all Communication in Latin Square Fat-Tree, Low Cost Scalable Network Topology", IPSJ Transactions on Advanced Computing Systems, vol. 9, No. 4, pp. 38-50, Nov. 2016 with English Abstract (13 pages).

(Continued)

*Primary Examiner* — Chris Parry
*Assistant Examiner* — Adam A Cooney
(74) *Attorney, Agent, or Firm* — Fujutsu Patent Center

(57) ABSTRACT

A communication system includes a plurality of leaf switches connected to a plurality of spine switches in topology of a Latin square Fat-Tree, and a plurality of information processing apparatus, wherein each of the information processing apparatuses performs first all reducing, wherein each of first information processing apparatuses performs second all reducing, on the basis of the result of the first all reducing, between the first information processing apparatus and another first information processing apparatus connected to a leaf switch connected to a first spine switch corresponding to a first direction in an area, wherein each of the first information processing apparatuses performs third all reducing, on the basis of the result of the second all reducing, between the first information processing apparatus and another first information processing apparatus connected to a leaf switch connected to a second spine switch corresponding to a second direction in the area.

15 Claims, 67 Drawing Sheets

(51) Int. Cl.
*H04L 12/931* (2013.01)
*H04L 12/933* (2013.01)
*H04L 12/46* (2006.01)

(52) U.S. Cl.
CPC .......... *H04L 41/12* (2013.01); *H04L 49/1515* (2013.01); *H04L 49/1523* (2013.01); *H04L 49/358* (2013.01)

(56) References Cited

U.S. PATENT DOCUMENTS

| | | | |
|---|---|---|---|
| 2015/0256451 A1* | 9/2015 | Nakashima | H04L 45/48 370/389 |
| 2015/0334035 A1* | 11/2015 | Miwa | H04L 12/6418 370/390 |
| 2016/0014049 A1* | 1/2016 | Zahid | H04L 47/125 709/226 |
| 2016/0301565 A1* | 10/2016 | Zahid | H04L 45/02 |
| 2017/0187614 A1* | 6/2017 | Haramaty | H04L 45/48 |
| 2017/0212778 A1* | 7/2017 | Johnsen | G06F 9/45558 |
| 2018/0375683 A1* | 12/2018 | Shimizu | H04L 41/12 |

OTHER PUBLICATIONS

M. Valerio et al., "Recursively Scalable Fat-Trees as Interconnection Networks", IEEE 13th Annual International Phoenix Conference on Computers and Communications, pp. 40-46, 1994 (7 pages).

* cited by examiner

FIG. 19

| PHASE NUMBER | COMMUNICATION 1 | COMMUNICATION 2 |
|---|---|---|
| 1 | (N4,N5) | |
| 2 | (N1,N2) | (N3,N4) |
| 2 | (N1,N3) | (N2,N4) |
| 2 | N4->N5 | |

FIG. 22
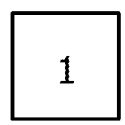 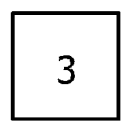 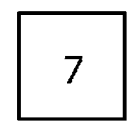
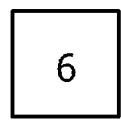 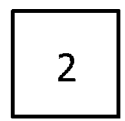 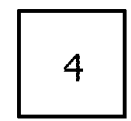
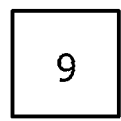 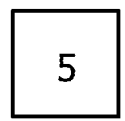 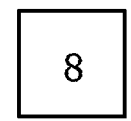

FIG. 26
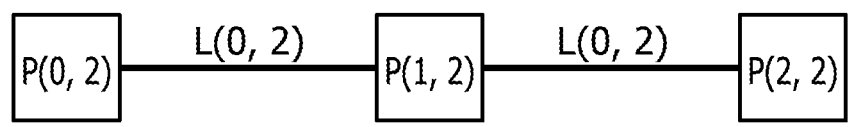
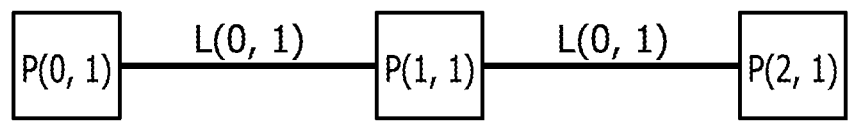
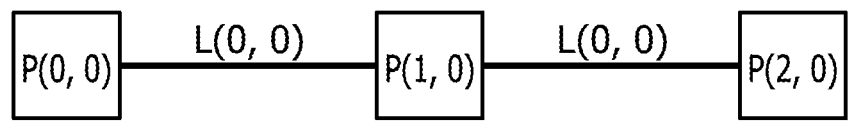

FIG. 34

FIG. 35
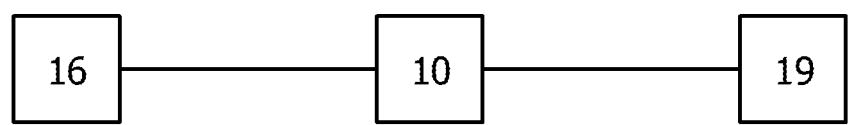
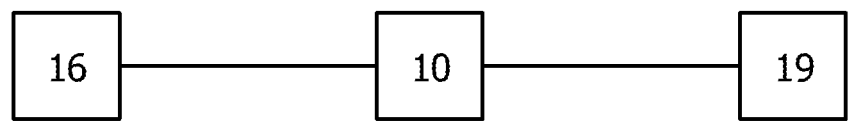
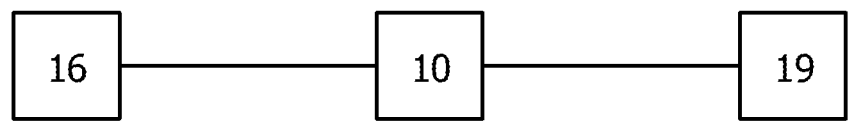
——— COMMUNICATION BY REPRESENTATIVE SERVER FIG. 36
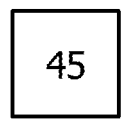
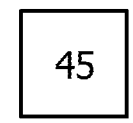
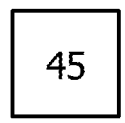
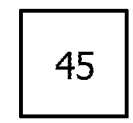
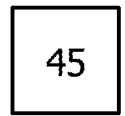
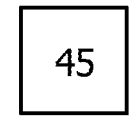

FIG. 56

| PHASE GROUP | SERVER NUMBER | | | |
|---|---|---|---|---|
| | 0 | 1 | 2 | 3 |
| 0 | ∞ | 0 | 1 | 2 |
| 1 | 0 | 1 | 2 | ∞ |

FIG. 57

| PHASE GROUP | SERVER NUMBER | | | | | |
|---|---|---|---|---|---|---|
| | 0 | 1 | 2 | 3 | 4 | 5 |
| 0 | ∞ | 0 | 1 | 2 | 3 | 4 |
| 1 | 0 | 1 | 2 | 3 | 4 | ∞ |

— COMMUNICATION BY SERVER "0"
------- COMMUNICATION BY SERVER "1"
—·—·— COMMUNICATION BY SERVER "2"
—··—··— COMMUNICATION BY SERVER "3"

FIG. 60

| PHASE GROUP | PHASE NUMBER | SERVER NUMBER | | | |
|---|---|---|---|---|---|
| | | 0 | 1 | 2 | 3 |
| 0 | 1 | N000 → N010<br>N100 → N110<br>N200 → N210 | N001 → N101<br>N011 → N111<br>N021 → N121 | N002 → N112<br>N012 → N122<br>N022 → N102 | N003 → N213<br>N103 → N013<br>N023 → N113 |
| 0 | 2 | (N010, N020)<br>(N110, N120)<br>(N210, N220) | (N101, N201)<br>(N111, N211)<br>(N121, N221) | (N112, N222)<br>(N122, N202)<br>(N102, N212) | (N213, N123)<br>(N013, N223)<br>(N113, N203) |
| 0 | 3 | N010 → N000<br>N110 → N100<br>N210 → N200 | N101 → N001<br>N111 → N011<br>N121 → N021 | N112 → N002<br>N122 → N012<br>N102 → N022 | N213 → N003<br>N013 → N103<br>N113 → N023 |
| 1 | 4 | N000 → N100<br>N010 → N110<br>N020 → N120 | N001 → N111<br>N011 → N121<br>N021 → N101 | N002 → N212<br>N012 → N012<br>N022 → N112 | N003 → N013<br>N103 → N113<br>N203 → N213 |
| 1 | 5 | (N100, N200)<br>(N110, N210)<br>(N120, N220) | (N111, N221)<br>(N121, N201)<br>(N101, N211) | (N212, N122)<br>(N012, N222)<br>(N112, N202) | (N013, N023)<br>(N113, N123)<br>(N213, N223) |
| 1 | 6 | N100 → N000<br>N110 → N010<br>N120 → N020 | N111 → N001<br>N121 → N011<br>N101 → N021 | N212 → N002<br>N012 → N102<br>N112 → N022 | N013 → N003<br>N113 → N103<br>N213 → N203 |

▨ : Leaf SWITCH

☐ : Spine SWITCH

◯ : SERVER

COMMUNICATION SYSTEM AND COMMUNICATION METHOD

CROSS-REFERENCE TO RELATED APPLICATION

This application is based upon and claims the benefit of priority of the prior Japanese Patent Application No. 2017-149628, filed on Aug. 2, 2017, the entire contents of which are incorporated herein by reference.

FIELD

The embodiments discussed herein are related to a communication system.

BACKGROUND

If communication within a parallel computer is made efficient by optimization of a type of connection between a server and a switch in the parallel computer, throughput of parallel distribution processing that is performed by the parallel computer can be increased. Furthermore, if a great number of servers are connected with a small number of switches by optimization of network topology in the parallel computer, the cost of setting up the parallel computer can be brought down.

There is a network topology technology called a Latin square Fat-Tree. The Latin square Fat-Tree has the feature that only one channel that goes through a spine channel between any two leaf switches is present. There is possible that if the Latin square Fat-Tree is used, many more servers are connected with the same number of antenna when compared with a general two-step Fat-Tree.

For example, a related technology is disclosed in M. Valerio, L. E. Moser and P. M. Melliar-Smith, "Recursively Scalable Fat-Trees as Interconnection Networks", IEEE 13th Annual International Phoenix Conference on Computers and Communications, 1994.

SUMMARY

According to an aspect of the invention, a communication system includes a plurality of leaf switches connected to a plurality of spine switches in topology of a Latin square Fat-Tree, and a plurality of information processing apparatus, wherein each of the information processing apparatuses performs first all reducing, wherein each of first information processing apparatuses performs second all reducing, on the basis of the result of the first all reducing, between the first information processing apparatus and another first information processing apparatus connected to a leaf switch connected to a first spine switch corresponding to a first direction in an area, wherein each of the first information processing apparatuses performs third all reducing, on the basis of the result of the second all reducing, between the first information processing apparatus and another first information processing apparatus connected to a leaf switch connected to a second spine switch corresponding to a second direction in the area.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 19 is a diagram illustrating an example of a first communication table;

FIG. 22 is a diagram illustrating a value that a representative server connected to each operating switch has;

FIG. 26 is a diagram for describing the slope;

FIG. 34 is a diagram for describing communication that is performed using a third communication table;

FIG. 35 is a diagram for describing the communication that is performed using the third communication table;

FIG. 36 is a diagram for describing the communication that is performed using the third communication table;

FIG. 56 is a diagram illustrating an example of the slope table;

FIG. 57 is a diagram illustrating an example of the slope table;

FIG. 60 is a diagram illustrating an example of a sixth communication table;

DESCRIPTION OF EMBODIMENTS

First Embodiment

In the related art, in a parallel computer, a group communication called all-reducing communication is frequently performed. The all-reducing communication is communication in which all target nodes have a result of an arithmetic operation that is performed using pieces of data which the all target nodes have, and all reducing is such an arithmetic operation.

Figure 1:
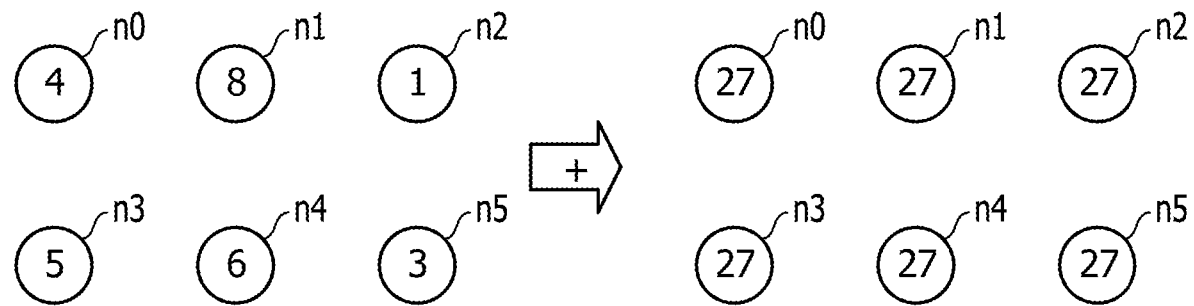
FIG. 1 is a diagram for describing all-reducing communication.

FIGS. 1 to 4 are diagrams for describing the all-reducing communication. In FIG. 1, a server n0, a server n1, a server n2, a server n3, a server n4, and a server n5 have values of "4," "8," "1," "5," "6," and "3," respectively. In a case where an arithmetic operation that is designated in the all reducing, each of the servers n0 to n5 has a value of "27."

Figure 2A:
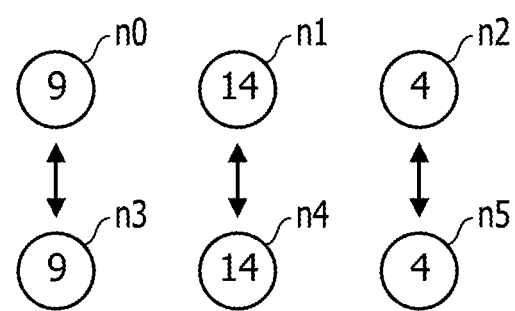
FIGS. 2A and 2B are diagrams for describing the all-reducing communication.

The all-reducing communication for realizing a state that is illustrated on the right side of FIG. 1, for example, is performed as illustrated in FIGS. 2A to 3B. First, as illustrated in FIG. 2A, a value is shared between the server n0 and the server n3, and thus a value of "9" is calculated with addition. Furthermore, a value is shared between the server n and the server n4, and thus a value of "14" is calculated with addition. Furthermore, a value is shared between the server n2 and the server n5, and thus the value of "4" is calculated with addition.

Figure 2B:
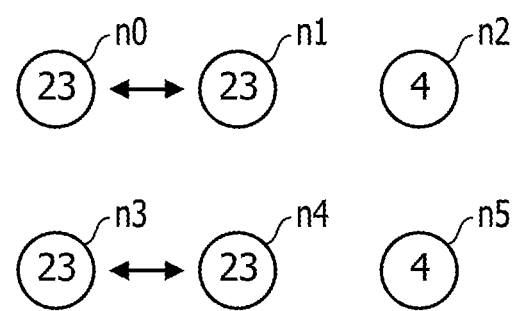

Then, as illustrated in FIG. 2B, a value is shared between the server n0 and the server n1, and thus a value of "23" is calculated with addition. Furthermore, a value is shared between the server n3 and the server n4, and thus the value of "23" is calculated with addition.

Figure 3A:
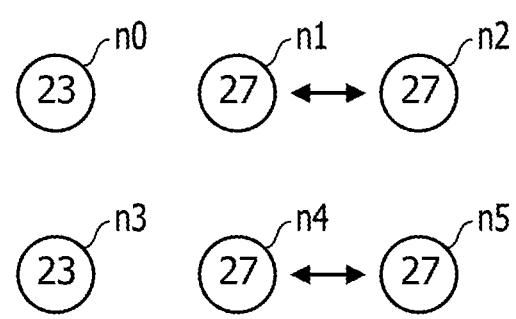
FIGS. 3A and 3B are diagrams for describing the all-reducing communication.

Then, as illustrated in FIG. 3A, a value is shared between the server n1 and the server n2, and thus a value of "27" is calculated with addition. Furthermore, a value is shared between the server n4 and the server n5, and thus the value of "27" is calculated with addition.

Figure 3B:
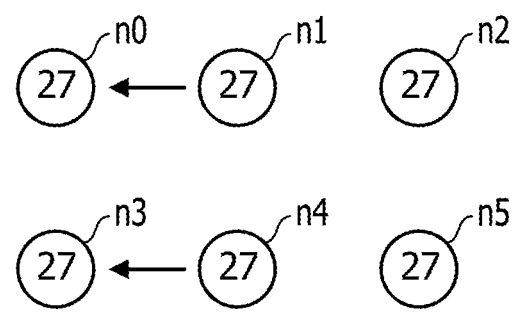

Last, as illustrated in FIG. 3B, the server n1 transmits the value of "27" to the server n0, and the server n4 transmits the value of "27" to the server n3. Accordingly, as illustrated in FIG. 3B, the servers n0 to n5 can have the value of "27."

Figure 4A:
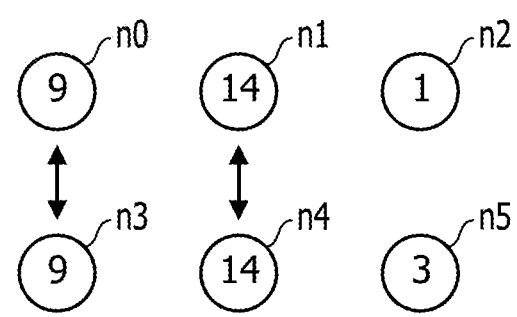
FIGS. 4A and 4B are diagrams for describing the all-reducing communication.

At this point, all the servers n0 to n5 may not be set to be targets, and one or several of the server n0 to n5 may be set to be targets. As an example, all-reducing communication in a case where the servers n0, n1, n3, and n4 are set to be targets will be described. First, as illustrated in FIG. 4A, a value is shared between the server n0 and the server n3, and thus a value of "9" is calculated with addition. Furthermore, a value is shared between the server n1 and the server n4, and thus the value of "14" is calculated with addition.

Figure 4B:
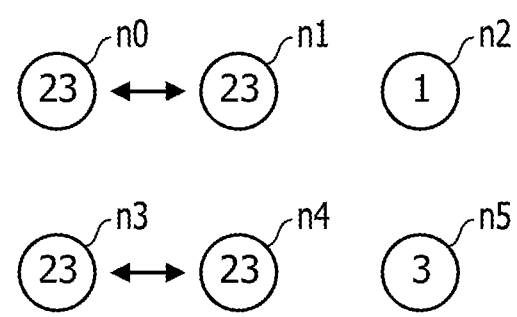

Then, as illustrated in FIG. 4B, a value is shared between the server n0 and the server n1, and thus the value of "23" is calculated with addition. Furthermore, a value is shared between the server n3 and the server n4, and thus the value of "23" is calculated with addition. Accordingly, the servers n0, n1, n3, and n4 can have the value of "23".

Figure 5:
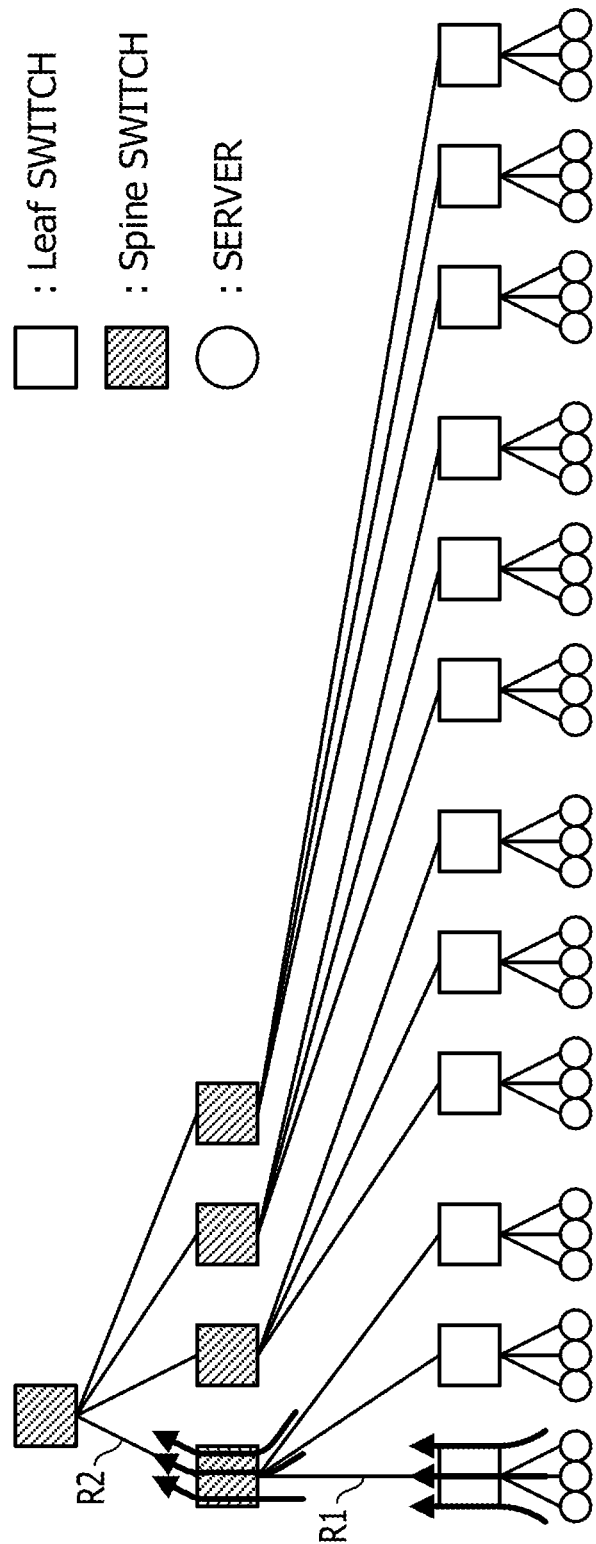
FIG. 5 is a diagram illustrating channel contention in a case where the all-reducing communication is performed in a topology that has a general tree structure.
Figure 6:
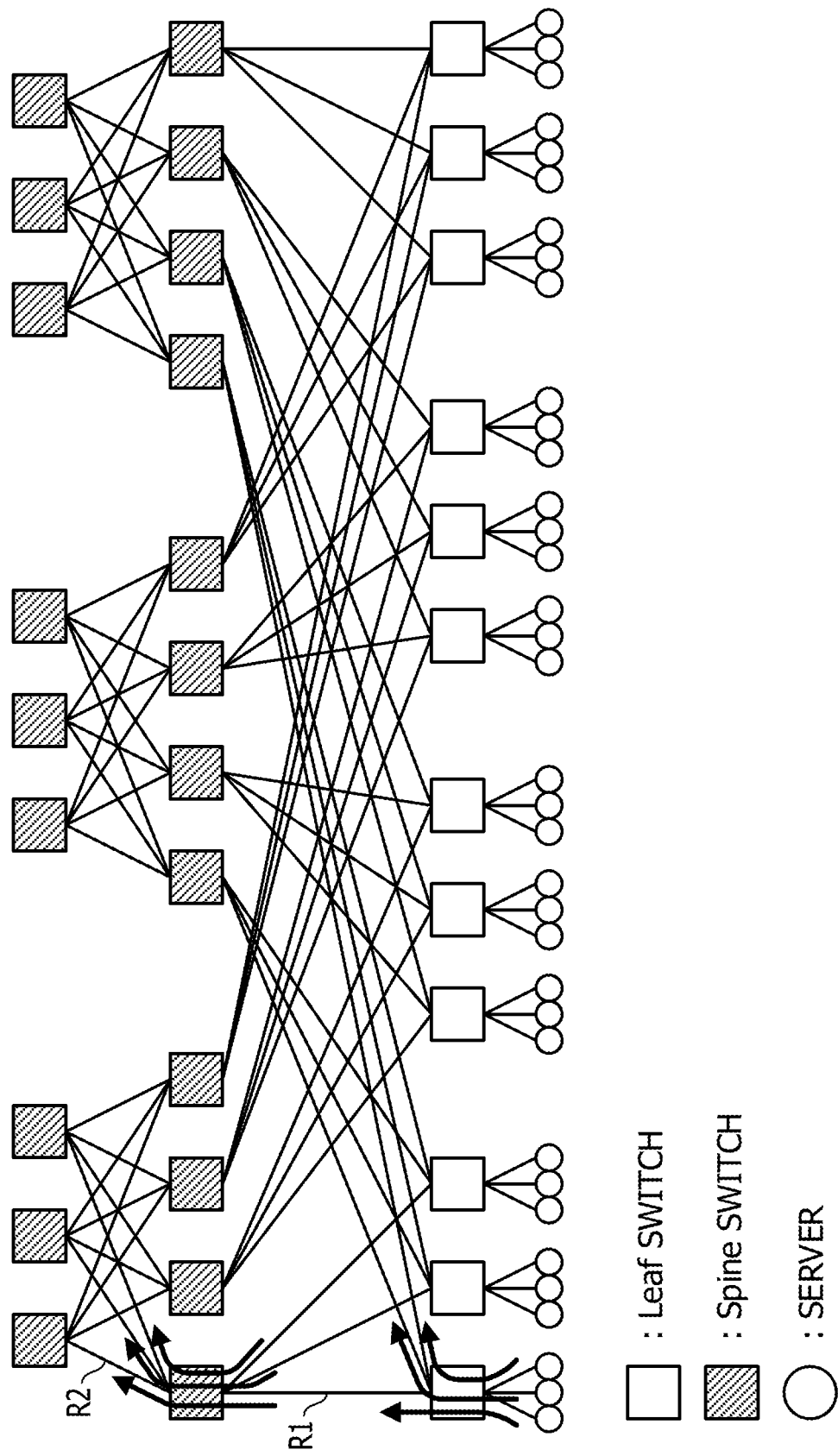
FIG. 6 is a diagram illustrating the channel contention in a case where the all-reducing communication is performed in a topology that has a Fat-Tree structure.

In the present embodiment, it is considered that, in a case where this all-reducing communication is performed by a specific server in a Latin square Fat-Tree system, channel contention is not made to occur. At this point, the channel contention means that a plurality of packets are transmitted at the same time in one direction along one channel, and communication time is lengthened due to occurrence of the channel contention. As an example, FIG. 5 illustrates the channel contention in a case where the all-reducing communication is performed in a topology that has a general tree structure. In FIG. 5, a circular shape represents a server, a square shape that is not hatched represents a leaf switch, and a square shape that is hatched represent a spine switch. In FIG. 5, the channel contention occurs along a channel R1, and the channel contention occurs along the channel R2 as well. In this case, for example, as illustrated in FIG. 6, it is possible that the channel contention is avoided by causing a change from the tree structure to a Fat-Tree structure, but when the Fat-Tree structure is employed, the total number of switches is greater than in an example in FIG. 5.

Figure 7:
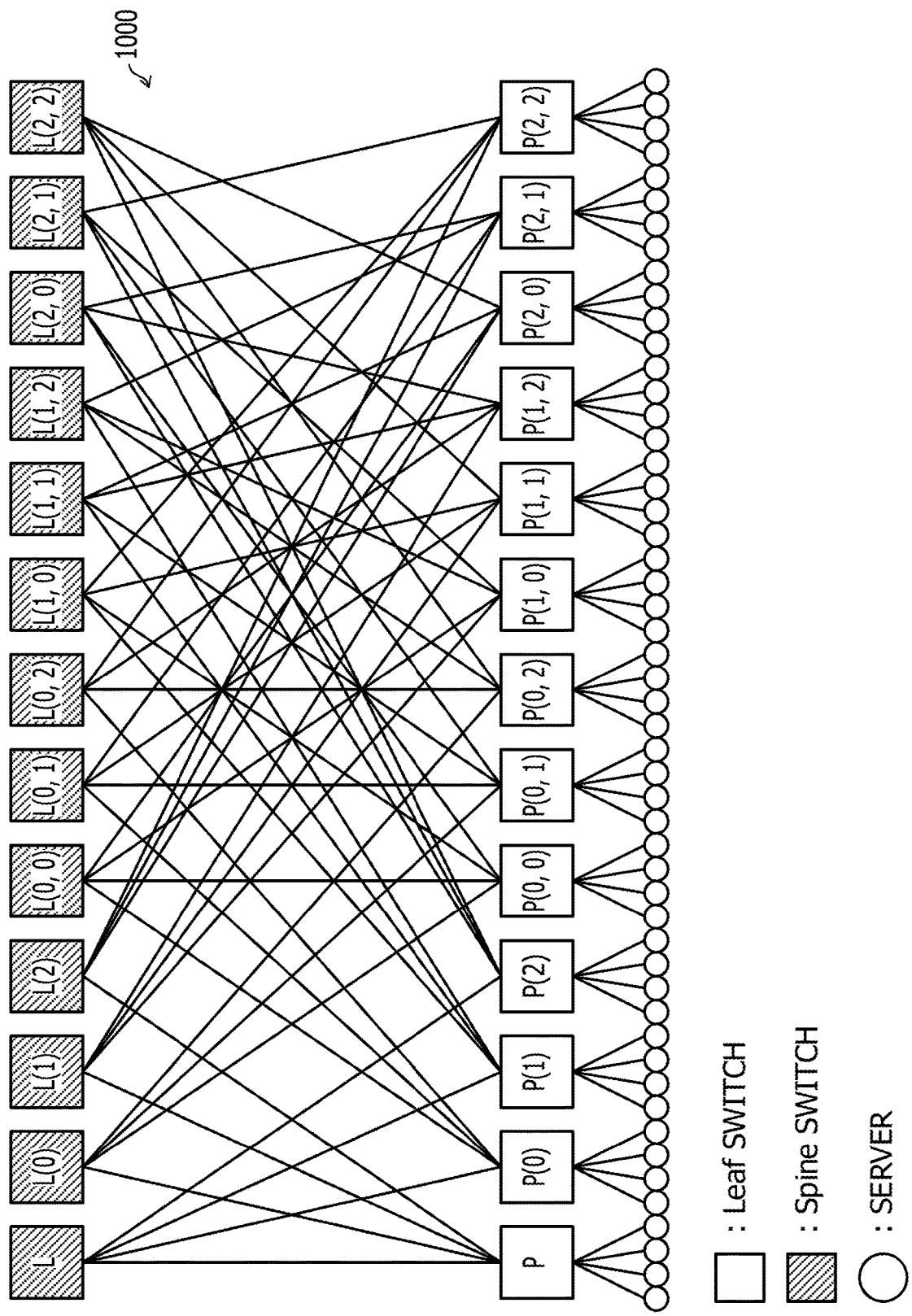
FIG. 7 is a diagram illustrating an outline of a Latin square Fat-Tree system according to the present embodiment.

FIG. 7 is a diagram illustrating a Latin square Fat-Tree system 1000 according to the present embodiment. In the present embodiment, a type of connection among 13 spine switches and 13 leaf switches is a Latin square Fat-Tree. Because four servers are connected to each leaf switch, the Latin square Fat-Tree system 1000 has 52 servers that perform parallel distribution processing. The spine switch and the leaf switch, for example, is an Infiniband switch. The server, for example, is a physical server. The number of servers that are connected to the leaf switch is defined as d. In the present embodiment, d=4.

It is noted that, in FIG. 7, the number of spine switches and the number of leaf switches is 13, but may be other than 13. Other examples, an appendix is referred to for other examples.

Figure 8:
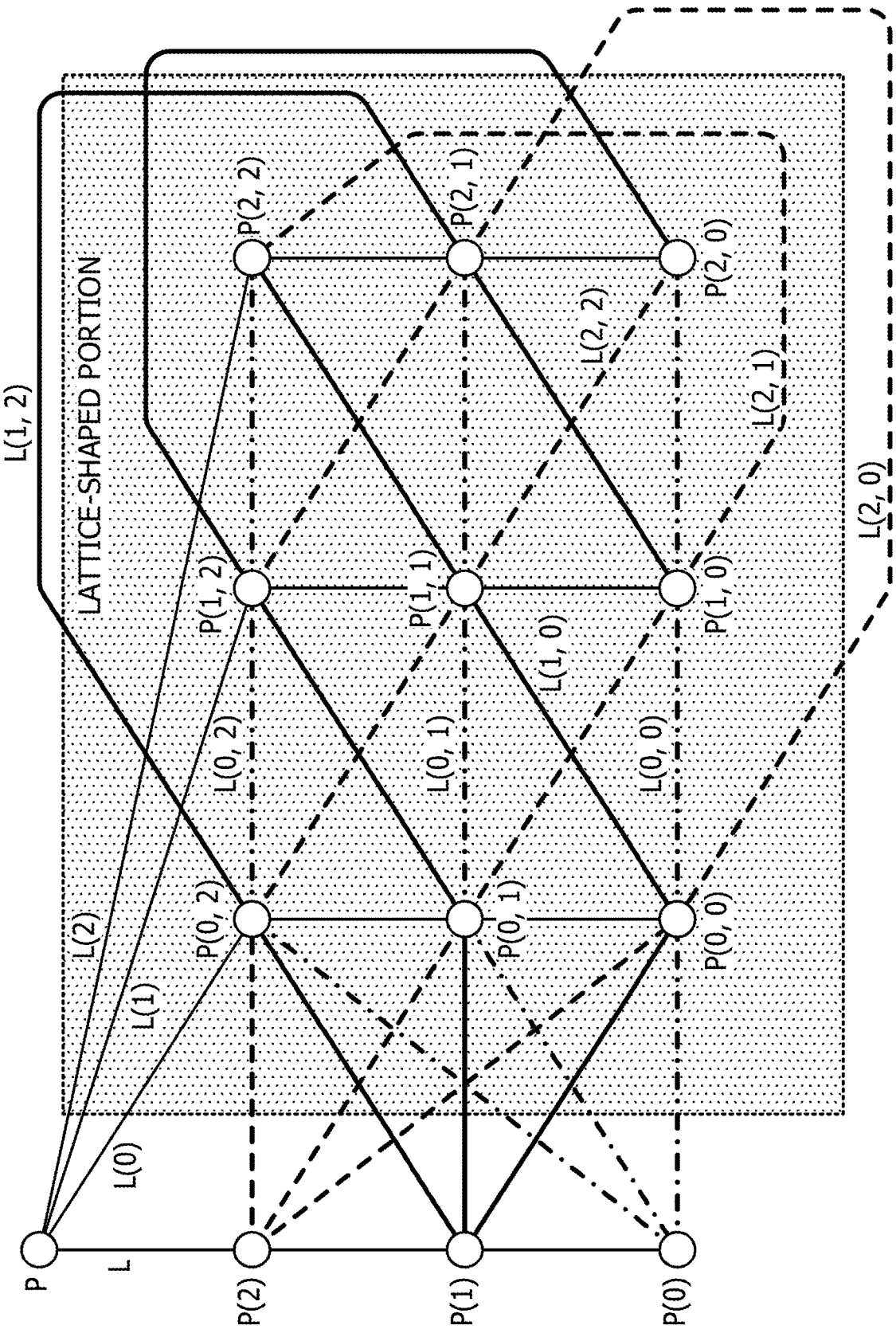
FIG. 8 is a diagram illustrating a limited projective plane.

In FIG. 7, a string of characters that represents a point on a limited projective plane that corresponds to the Latin square Fat-Tree which is illustrated in FIG. 7 is given to each spine switch and each leaf switch. FIG. 8 is a diagram illustrating the limited projective plane that corresponds to the Latin square Fat-Tree which is illustrated in FIG. 7. The order of a limited projective plane that is illustrated in FIG. 8 is 3, and the number of ports of the spine switch and the leaf switch is 8. A point represents the leaf switch, and a straight line represents the spine switch. In a case where a lattice-shaped portion is determined as illustrated in FIG. 7, a leaf switch P, a leaf switch P(0), a leaf switch P(1), and a leaf switch P(2) are equivalent to infinite points. It is noted that the appendix is referred to for the limited projective plane.

Figure 9:
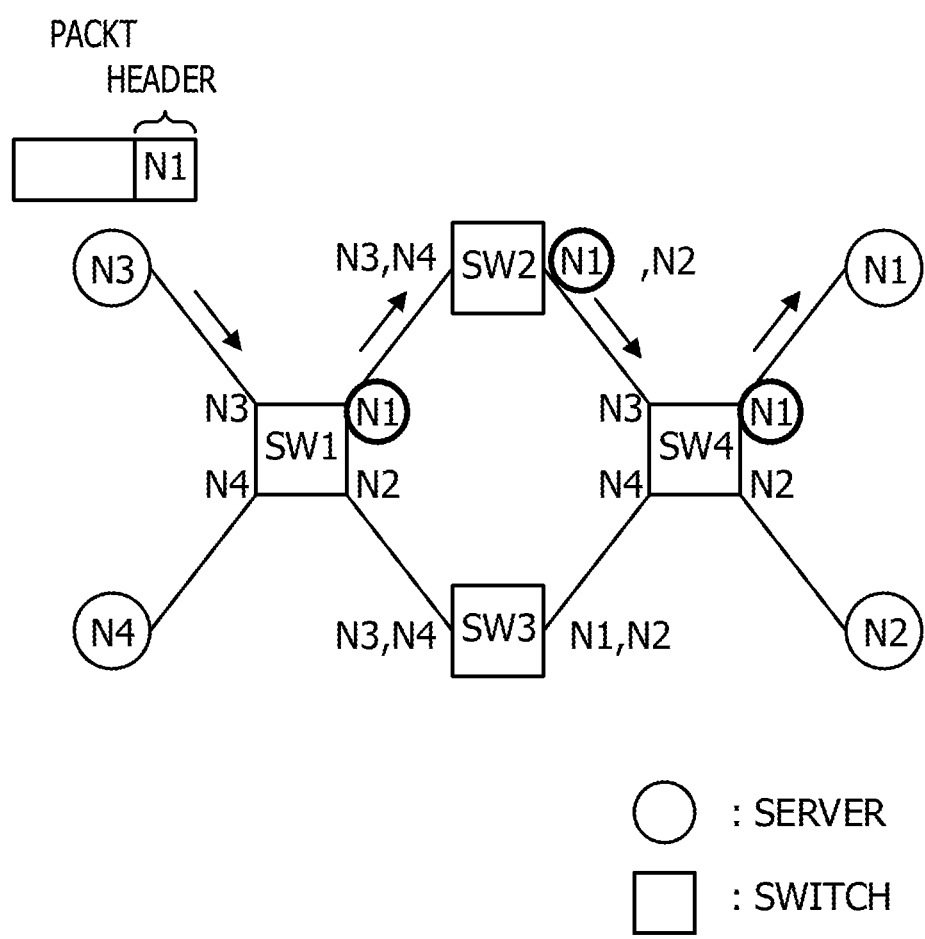
FIG. 9 is a diagram for describing routing on a network in an Infiniband.

In the Latin square Fat-Tree system 1000 according to the present embodiment, in order to avoid the channel contention, a network in an Infiniband, on which regular and fixed routing is performed, is used. The routing on the network in the Infiniband will be described with reference to FIG. 9. In FIG. 9, a circular shape represents a server, and a square shape represents a switch. A line segment represents a link in the Infiniband, and a string of characters in the vicinity of the line segment represents identification information on a server that is a destination. An arrow that is indicated by a thick solid line represents a communication channel.

In an example in FIG. 9, a server N3 transmits a packet of which a destination is the server N1. Included in a header of the packet is identification information (for example, a local identifier (LID)) on the destination. Because the identification information on the server that is a destination is associated with each output port in each switch, the switch itself outputs a packet to an output port that corresponds to the identification information on the destination that is included in the packet. In the example in FIG. 9, the packet arrives as the server N1 via a switch SW1, a switch SW2, and a switch SW4.

In this manner, a network according to the present embodiment is not only a network on which, as with the Ethernet (a registered trademark), a channel is automatically determined, but is also a network on which regular and fixed routing is performed.

It is noted that it is assumed that, aside from the identification information, a number is assigned to each server. Specifically, any of the numbers from 0 to 3 is allocated to each of the four servers that are connected to the leaf switches, respectively, and a server to which "0" is allocated, a server to which "1" is allocated, a server to which "2" is allocated, and a server to which "3" is allocated are connected to each leaf switch.

Figure 10:
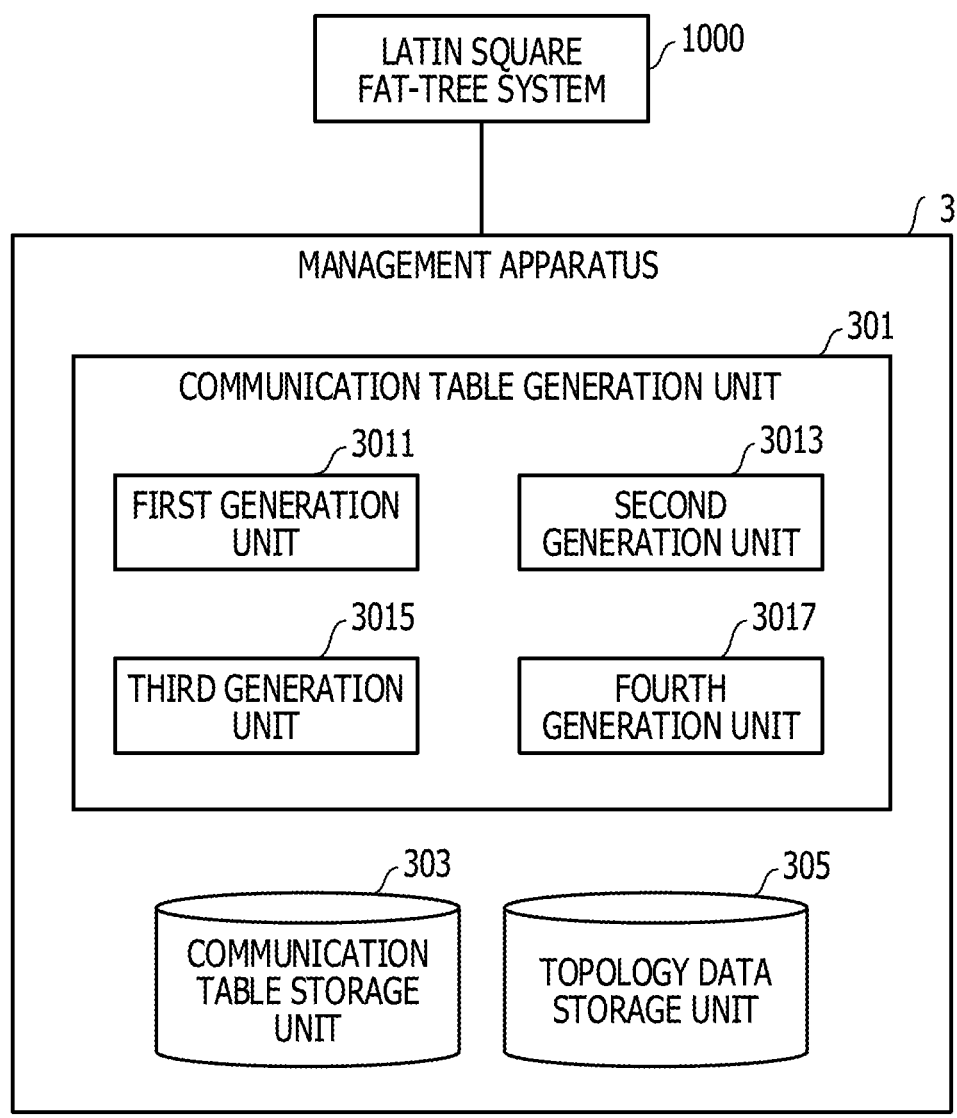
FIG. 10 is a functional block diagram of a management apparatus according to a first embodiment.
Figure 66:
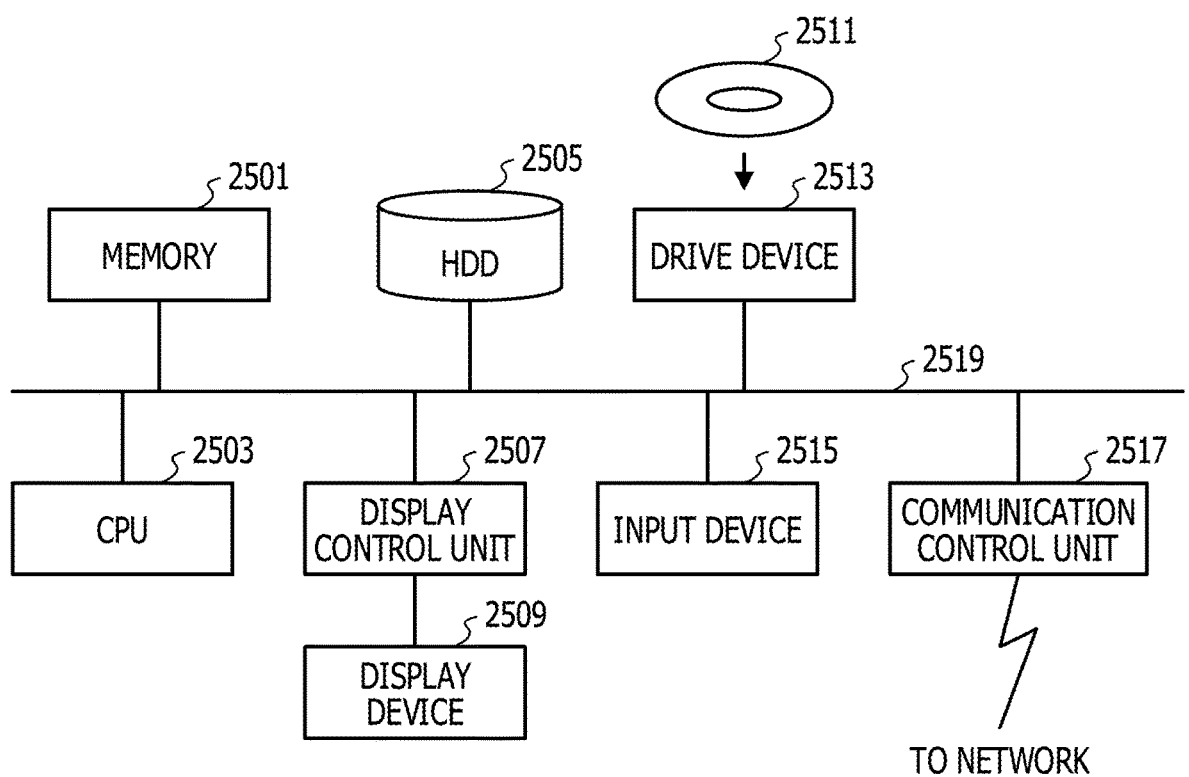
FIG. 66 is a functional block diagram of a computer.

As illustrated in FIG. 10, the Latin square Fat-Tree system 1000 according to the first embodiment is connected to a management apparatus 3 through a local area network (LAN) for management, and communication in the Latin square Fat-Tree system 1000 is managed by the management apparatus 3. The management apparatus 3 has a communication table generation unit 301, a communication table storage unit 303, and a topology data storage unit 305. The communication table generation unit 301 has a first generation unit 3011, a second generation unit 3013, a third generation unit 3015, and a fourth generation unit 3017. For example, a program that is loaded onto a memory 2501 in FIG. 66 is executed by a central processing unit (CPU) 2503 in FIG. 66, and thus the communication table generation unit 301 is realized. The communication table storage unit 303 and the topology data storage unit 305, for example, are provided in the memory 2501 or a hard disk drive (HDD) 2505, which is illustrated in FIG. 66.

The first generation unit 3011 generates a first communication table based on information on a network topology of the Latin square Fat-Tree system 1000, which is stored in the topology data storage unit 305, and stores the generated first communication table in the communication table storage unit 303. The second generation unit 3013 generates a second communication table based on the information on the network topology of the Latin square Fat-Tree system 1000, which is stored in the topology data storage unit 305, and stores the generated second communication table in the communication table storage unit 303. The third generation unit 3015 generates a third communication table based on the information on the network topology of the Latin square Fat-Tree system 1000, which is stored in the topology data storage unit 305, and stores the generated third communication table in the communication table storage unit 303. The fourth generation unit 3017 generates a fourth communication table based on the information on the network topology of the Latin square Fat-Tree system 1000, which is stored in the topology data storage unit 305, and stores the generated fourth communication table in the communication table storage unit 303. At a prescribed timing or according to a request, the communication table generation unit 301 transmits the first to fourth communication tables, which are stored in the communication table storage unit 303, to a server that is a leaf switch (that is, a leaf switch P(0, 0), a leaf switch P(0, 1), a leaf switch P(0, 2), a leaf switch P(1, 0), a leaf switch P(1, 1), a leaf switch P(1, 2), a leaf switch P(2, 0), a leaf switch P(2, 1), or a leaf switch P(2, 2), which is hereinafter referred to as an operating switch) that is equivalent to a point which is included in the lattice-shaped portion of the limited projective plane.

Figure 11:
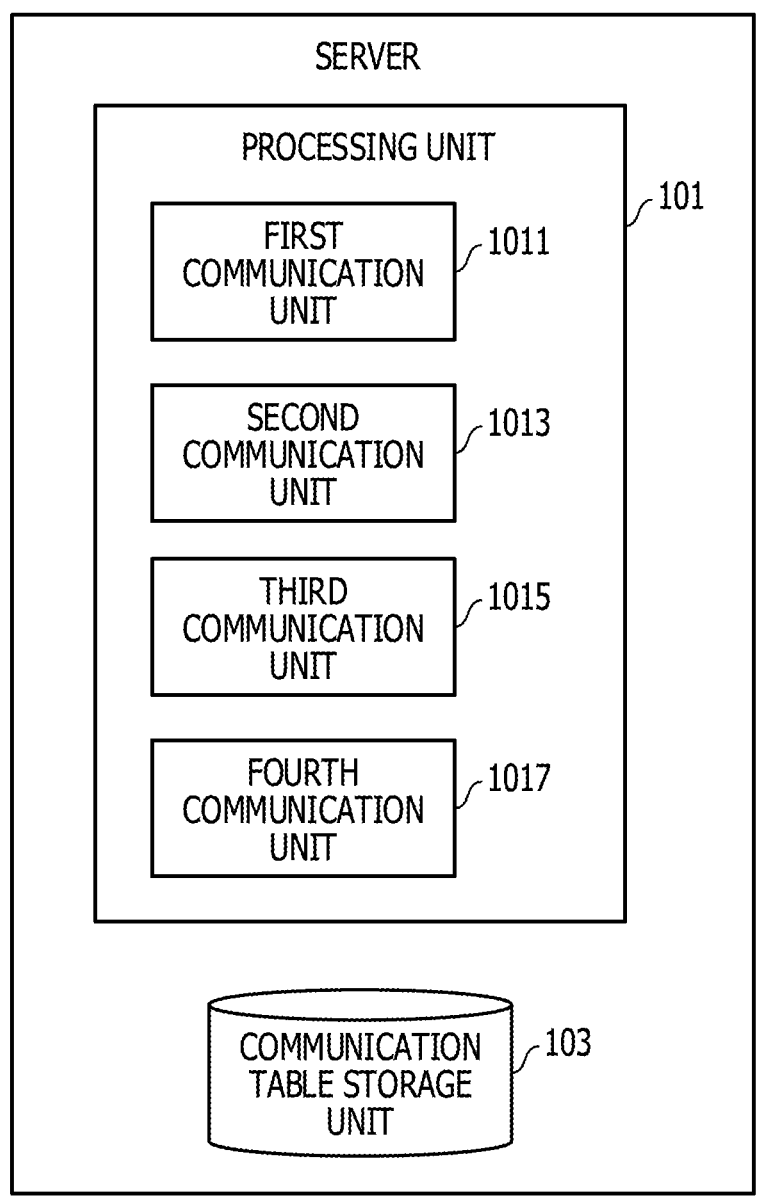
FIG. 11 is a functional block diagram of a server according to the first embodiment.

FIG. 11 is a functional block diagram of a server according to a first embodiment. The server has a processing unit 101 and a communication table storage unit 103. The processing unit 101 has a first communication unit 1011, a second communication unit 1013, a third communication unit 1015, and a fourth communication unit 1017. For example, a program that is loaded onto the memory 2501 in FIG. 66 is executed by the CPU 2503 in FIG. 66, and thus the processing unit 101 is realized. The communication table storage unit 103, for example, is provided in the memory 2501 or the HDD 2505, which is illustrated in FIG. 66.

Included in the communication table storage unit 103 are the first to fourth communication tables that are received from the management apparatus 3. The first communication unit 1011 performs communication according to the first communication table that is stored in the communication table storage unit 103. The second communication unit 1013 performs communication according to the second communication table that is stored in the communication table storage unit 103. The third communication unit 1015 performs communication according to the third communication table that is stored in the communication table storage unit 103. The fourth communication unit 1017 performs communication according to the fourth communication table that is stored in the communication table storage unit 103.

Figure 12:
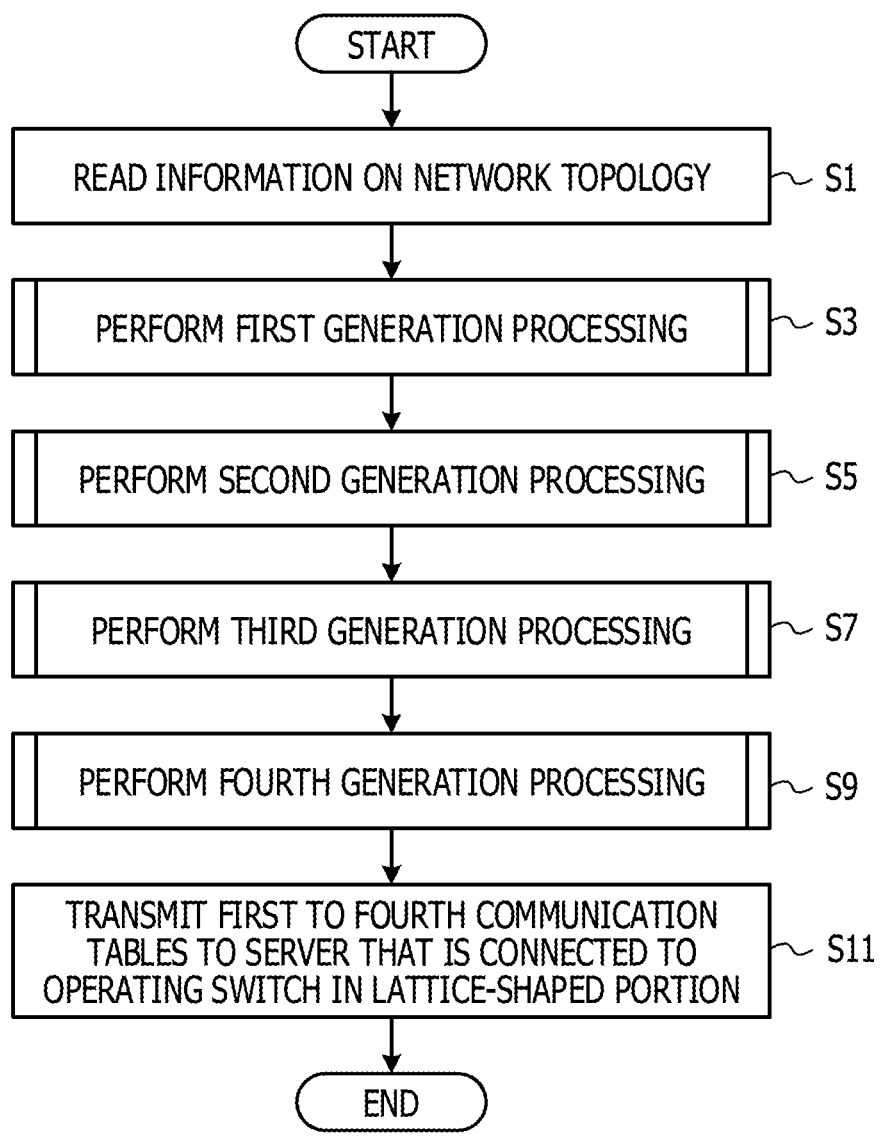
FIG. 12 is a diagram illustrating a processing flow for processing that is performed by the management apparatus according to the first embodiment.

Next, processing that is performed by the management apparatus 3 according to the first embodiment will be described with reference to FIGS. 12 to 44. FIG. 12 is a diagram illustrating a processing flow for processing that is performed by the management apparatus 3.

The communication table generation unit 301 reads the information on the network topology of the Latin square Fat-Tree system 1000 from the topology data storage unit 305 (Step S1 in FIG. 12). The information on the network topology, for example, includes information on a connection relationship between each of the spine switch and the leaf switch and the server.

Based on the information of the network topology that is read in Step S1, the first generation unit 3011 performs first generation processing that is processing which generates the first communication table (Step S3). The first generation processing will be described below.

Based on the information on the network topology that is read in Step S1, the second generation unit 3013 performs the second generation processing that is processing which generates the second communication table (Step S5). The second generation processing will be described below.

Based on the information on the network topology that is read in Step S1, the third generation unit 3015 performs the third generation processing that is processing which generates the third communication table (Step S7). The third generation processing will be described below.

Based on the information on the network topology that is read in Step S1, the fourth generation unit 3017 performs the fourth generation processing that is processing which generates the fourth communication table (Step S9). The fourth generation processing will be described below.

Then, the communication table generation unit 301 reads the first to fourth communication tables that are stored in the communication table storage unit 303, and transmits the first to fourth communication tables that are read, to each server that is connected to the operating switch (Step S11). Then, the processing is ended.

If the processing is performed as described above, a server that receives the first to fourth communication tables can perform the all-reducing communication in a suitable procedure.

Figure 13:
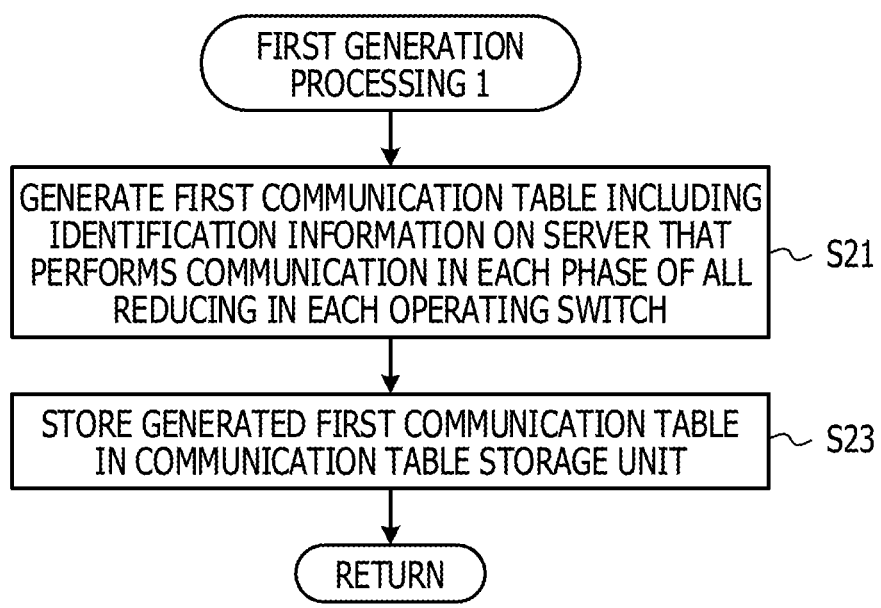
FIG. 13 is a diagram illustrating a processing flow for first generation processing according to the first embodiment.

Next, the first generation processing will be described with reference to FIGS. 13 to 22. FIG. 13 is a diagram illustrating a processing flow for the first generation processing according to the first embodiment.

The first generation unit 3011 generates the first communication table that includes identification information on the server that performs communication in each phase of the all reducing in each operating switch (Step S21 in FIG. 13).

Figure 14A:
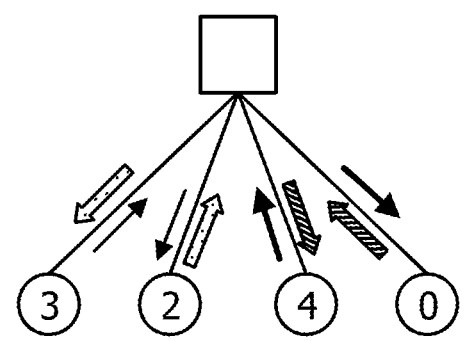
FIGS. 14A and 14B are diagrams for describing the all-reducing.
Figure 17A:
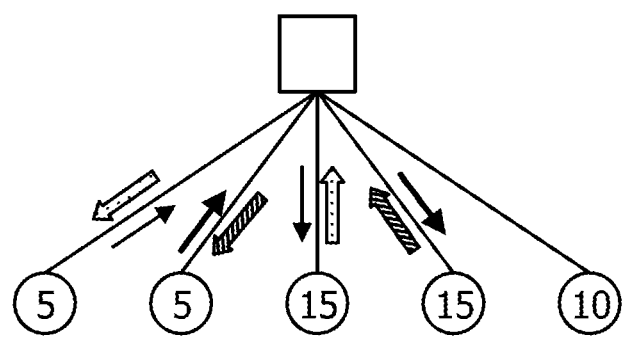
FIGS. 17A and 17B are diagrams for describing the all-reducing.
Figure 17B:
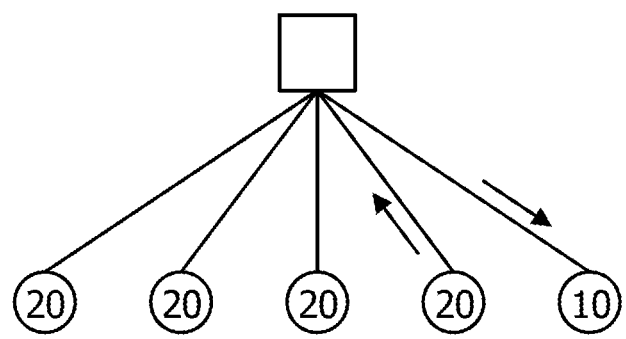
Figure 18:
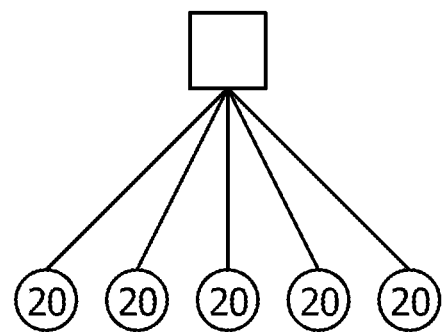
FIG. 18 is a diagram for describing the all-reducing.

FIGS. 14A to 18 are diagrams for describing the all reducing between servers that are connected to the operating switch. In FIGS. 14A and 18, a square shape presents a leaf switch that is an operating switch, a circular shape presents a server, and a line segment that links between the leaf switch and the server represents a link. A number that is given to the server represents a value that is the server has.

First, a case where the number of servers that are connected to the leaf switch is even (the number of servers here is 4 that is a power of two) will be described with reference to FIGS. 14A to 15.

For example, as illustrated in FIG. 14A, four servers have "3," "2," "4," and "0," respectively. In this case, a value is shared between each of the pairs of two servers, and an arithmetic operation (here, addition) for value calculation is performed. At this point, because a plurality of packets is not transmitted along one channel at the same time in the same direction, the channel contention does not occur.

Figure 14B:
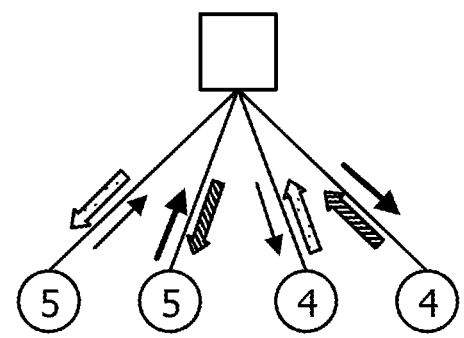

When this is done, as illustrated in FIG. 14B, two servers have the value of "5," and the remaining two servers have the value of "4." Then, a value is shared between each of the pairs of the server that has the value of "5" and the server that has the value of "4," and the arithmetic operation (here, addition) for value calculation is performed. At this point, because a plurality of packets is not transmitted along one channel at the same time in the same direction, the channel contention does not occur.

Figure 15:
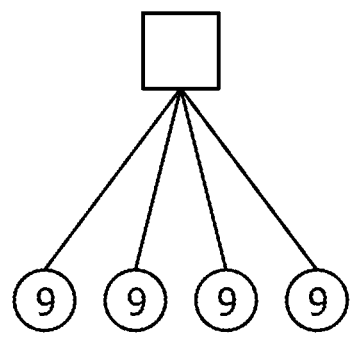
FIG. 15 is a diagram for describing the all-reducing.

Accordingly, as illustrated in FIG. 15, each server finally has the value of "9."

Next, a case where the number of servers that are connected to the leaf switch is odd (the number of servers here is 5) will be described with reference to FIGS. 16A to 18.

Figure 16A:
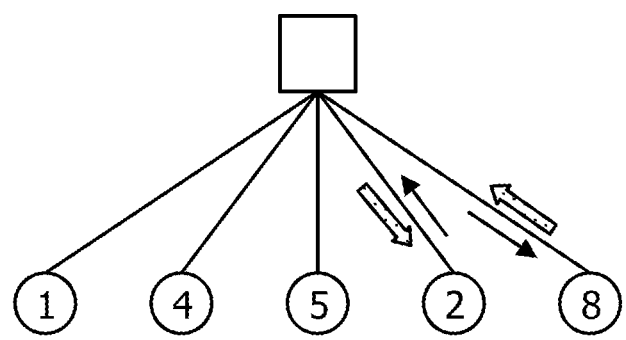
FIGS. 16A and 16B are diagrams for describing the all-reducing.

For example, as illustrated in FIG. 16A, five servers have "1," "4," "2," "5," and "8," respectively. In this case, a value is shared between two servers of the five servers, and the arithmetic operation (here, addition) for value calculation is performed. At this point, because a plurality of packets is not transmitted along one channel at the same time in the same direction, the channel contention does not occur.

Figure 16B:
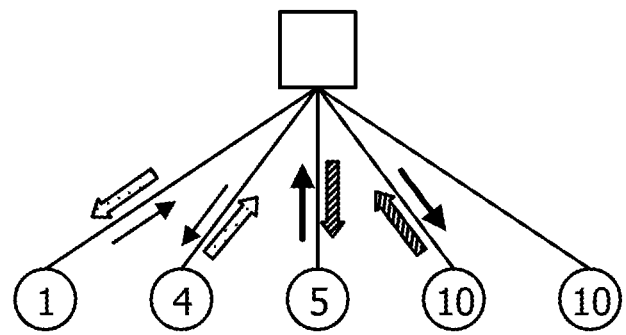

When this is done, as illustrated in FIG. 16B, five servers have "1," "4," "5," "10," and "10," respectively. Then, a value is shared between a pair of the server that has the value of "1" and the server that has the value of "4" and between a pair of the server that has the value of "5," and the server that has the value of "10," and the arithmetic operation for value calculation is performed. At this point, because a plurality of packets is not transmitted along one channel at the same time in the same direction, the channel contention does not occur.

When this is done, as illustrated in FIG. 17A, five servers have "5," "5," "15," "15," and "10," respectively. Then, a value is shared between each of the pairs of the server that has the value of "5" and the server that has the value of "15," and the arithmetic operation for value calculation is performed.

At this point, because a plurality of packets is not transmitted along one channel at the same time in the same direction, the channel contention does not occur.

When this is done, as illustrated in FIG. 17B, five servers have "20," "20," "20," "20," and "10," respectively. Then, a server that has the value of "20" notifies a server that has the value of "10," of the value of "20." At this point, because a plurality of packets is not transmitted along one channel at the same time in the same direction, the channel contention does not occur.

When this is done, as illustrated in FIG. 18, each of the five servers finally has the value of "20."

One example of the all reducing that is performed among a plurality of servers is described above, but in a case where the number of servers is other than the number that is used in the example, the all reducing can also be basically performed with the same method.

Processing (hereinafter referred to as all reducing (x)) that generates a communication table in a case where the all reducing is performed between x (x is a natural number) servers will be described here. In the present embodiment, the communication table is generated by recursive processing.

(1) In a case where the number x of servers that are connected to the leaf switch is 1, processing is ended.

(2) In a case where the number x of servers that are connected to the leaf switch 2, communication information (specifically, information on a pair of servers) for communication between two servers is registered in the communication table.

(3) In a case where the number n of servers that are connected to the leaf switch is an odd number, 2y+1 (y is a natural number), two servers (a server P and a server Q) are selected from among x servers, and communication information on the all-reducing communication between the server P and the server Q is registered in the communication table. Then, for any server (the server P at this point) of the server P and the server Q) and the remaining (2y−1) servers (more precisely, 2y servers), all reducing (2y) is invoked. Then, communication information for sending a result of the all reducing (2y) from the server P to the server Q is registered in the communication table.

(4) In a case where the number of servers that are connected to the leaf switch is 2y (y is a natural number that is equal to or greater than 2), servers are divided into a group of y servers and a group of y serves, and for the groups, all reducing (y) is invoked in parallel at the same time.

If the processing is performed as described above, the communication table in the case where the all reducing among the x servers is performed is generated. As apparent from the description with reference to FIGS. 14A to 18, if the all-reducing communication according to the communication table that is generated with this method, the channel contention does not occur.

Returning to the description with reference to FIG. 13, the first generation unit 3011 stores the first communication table that is generated in Step S21, in the communication table storage unit 303 (Step S23). Then, the processing returns to invoking processing.

FIG. 19 is a diagram illustrating an example of the first communication table. In an example in FIG. 19, a phase number, and the information on the pair of servers that performs communication are registered in the first communication table. A string of characters, such as N1, represents information (for example, the LID) on a server). Communication 1 and Communication 2 are performed in parallel at the same time. For example, in the phase 2, communication between the server N1 and the server N2, and communication between the server N3 and the server N4 are in parallel at the same time. With the communication table that is illustrated in FIG. 19, a communication partner of each server in the phases 1 to 4, is as follows.

The server N1: -, N2, and N3, the server N2: -, N1, and N4, the server N3: -, N4, and N1, the server N4: N5, N3, N2, and N5 (transmission), and the server N5: N4, -, -, and N4 (reception).

At this point, "-" means that communication is not performed. "Transmission" means that transmission is performed, and "reception" means that reception is performed.

For example, the server N5 performs communication with the server N4 in the phase 1, does not perform communication in the phases 2 and 3, and receives data from the server N4 in the phase 4. It is noted that in the example in FIG. 19, the communication information for one operating switch is illustrated, but that, in practice, communication information for each operating switch is included in the first communication table.

Figure 20:
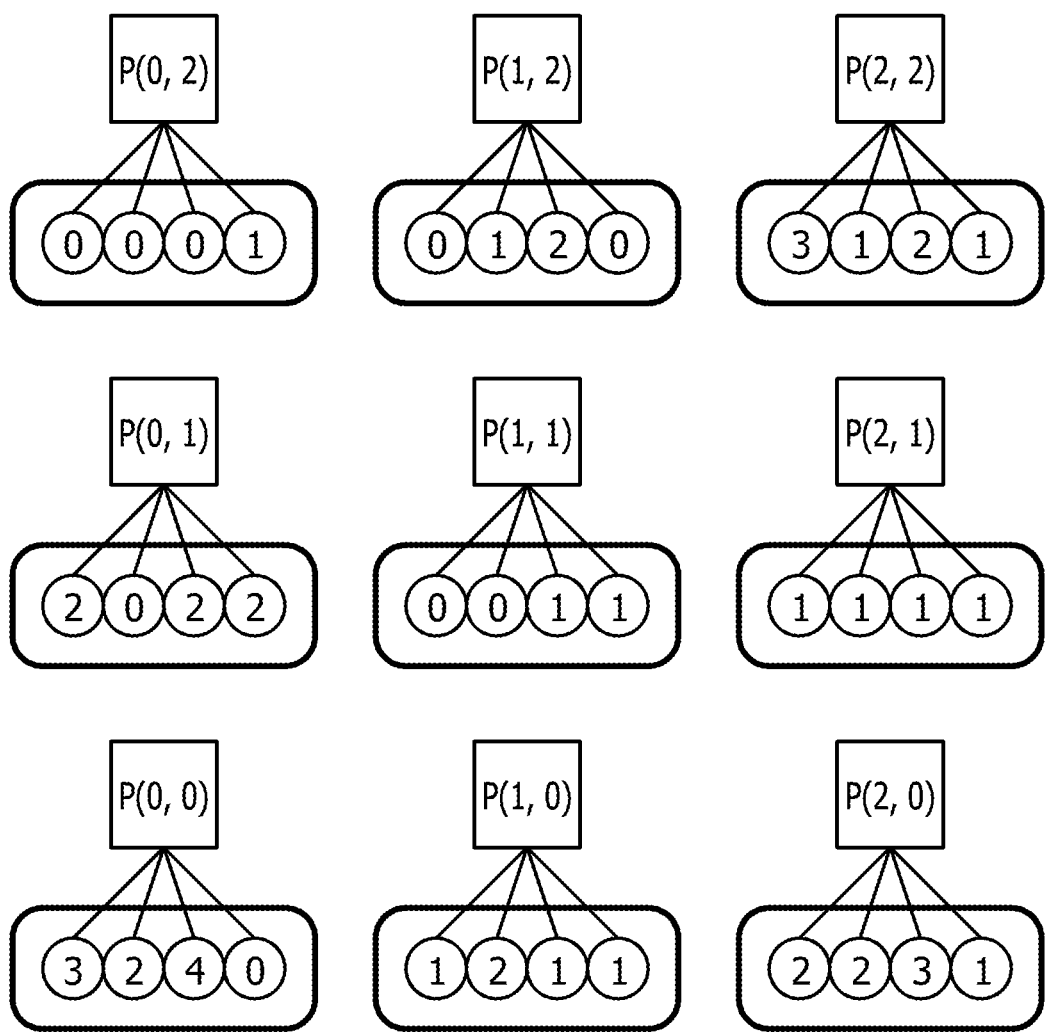
FIG. 20 is a diagram for describing reducing that is realized with the first communication table.
Figure 21:
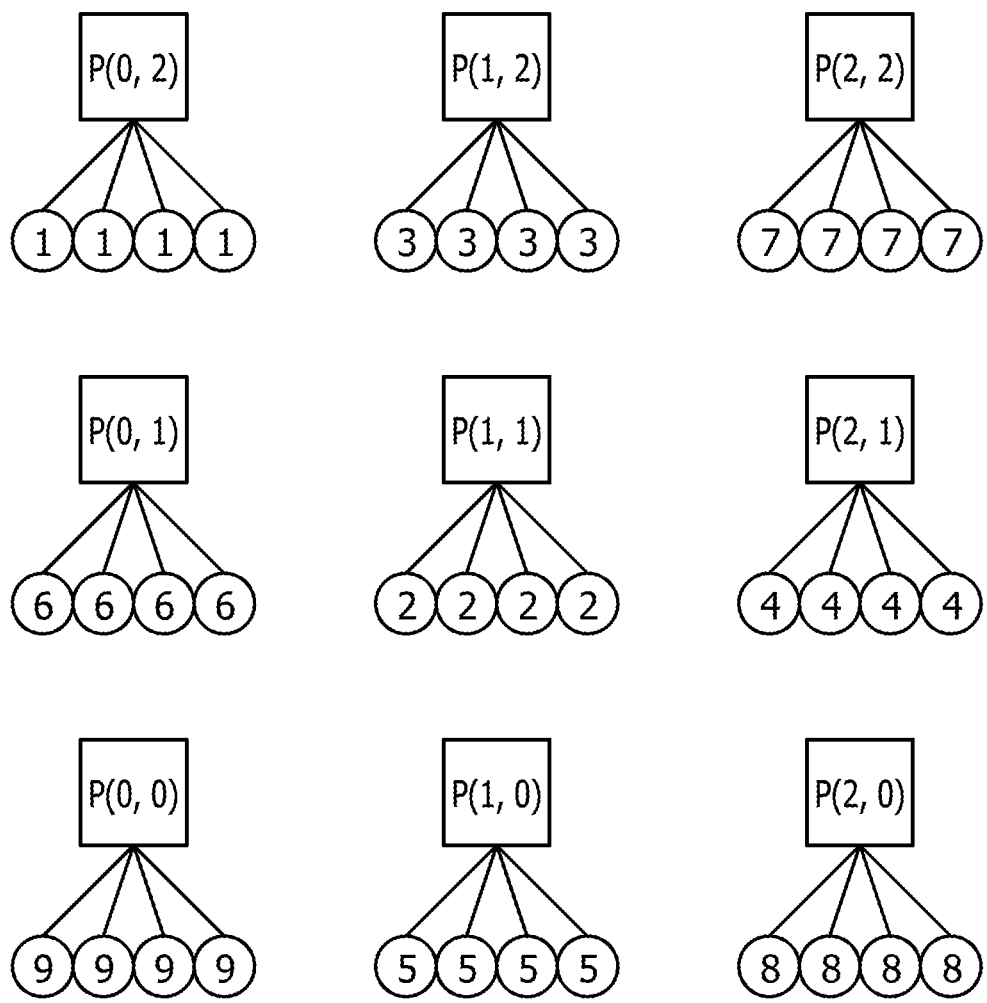
FIG. 21 is a diagram for describing the reducing that is realized with the first communication table.

For example, it is assumed that 36 servers which are connected to the operating switch in the Latin square Fat-Tree system 1000 have values that are illustrated in FIG. 20. With the first communication table, the all reducing is performed under the control of each operating switch. As a result, the 36 servers that are connected to the operating switch have values that are illustrated in FIG. 21.

Among servers that are connected to each operating switch, a server to which a prescribed number (for example, 0) is allocated is hereinafter referred to as a representative server. Then, a value that the representative server connected to each operating switch has is as illustrated in FIG. 22. In an example in FIG. 22, a representative server connected to a leaf switch P(0, 0) has a value of "9," a representative server connected to a leaf switch P(0, 1) has a value of "6," a representative server connected to a leaf switch P(0, 2) has a value of "1," a representative server connected to a leaf switch P(1, 0) has a value of "5," a representative server connected to a leaf switch P(1, 1) has a value of "2," a representative server connected to a leaf switch P(1, 2) has a value of "3," a representative server connected to a leaf switch P(2, 0) has a value of "8," a representative server connected to a leaf switch P(2, 1) has a value of "4," and a representative server connected to a leaf switch P(2, 2) has a value of "7."

Figure 23:
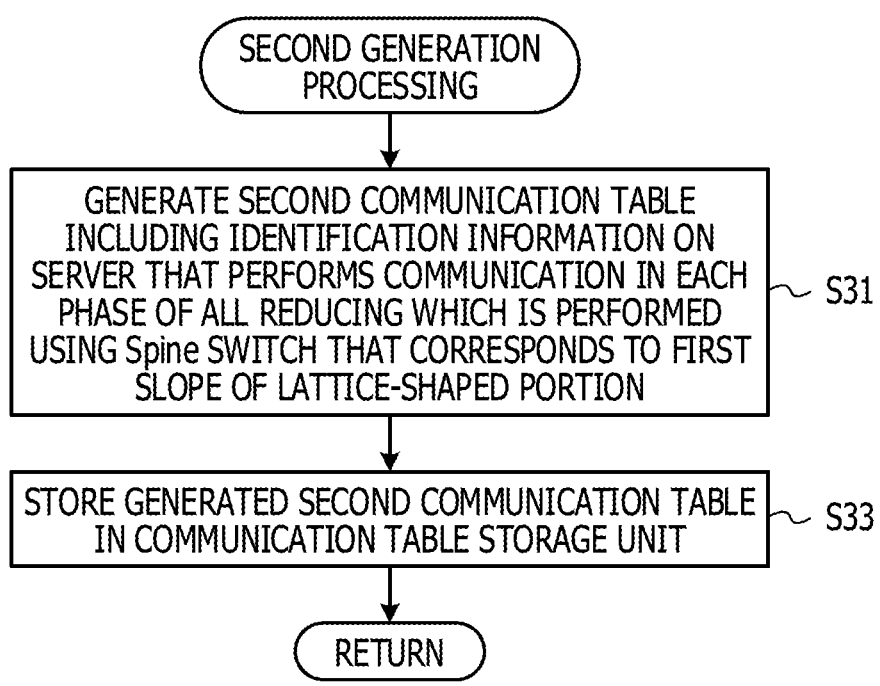
FIG. 23 is a diagram illustrating a processing flow for second generation processing.

Next, the second generation processing will be described with reference to FIGS. 23 and 32. FIG. 23 is a diagram illustrating a processing flow for the second generation processing.

The second generation unit 3013 generates the second communication table including the information on the server that performs communication in each phase of the all reducing which is performed using the spine switch that corresponds to a first slope (that is, direction) of the lattice-shaped portion (Step S31 in FIG. 23).

Figure 24:
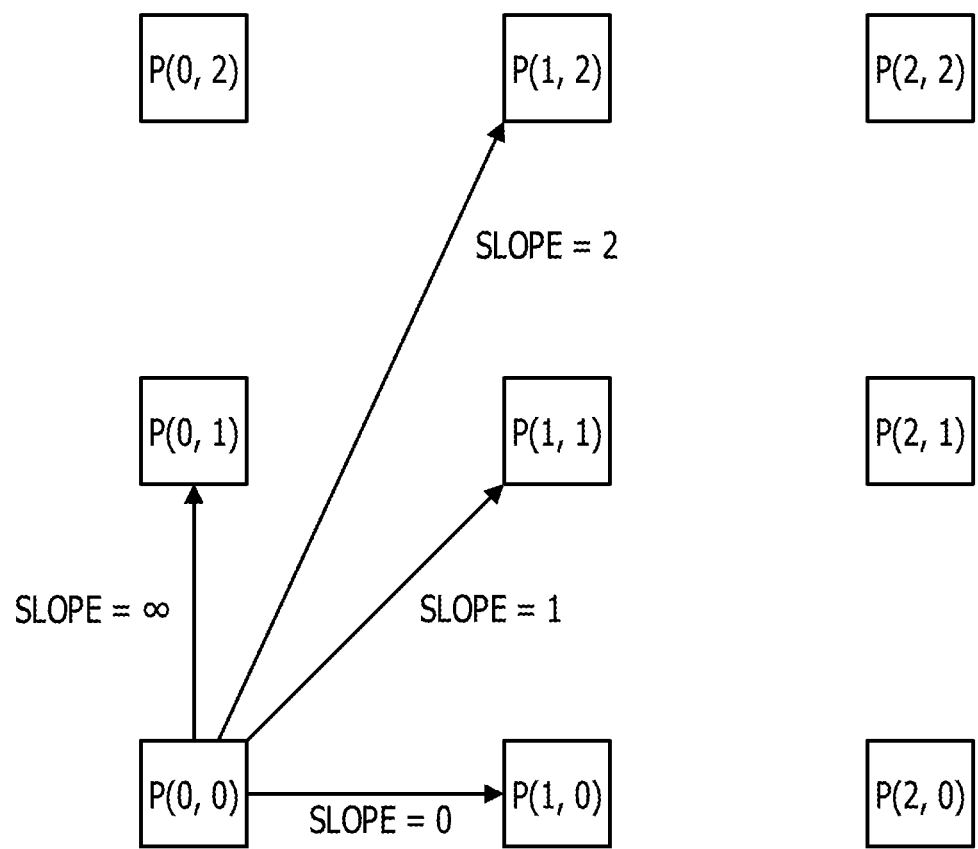
FIG. 24 is a diagram for describing a slope.

FIG. 24 is a diagram for describing the slope. For example, in a case where the leaf switch P(0, 0) in the lattice-shaped portion is a transmission source, when a transmission destination is the leaf switch P(1, 0), the slope is 0. Furthermore, when the transmission destination is the leaf switch P(1, 1), the slope is 1. Furthermore, when the transmission destination is the leaf switch P(1, 2), the slope is 2. Furthermore, when the transmission destination is the leaf switch P(0, 1), the slope is ∞. For example, although not illustrated, in the case where the leaf switch P(0, 0) in the lattice-shaped portion is a transmission source, when a transmission destination is the leaf switch P(2, 0), the slope is 0. Furthermore, when the transmission destination is the leaf switch P(2, 2), the slope is 1. Furthermore, when the transmission destination is the leaf switch P(2, 1), the slope is 2. Furthermore, when the transmission destination is the leaf switch P(0, 2), the slope is ∞. In this manner, the slope is a slope of a line segment that links between points in the lattice-shaped portion. In a case where the order of the limited projective plane is n, (n+1) (=d) slopes are present.

As illustrated in FIG. 8, each point in the lattice-shaped portion in the limited projective plane is a point (n+1) at which straight lines intersect, and the straight lines correspond to different slopes, respectively. Furthermore, the straight lines correspond to different spine switches, respectively. Therefore, for example, in the case of the leaf switch P(0, 0), a straight line with a slope of 0 corresponds to a spine switch L(0, 0), a straight line with a slope of 1 corresponds to a spine switch L(1, 0), a straight line with a slope of 2 corresponds to a spine switch L(2, 0), and a straight line with a slope of ∞ corresponds to a spine switch L(0).

Figure 25:
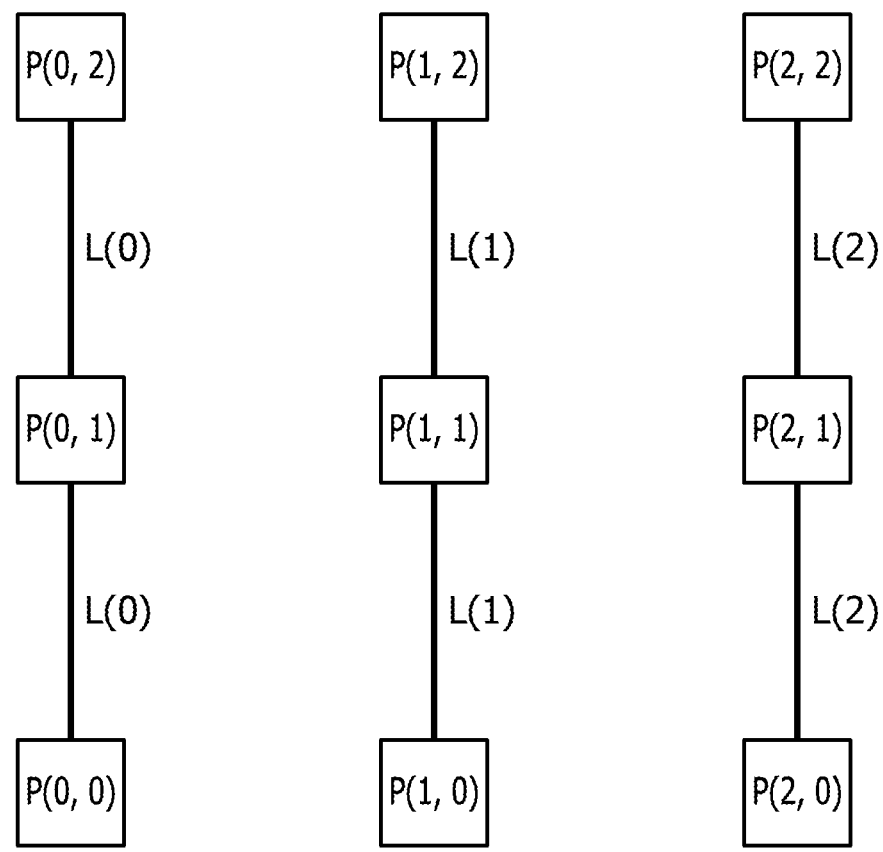
FIG. 25 is a diagram for describing the slope.

In the present embodiment, with the second communication table, the all-reducing is performed using all the spine switch that corresponds to the first slope, among four slopes. For example, in a case where the first slope is ∞, as illustrated in FIG. 25, the representative server connected to the leaf switch P(0, 0), the representative server connected to the leaf switch P(0, 1), and the representative server connected to the leaf switch P(0, 2) perform the all reducing using a spine switch L(0). The representative server connected to the leaf switch P(1, 0), the representative server connected to the leaf switch P(1, 1), and the representative server connected to the leaf switch P(1, 2) perform the all reducing using a spine switch L(1). The representative server connected to the leaf switch P(2, 0), the representative server connected to the leaf switch P(2, 1), and the representative server connected to the leaf switch P(2, 2) perform the all reducing using a spine switch L(2).

For example, in a case where the first slope is 0, as illustrated in FIG. 26, the representative server connected to the leaf switch P(0, 0), the representative server connected to the leaf switch P(1, 0), and the representative server connected to the leaf switch P(2, 0) perform the all reducing using a spine switch L(0, 0). The representative server connected to the leaf switch P(0, 1), the representative server connected to the leaf switch P(1, 1), and the representative server connected to the leaf switch P(2, 1) perform the all reducing using a spine switch L(0, 1). The representative server connected to the leaf switch P(0, 2), the representative server connected to the leaf switch P(1, 2), and the representative server connected to the leaf switch P(2, 2) perform the all reducing using a spine switch L(0, 2).

Figure 27:
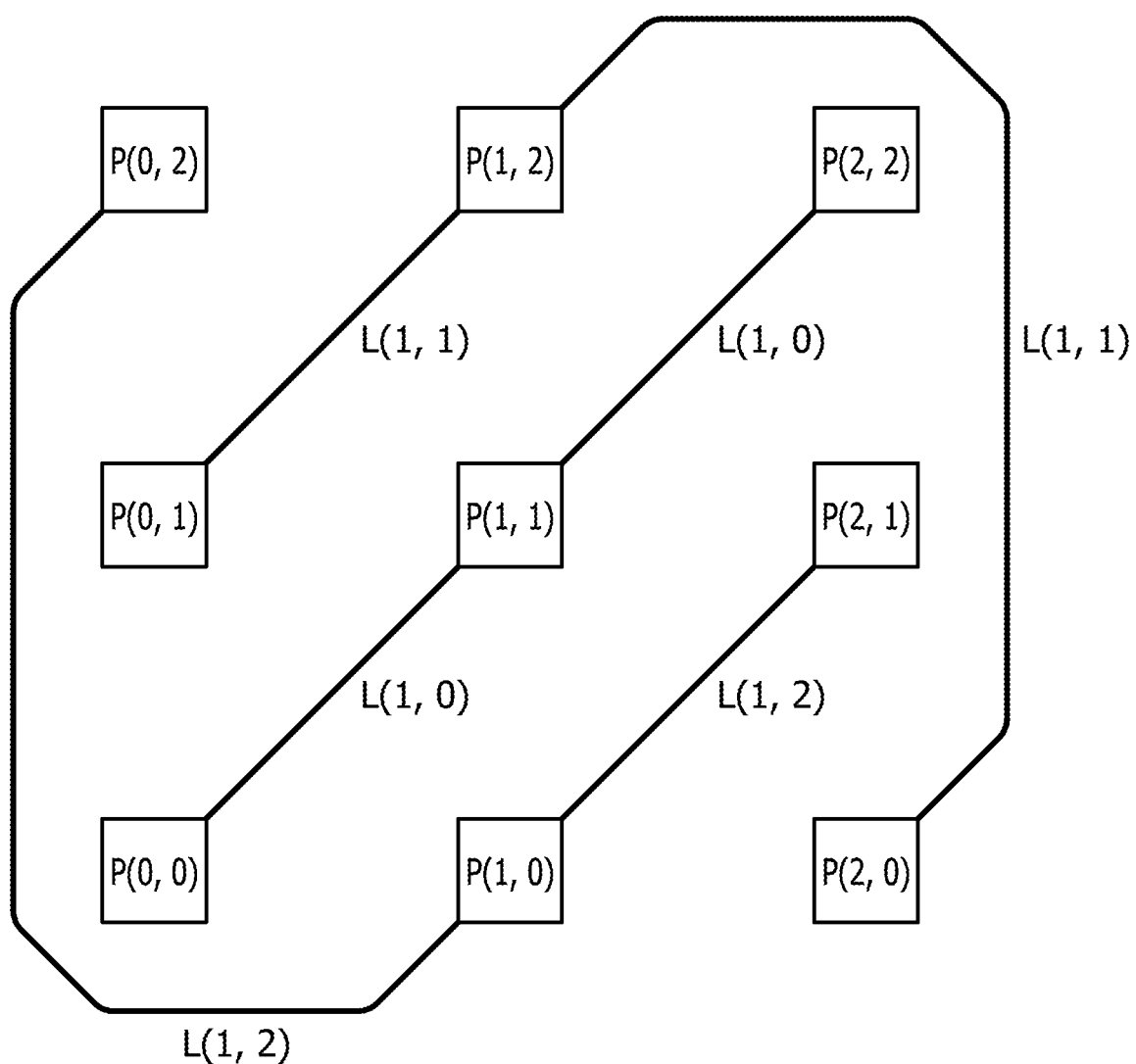
FIG. 27 is a diagram for describing the slope.

For example, in a case where the first slope is 1, as illustrated in FIG. 27, the representative server connected to the leaf switch P(0, 0), the representative server connected to the leaf switch P(1, 1), and the representative server connected to the leaf switch P(2, 2) perform the all reducing using a spine switch L(1, 0). The representative server connected to the leaf switch P(0, 1), the representative server connected to the leaf switch P(1, 2), and the representative server connected to the leaf switch P(2, 0) performs the all reducing using a spine switch L(1, 1). The representative server connected to the leaf switch P(0, 2), the representative server connected to the leaf switch P(1, 0), and the representative server connected to the leaf switch P(2, 1) perform the all reducing using a spine switch L(1, 2).

Figure 28:
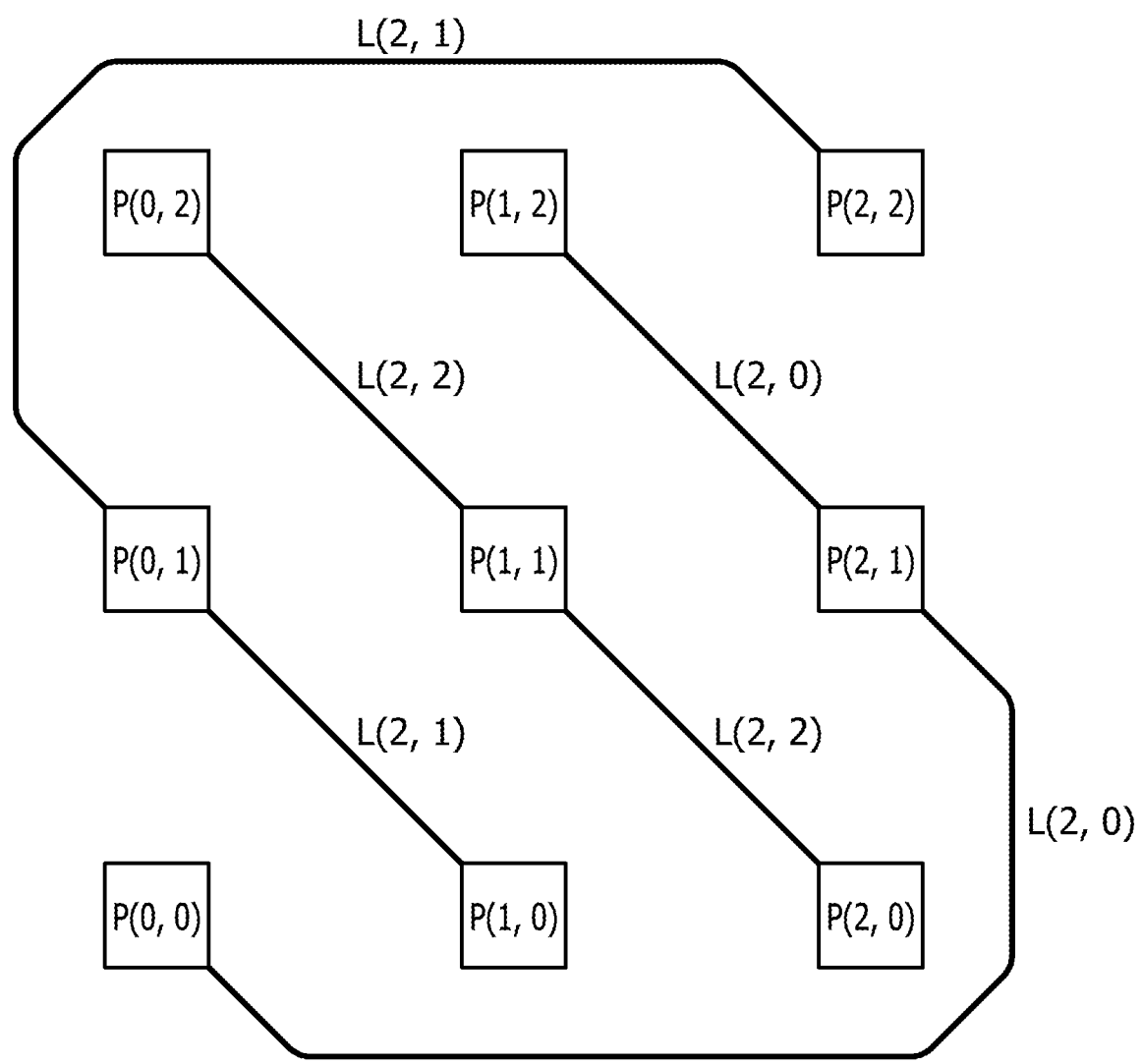
FIG. 28 is a diagram for describing the slope.

For example, in a case where the first slope is 2, as illustrated in FIG. 28, the representative server connected to the leaf switch P(0, 0), the representative server connected to the leaf switch P(1, 2), and the representative server connected to the leaf switch P(2, 1) perform the all reducing using a spine switch L(2, 0). The representative server connected to the leaf switch P(0, 1), the representative server connected to the leaf switch P(1, 0), and the representative server connected to the leaf switch P(2, 2) perform the all reducing using a spine switch L(2, 1). The representative server connected to the leaf switch P(0, 2), the representative server connected to the leaf switch P(1, 1), and the representative server in the leaf switch P(2, 0) perform the all reducing using a spine switch L(2, 2).

Figure 29:
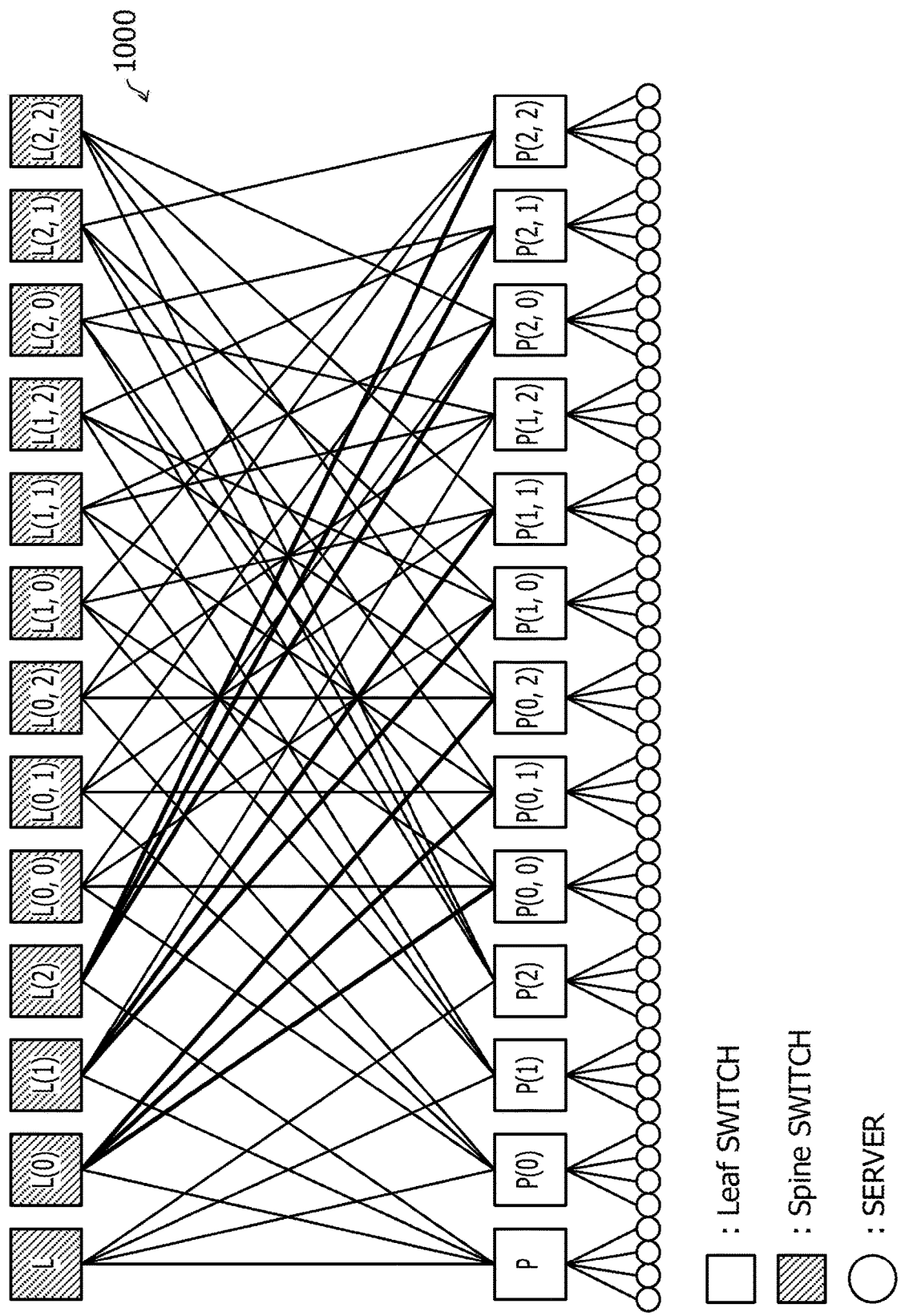
FIG. 29 is a diagram illustrating a channel that is used in a case where the slope is $\infty$.

FIG. 29 is a diagram illustrating a channel that is used in a case where the slope is ∞. In FIG. 29, the channel that is used in the case where the slope is ∞ is a channel that is indicated by a bold line. As described with reference to FIG. 25, in the case where the slope is ∞, the spine switch L(0), the spine switch L(1), and the spine switch L(2) are used.

Figure 30:
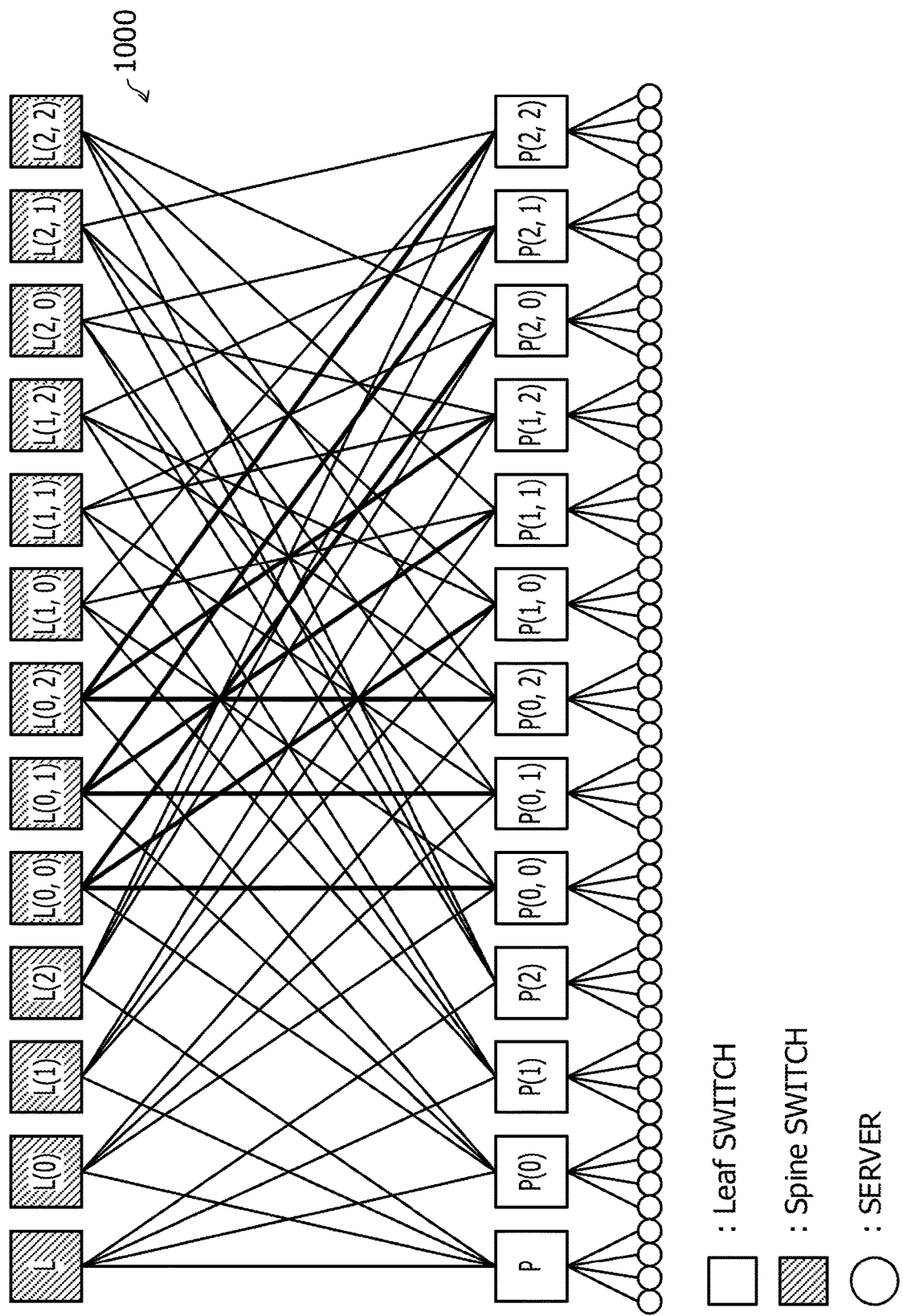
FIG. 30 is a diagram illustrating a channel that is used in a case where the slope is 0.

FIG. 30 is a diagram illustrating a channel that is used in a case where the slope is 0. In FIG. 30, the channel that is used in the case where the slope is 0 is a channel that is indicated by a bold line. As described with reference to FIG. 26, in the case where the slope is 0, the spine switch L(0, 0), the spine switch L(0, 1), and the spine switch L(0, 2) are used.

Figure 31:
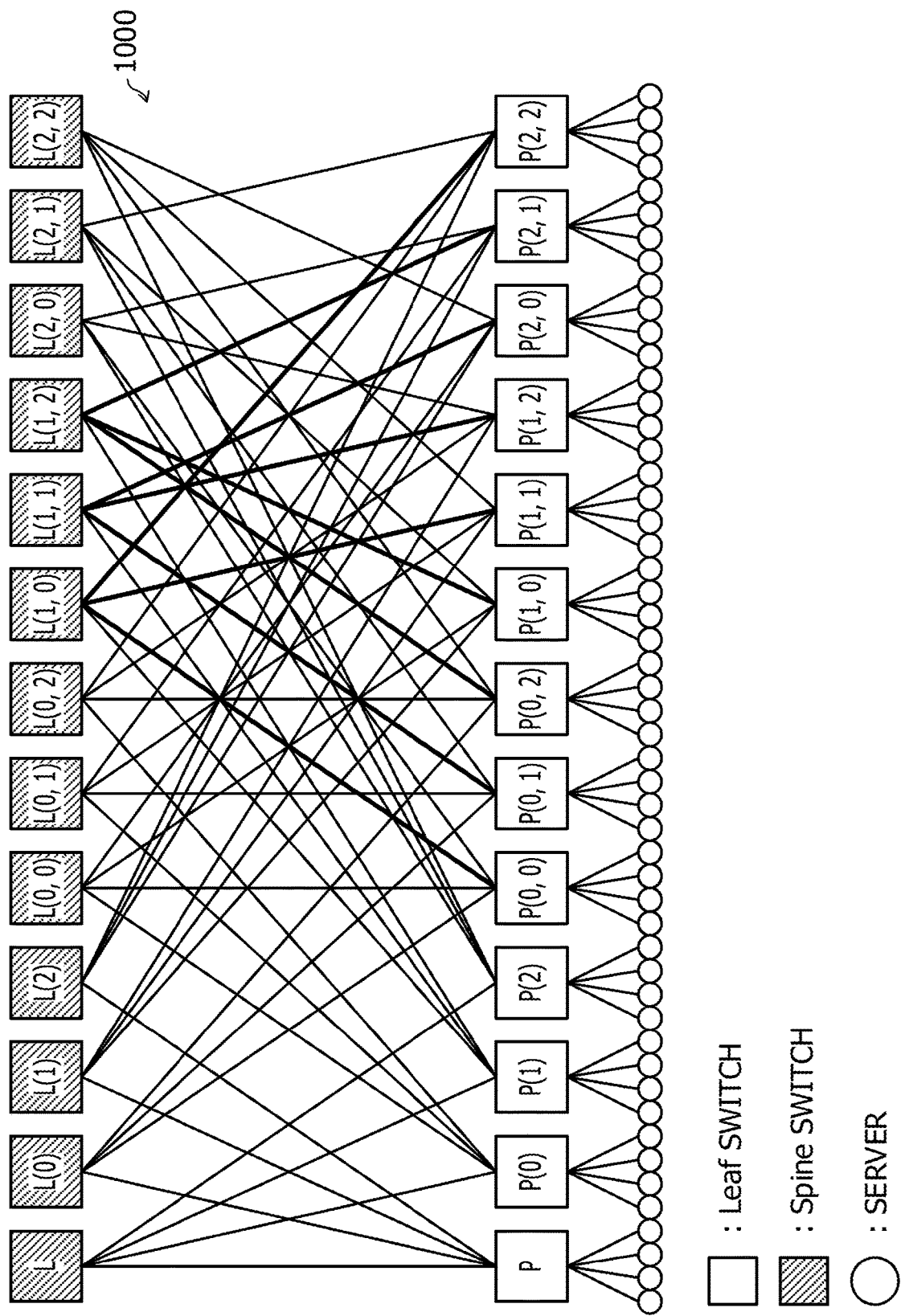
FIG. 31 is a diagram illustrating a channel that is used in a case where the slope is 1.

FIG. 31 is a diagram illustrating a channel that is used in a case where the slope is 1. In FIG. 31, the channel that is used in the case where the slope is 1 is a channel that is indicated by a bold line. As described with reference to FIG. 27, in the case where the slope is 1, the spine switch L(1, 0), the spine switch L(1, 1), and the spine switch L(1, 2) are used.

Figure 32:
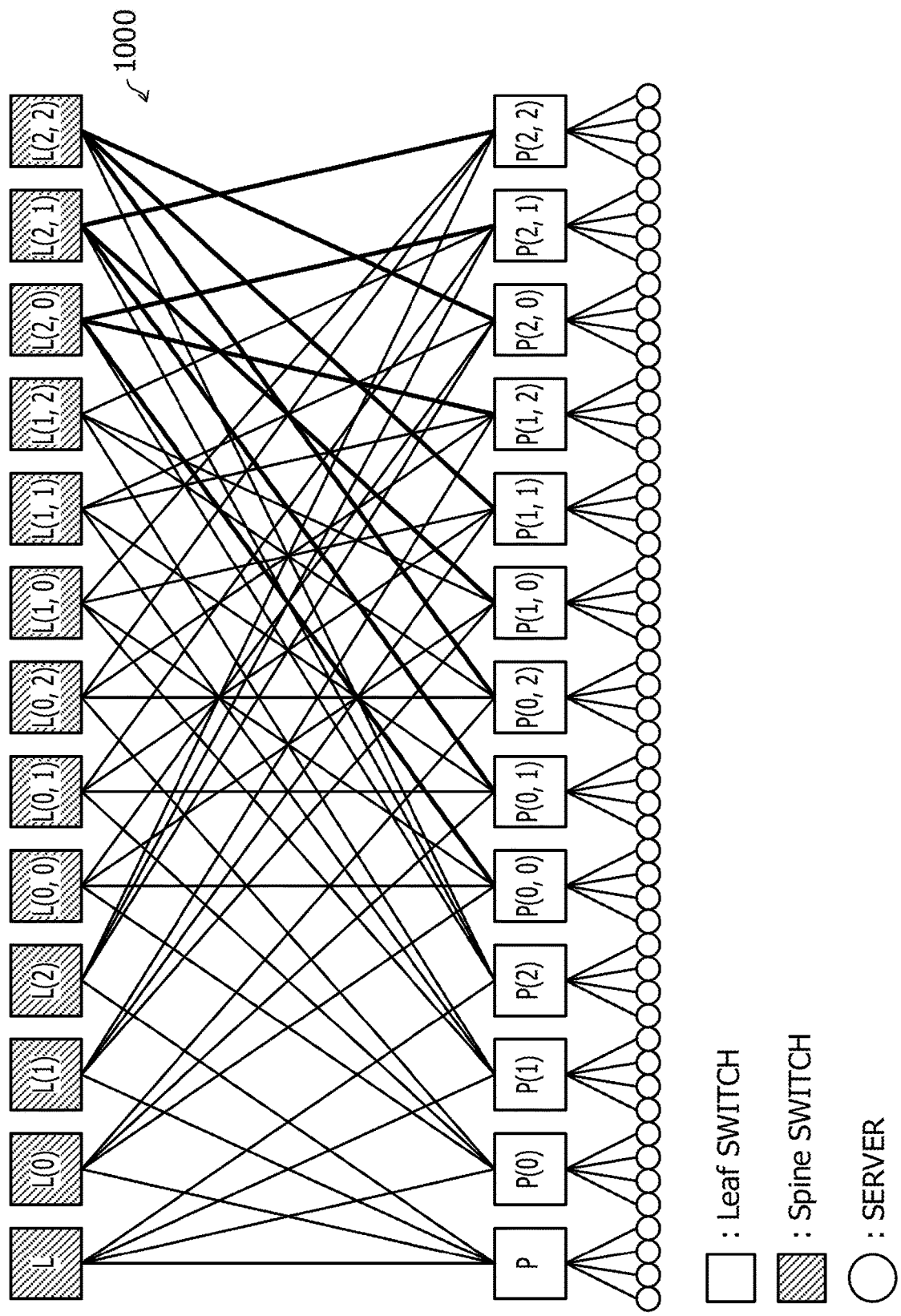
FIG. 32 is a diagram illustrating a channel that is used in a case where the slope is 2.

FIG. 32 is a diagram illustrating a channel that is used in a case where the slope is 2. In FIG. 32, the channel that is used in the case where the slope is 2 is a channel that is indicated by a bold line. As described with reference to FIG. 28, in the case where the slope is 2, the spine switch L(2, 0), the spine switch L(2, 1), and the spine switch L(2, 2) are used.

The all reducing that is performed using each spine switch can be performed in the same manner as the all reducing that is performed using each operating switch. Therefore, in the same manner as the communication that is performed using the first communication table, communication can be performed in such a manner that the channel contention does not occur.

Returning to the description with reference to FIG. 23, the second generation unit 3013 stores the second communication table that is generated in Step S31, in the communication table storage unit 303 (Step S33). Then, the processing returns to the invoking processing. It is noted that the second communication table is a communication table for the all reducing and has the same format as the first communication table because the second communication table is generated with the same method as the first communication table. However, because the all reducing that is realized with the second communication table is all reducing that is performed using the spine switch which corresponds to the first slope, the communication information is stored for every spine switch that corresponds to the first slope.

Figure 33:
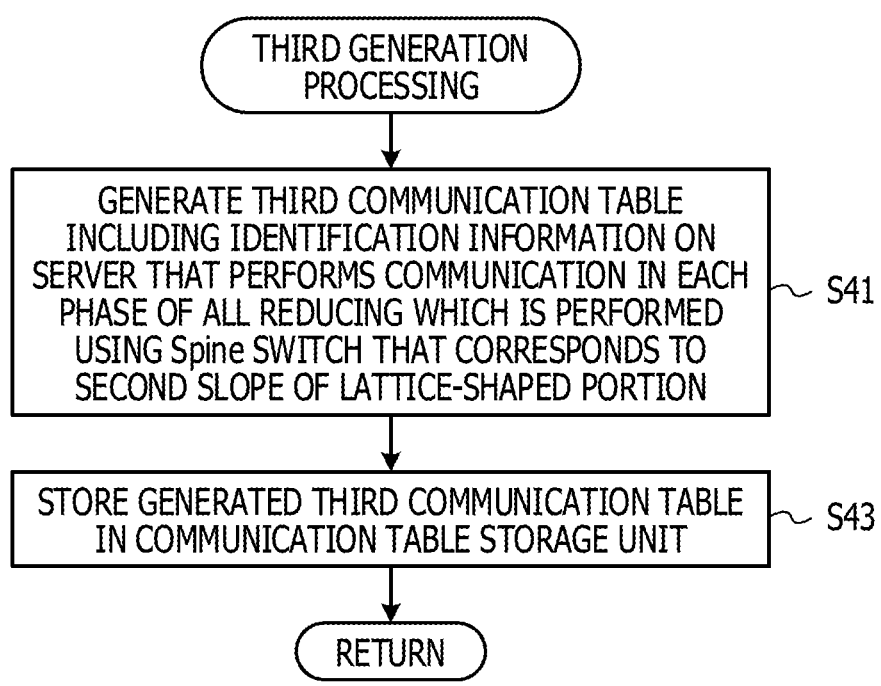
FIG. 33 is a diagram illustrating a processing flow for third generation processing.

Next, third generation processing will be described with reference to FIGS. 33 to 38. FIG. 33 is a diagram illustrating a processing flow for the third generation processing.

The third generation unit 3015 generates the third communication table including the information on the server that performs communication in each phase of the all reducing which is performed using the spine switch that corresponds to a second slope of the lattice-shaped portion (Step S41 in FIG. 33).

The second slope is a slope that is different from the first slope. For example, in the case where the first slope is ∞, the second slope is 0, 1, or 2. In this manner, the all reducing is performed two times with a different slope at each time, each representative server can have a result of the all reducing.

Figure 34:
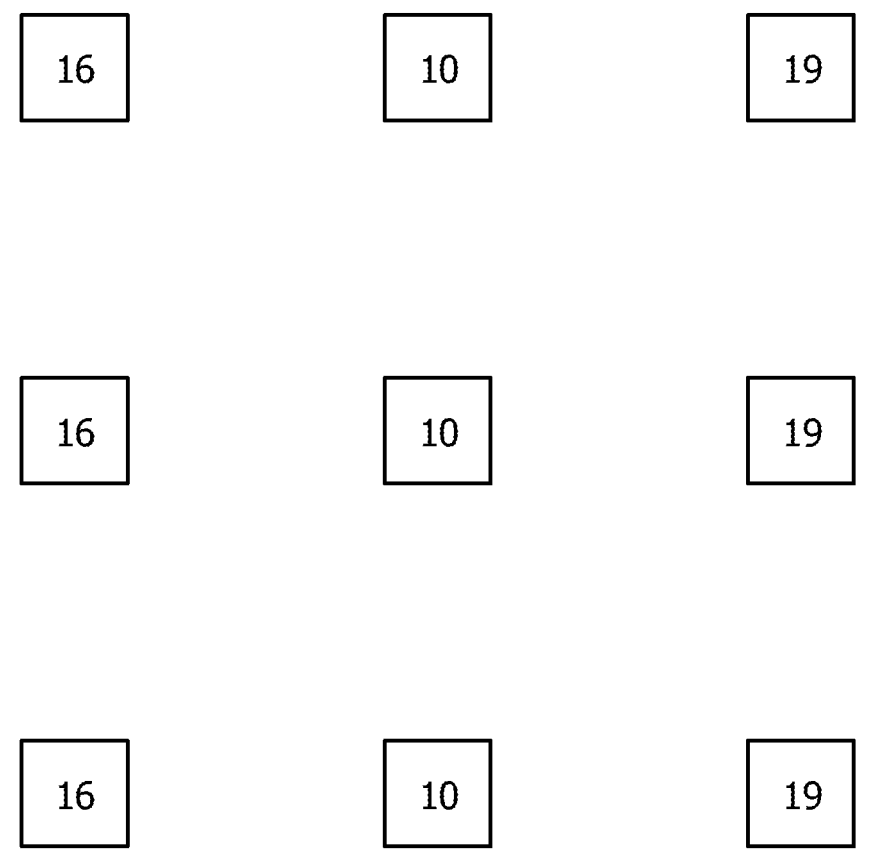
Figure 37:
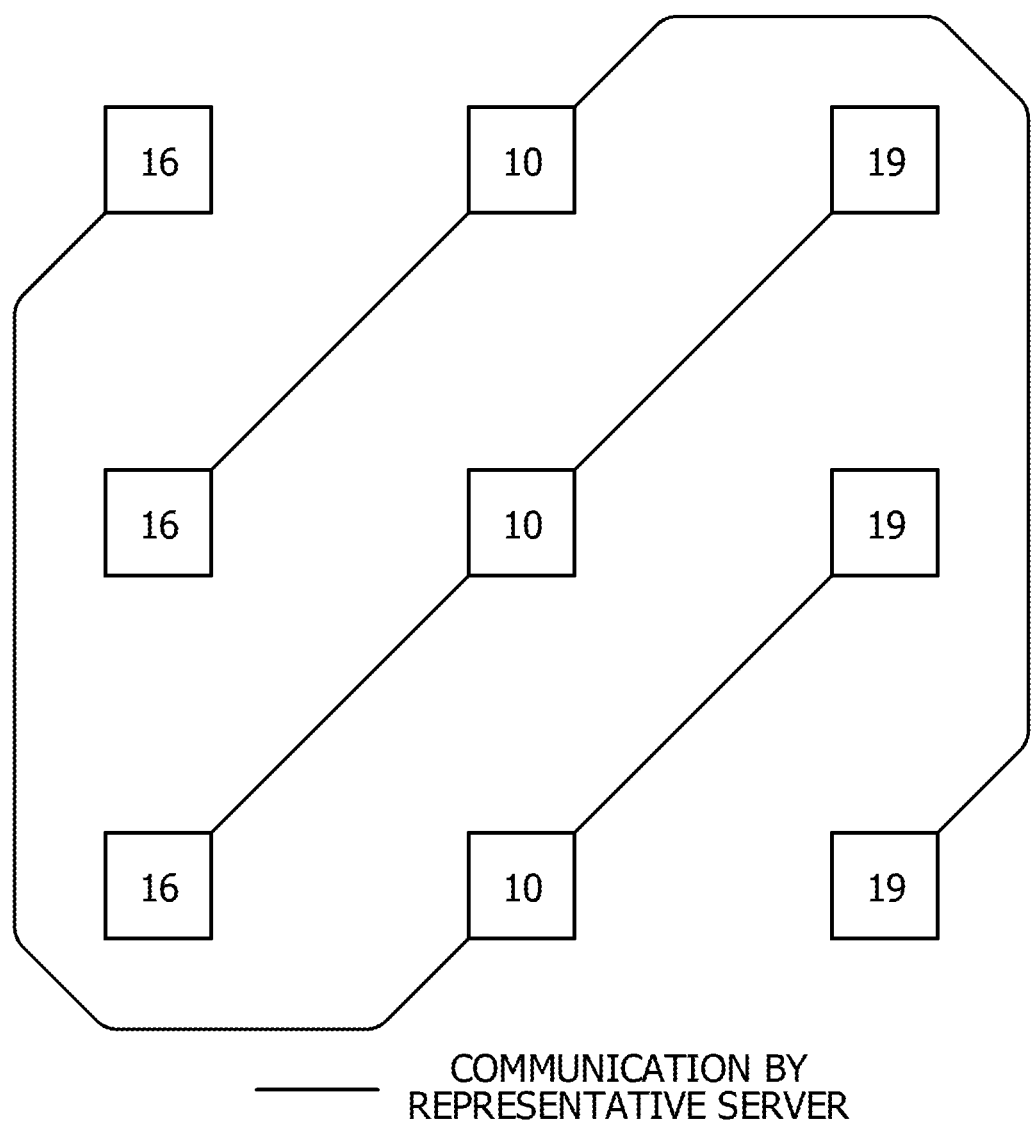
FIG. 37 is a diagram for describing the communication that is performed using the third communication table.
Figure 38:
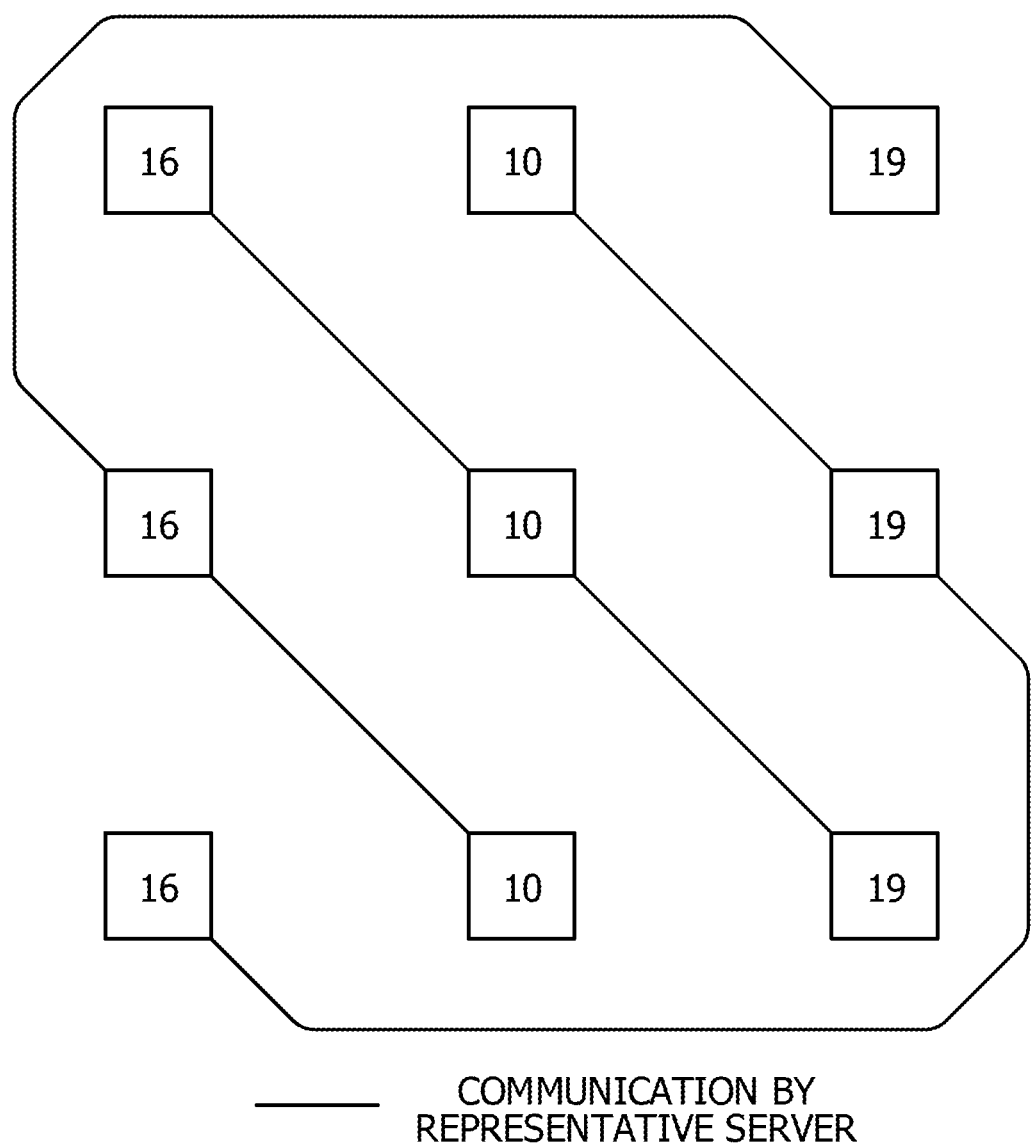
FIG. 38 is a diagram for describing the communication that is performed using the third communication table.

For example, it is assumed that the communication is performed using the second communication table that is generated in the case where the first slope is ∞, and then each representative server has a value that is illustrated in FIG. 34. In a case where the second slope is 0, because a sum of values that a representative server connected to each spine switch which corresponds to the second slope has is 45 as illustrated in FIG. 35, the representative itself performs the communication using the third communication table and then has a value of "45" as illustrated in FIG. 36. In a case where the second slope is 1, because the sum of values that a representative server connected to such spine switch which corresponds to the second slope has is 45 as illustrated in FIG. 37, the representative server itself performs the communication using the third communication table and then has the value of "45" as illustrated in FIG. 36. In a case where the second slope is 2, because the sum of values that a representative server connected to a spine switch which corresponds to the second slope has is 45 as illustrated in FIG. 38, the representative itself performs the communication using the third communication table and then has the value of "45" as illustrated in FIG. 36.

The all reducing that is performed using each spine switch can be performed in the same manner as the all reducing that is performed using each operating switch. Therefore, as is the case with the all reducing that is performed using the first communication table, the communication can be performed in such a manner that the channel contention does not occur.

Returning to the description with reference to FIG. 33, the third generation unit 3015 stores the third communication table that is generated in Step S41, in the communication table storage unit 303 (Step S43). Then, the processing returns to the invoking processing. It is noted that the third communication table is a communication table for the all reducing and has the same format as the first communication table because the third communication table is generated with the same method as the first communication table. However, because the all reducing that is realized with the third communication table is all reducing that is performed using the spine switch which corresponds to the second slope, the communication information is stored for every spine switch that corresponds to the second slope.

Figure 39:
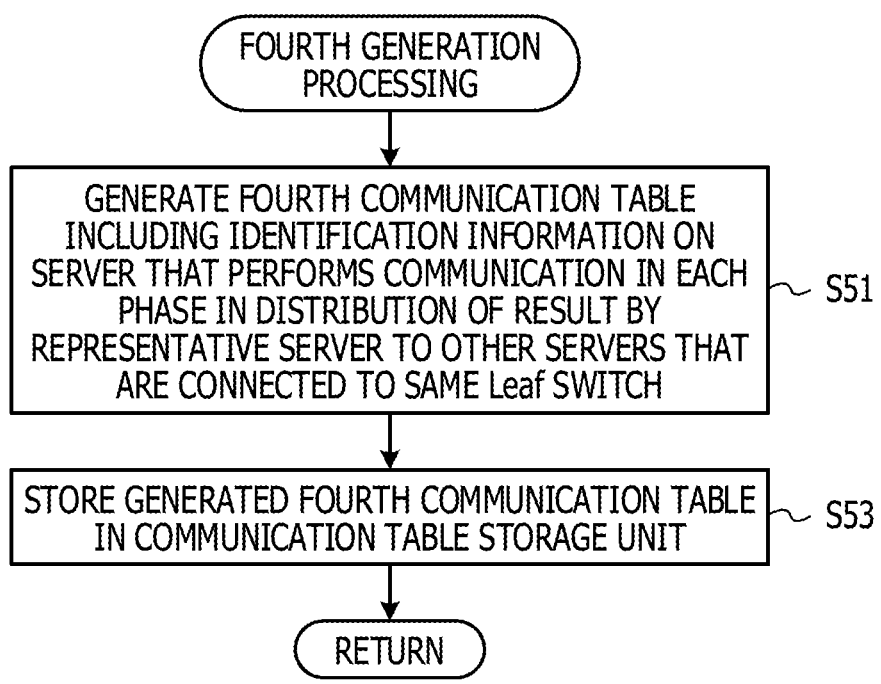
FIG. 39 is a diagram illustrating fourth generation processing.

Next, the fourth generation processing will be described with reference to FIGS. 39 to 44. FIG. 39 is a diagram illustrating a processing flow for the fourth generation processing.

The fourth generation unit 3017 generates the fourth communication table that includes the information on the server that performs the communication in each phase in distribution of a result by each representative server to other servers that are connected to the same leaf switch as the representative server (Step S51 in FIG. 39).

Figure 40:
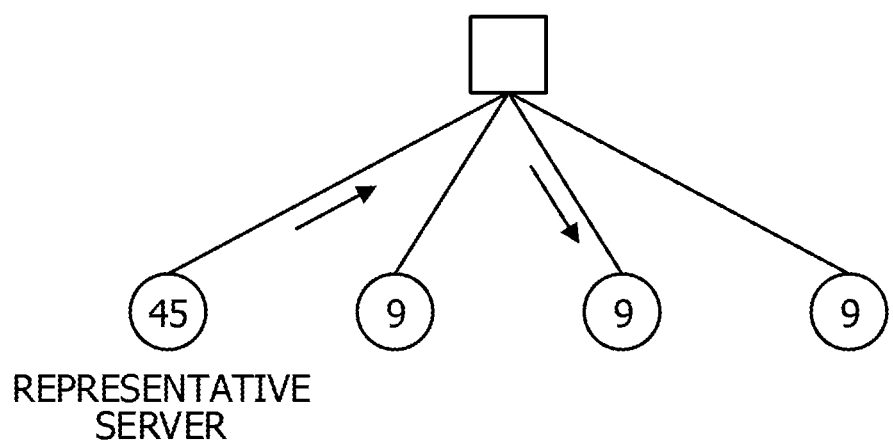
FIG. 40 is a diagram for describing distribution of a result that is realized with a fourth communication table.
Figure 41:
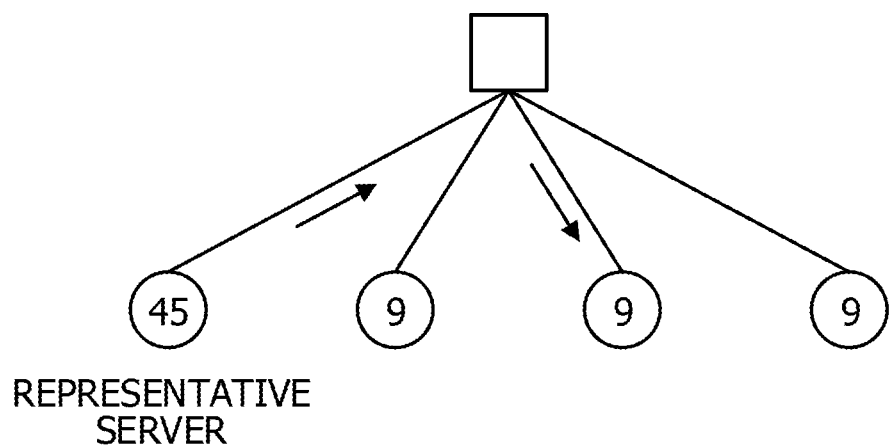
FIG. 41 is a diagram for describing the distribution of the result that is realized with the fourth generation table.
Figure 42:
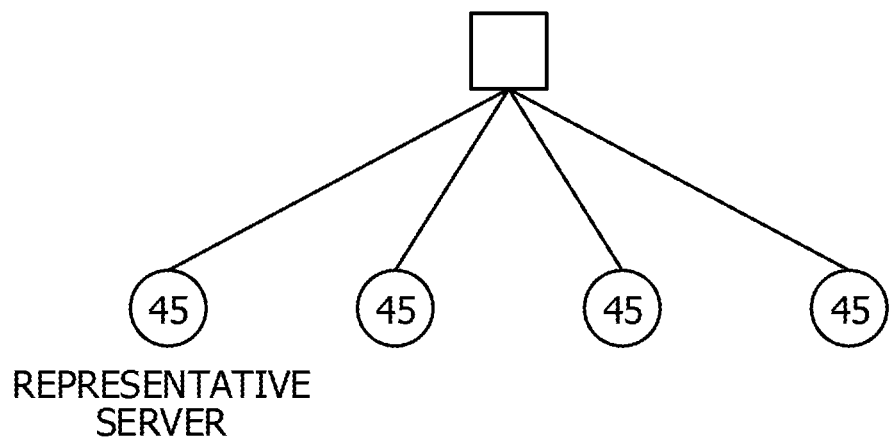
FIG. 42 is a diagram for describing the distribution of the result that is realized with the fourth communication table.

The result of the distribution that is realized with the fourth communication table will be described with reference to FIGS. 40 to 42. In FIGS. 40 to 42, as one example, one leaf switch and four servers that are connected to the leaf switch are illustrated and a server at the leftmost position is a representative server. To begin with, as illustrated in FIG. 40, the representative server transmits a value of "45" to the second server from the right.

When this is done, as illustrated in FIG. 41, the representative server and the second server from the right have the value of "45," and the first server from the right and the third server from the right have a value of "9." Then, as illustrated in FIG. 41, the representative server transmits the value of "45" to the third server from the right, and the second server from the right transmits the value of "45" to the first server from the right.

When this is done, as illustrated in FIG. 42, each server has the value of "45" that is the result of the all reducing. As described above, the distribution of the result is realized with the fourth communication table. The number of phases is 2, and in any phase, a link over which a plurality of packets are transmitted at the same time in the same direction is not present, the channel contention does not occur.

Figure 43:
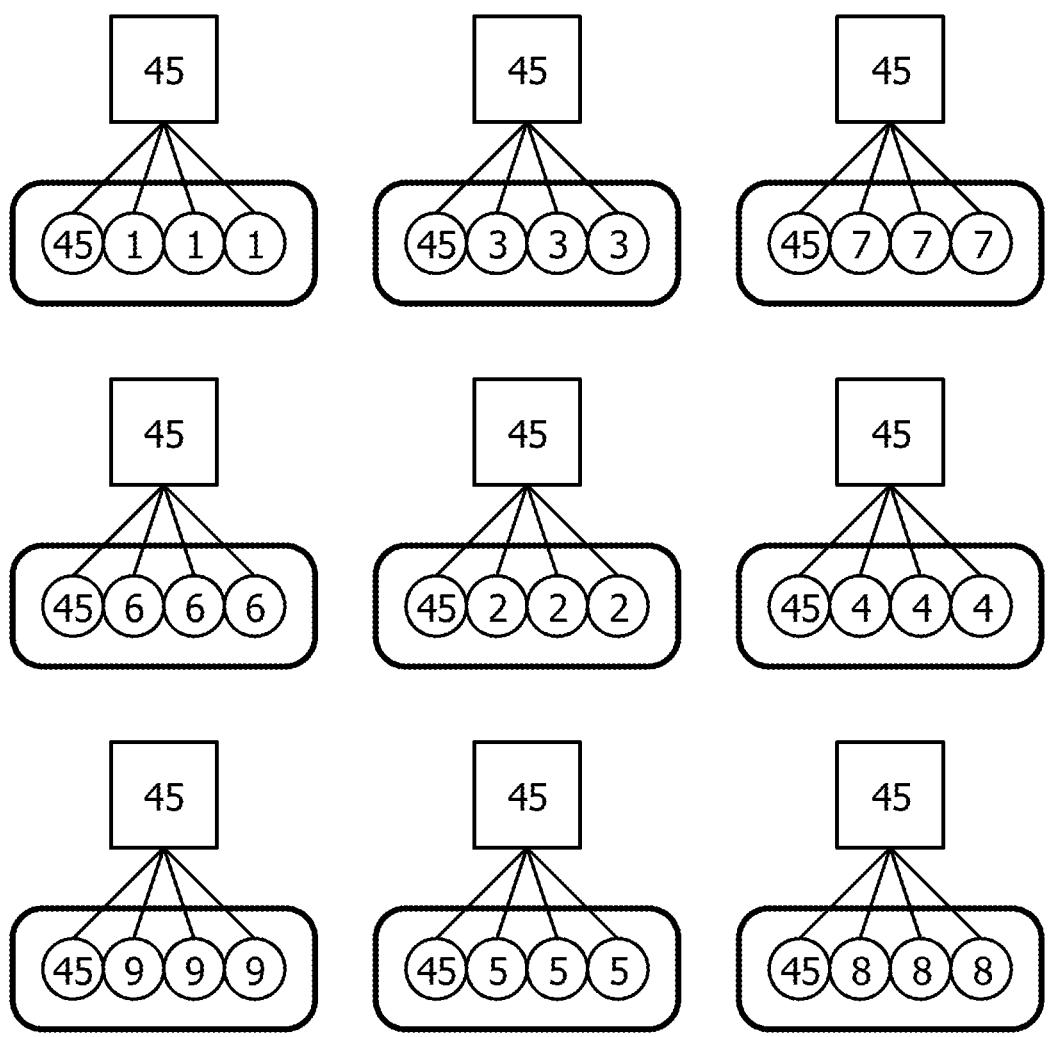
FIG. 43 is a diagram for describing the distribution of the result that is realized with the fourth communication table.
Figure 44:
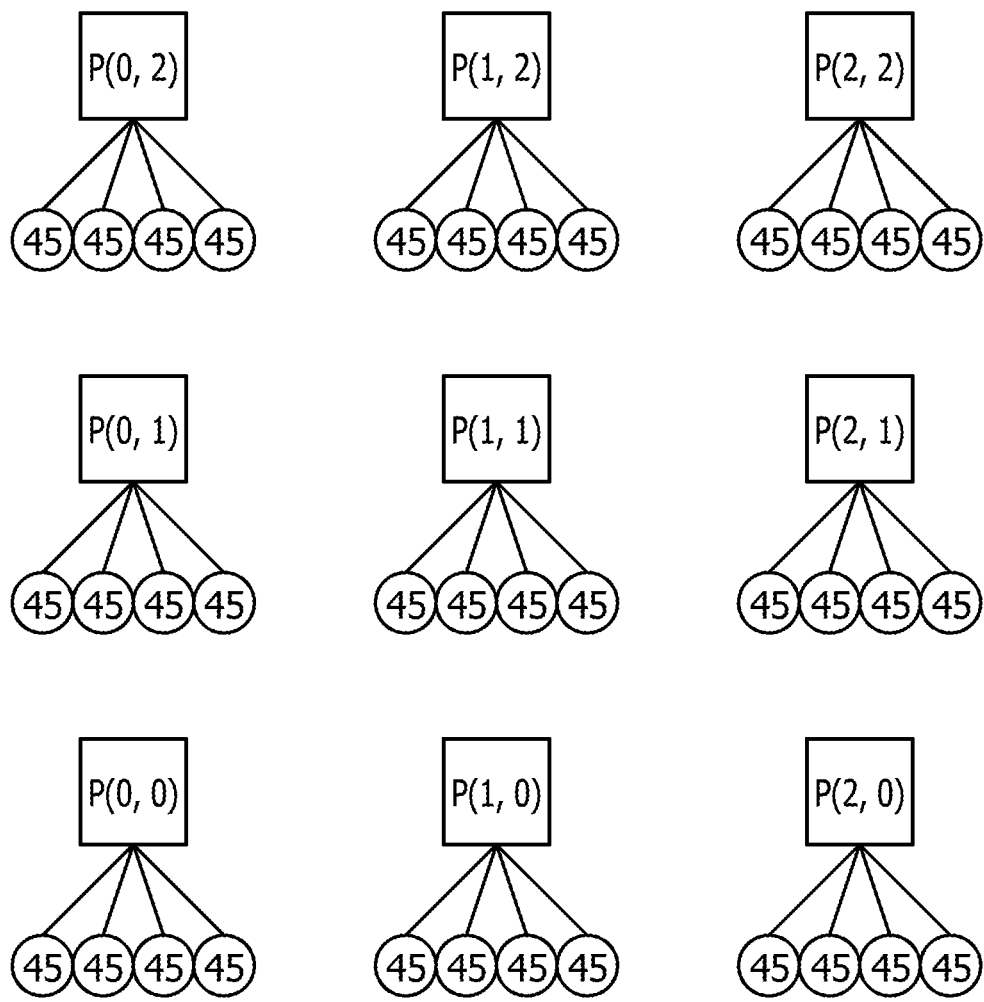
FIG. 44 is a diagram for describing the distribution of the result that is realized with the fourth communication table.

FIG. 43 is a diagram illustrating an example of a value that the server which is connected to the operating switch has after performing the communication using the third communication table. One server has the value of "45" for each operating switch, and this server is a representative server. A value is transmitted from the representative server to other servers that are connected to the same leaf switch. As a result, as illustrated in FIG. 44, all servers that are connected to the operating switch have the value of "45."

Returning to the description with reference to FIG. 39, the fourth generation unit 3017 stores the fourth communication table that is generated in Step S51, in the communication table storage unit 303 (Step S53). Then, the processing returns to the invoking processing. It is noted that in the fourth communication table, the communication information for the distribution of the result in each operating switch is stored in the same format as the first communication table that is illustrated in FIG. 19, and thus that a detailed description thereof is omitted here.

Next, processing that is performed by a server according to the first embodiment will be described with reference to FIGS. 45 and 46. The present processing is processing that is performed by each server that receives the first to fourth communication tables from the management apparatus 3.

Figure 45:
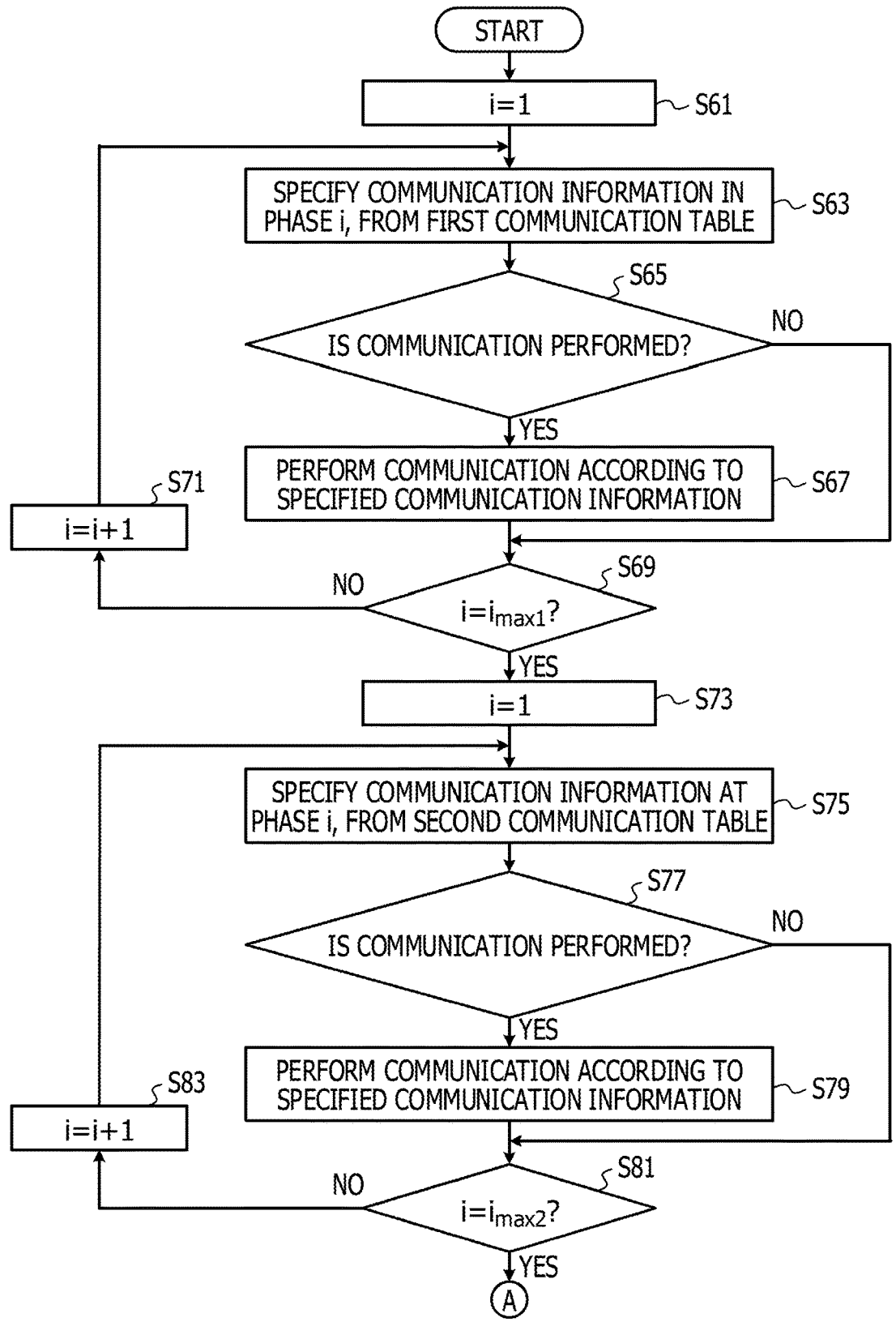
FIG. 45 is a diagram illustrating a processing flow for processing that is performed by the server according to the first embodiment.

FIG. 45 is a diagram illustrating a processing flow for the processing that is performed by the server according to the first embodiment.

The first communication unit 1011 in the server sets a value i, which represents a phase number, to 1 (Step S61 in FIG. 45).

The first communication unit 1011 specifies communication information in a phase i from the first communication table that is stored in the communication table storage unit 103 (Step S63).

The first communication unit 1011 determines whether or not the server (that is, the server that performs the present processing) to which the first communication unit 1011 belongs performs the communication in a phase i (Step S65). Whether or not the server to which the first communication unit 1011 belongs performs the communication in the phase i is determined depending on whether or not the specified communication information is included in the identification information on the server to which the first communication unit 1011.

In a case where the server to which the first communication unit 1011 belongs does not perform the communication in the phase i (No loop in Step S65), the processing proceeds to Step S69. On the other hand, in a case where the server to which the first communication unit 1011 belongs performs the communication in the phase i (Yes loop in Step S65), the first communication unit 1011 performs the communication according to the communication information that is specified in Step S63 (Step S67).

As described above, the communication that is performed according to the first communication table is all-reducing communication between servers that are connected to the same leaf switch, and a server that receives a value from another server performs an arithmetic operation relating to the all reducing.

The first communication unit 1011 determines whether or not $i=i_{max1}$ is established (Step S69). $i_{max1}$ is a maximum value of the phase number of the communication that is performed according to the first communication table. In a case where $i=i_{max1}$ is not established (No loop in Step S69), the first communication unit 1011 increments i by 1 (Step S71). Then, the processing proceeds to Step S63. It is noted that ending of the phase is checked by barrier synchronization.

On the other hand, in a case where $i=i_{max1}$ is established (Yes loop in Step S69), the second communication unit 1013 sets the variable i, which represents the phase number, to 1 (Step S73).

The second communication unit 1013 specifies the communication information in the phase i from the second communication table that is stored in the communication table storage unit 103 (Step S75).

The second communication unit 1013 determines whether or not the server (that is, the server that performs the present processing) to which the second communication unit 1013 belongs performs the communication in the phase i (Step S77). Whether or not the server to which the second communication unit 1013 belongs performs the communication in the phase i is determined depending on whether or not the specified communication information is included in the identification information on the server to which the second communication unit 1013.

In a case where the server to which the second communication unit 1013 belongs does not perform the communication in the phase i (No loop in Step S77), the processing proceeds to Step S81. On the other hand, in a case where the server to which the second communication unit 1013 belongs performs the communication in the phase i (Yes loop in Step S77), the second communication unit 1013 performs the communication according to the communication information that is specified in Step S75 (Step S79).

As described above, the communication table that is performed according to the second communication table is all-reducing communication that is performed using the spine switch which corresponds to the first slope, and a server that receives a value from another server performs the arithmetic operation relating to the all reducing.

The second communication unit 1013 determines whether or not $i=i_{max2}$ is established (Step S81). Imax2 is a maximum value of the phase number of the communication that is performed according to the second communication table. In a case where $i=i_{max2}$ is not established (No loop in Step S81), the second communication unit 1013 increments i by 1 (Step S83). Then, the processing proceeds to Step S75. It is noted that the ending of the phase is checked by the barrier synchronization.

Figure 46:
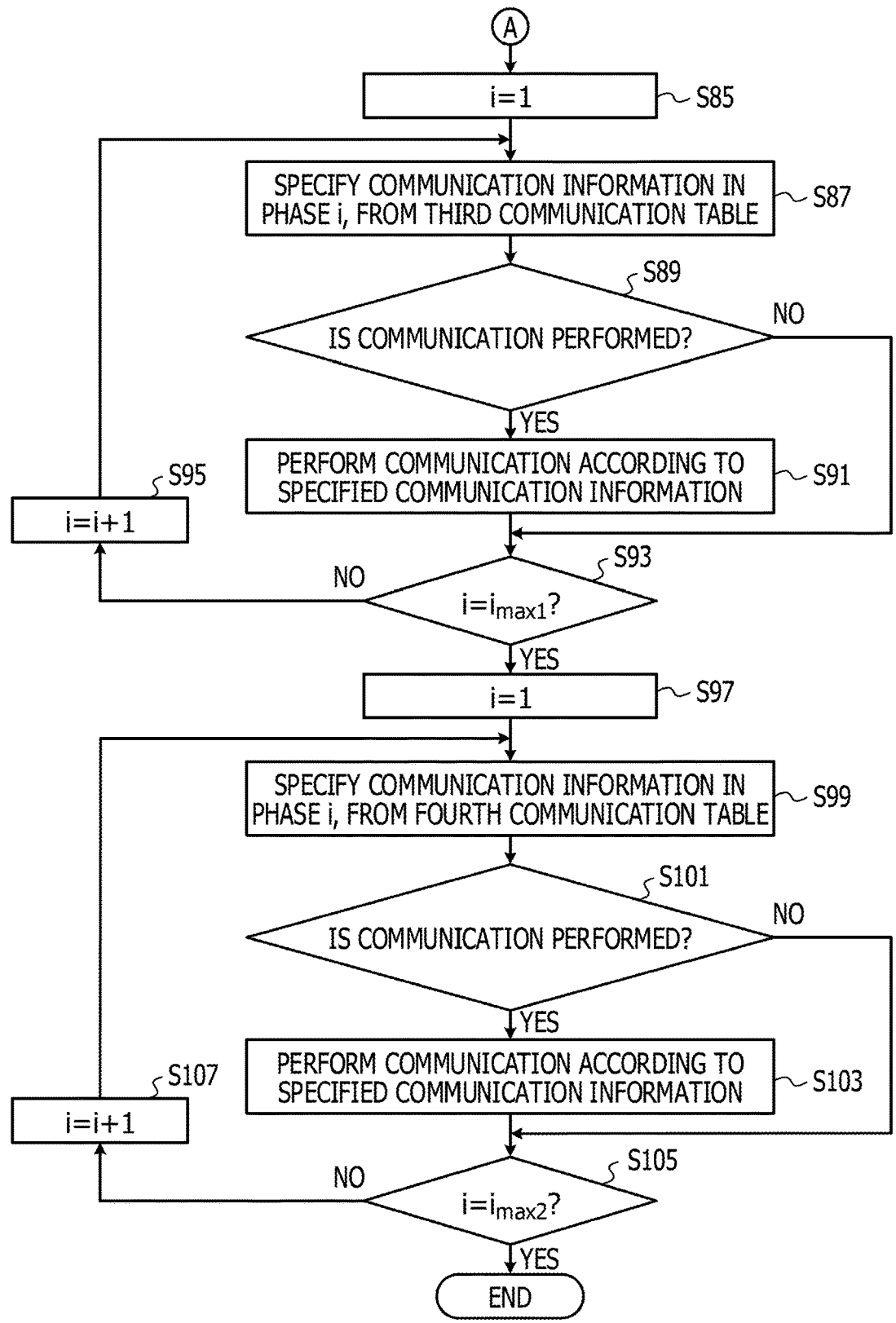
FIG. 46 is a diagram illustrating a processing flow for the processing that is performed by the server according to the first embodiment.

On the other hand, in a case where $i=i_{max2}$ is established (Yes loop in Step S81), the processing proceeds to Step S85 in FIG. 46 via a terminal A.

A description with reference to FIG. 46 is provided. The third communication unit 1015 sets the variable i, which represents the phase number, to 1 (Step S85 in FIG. 46).

The third communication unit 1015 specifies the communication information in the phase i, from the third communication table that is stored in the communication table storage unit 103 (Step S87).

The third communication unit 1015 determines whether or not the server (that is, the server that performs the present processing) to which the third communication unit 1015 belongs performs the communication in the phase i (Step S89). Whether or not the server to which the third communication unit 1015 belongs performs the communication in the phase i is determined depending on whether or not the specified communication information is included in the identification information on the server to which the third communication unit 1015.

In a case where the server to which the third communication unit 1015 belongs does not perform the communication in the phase i (No loop in Step S89), the processing proceeds to Step S93. On the other hand, in a case where the server to which the third communication unit 1015 belongs performs the communication in the phase i (Yes loop in Step S89), the third communication unit 1015 performs the communication according to the communication information that is specified in Step S87 (Step S91).

As described above, the communication table that is performed according to the third communication table is all-reducing communication that is performed using the spine switch which corresponds to the second slope, and a server that receives a value from another server performs the arithmetic operation relating to the all reducing.

The third communication unit 1015 determines whether or not $i=i_{max3}$ is established (Step S93). $i_{max3}$ is a maximum value of the phase number of the communication that is performed according to the third communication table. In a case where $i=i_{max3}$ is not established (No loop in Step S93), the third communication unit 1015 increments i by 1 (Step S95). Then, the processing proceeds to Step S87. It is noted that the ending of the phase is checked by the barrier synchronization.

On the other hand, in a case where $i=i_{max3}$ is established (Yes loop in Step S93), the fourth communication unit 1017 sets the variable i, which represents the phase number, to 1 (Step S97).

The fourth communication unit 1017 specifies the communication information in the phase i, from the fourth communication table that is stored in the communication table storage unit 103 (Step S99).

The fourth communication unit 1017 determines whether or not the server (that is, the server that performs the present processing) to which the fourth communication unit 1017 belongs performs the communication in the phase i (Step S101). Whether or not the server to which the fourth communication unit 1017 belongs performs the communication in the phase i is determined depending on whether or not the specified communication information is included in the identification information on the server to which the fourth communication unit 1017.

In a case where the server to which the fourth communication unit 1017 belongs does not perform the communication in the phase i (No loop in Step S101), the processing proceeds to Step S105. On the other hand, in a case where the server to which the fourth communication unit 1017 belongs performs the communication in the phase i (Yes loop in Step S101), the fourth communication unit 1017 performs the communication according to the communication information that is specified in Step S99 (Step S103).

As described above, the communication that is performed according to the fourth communication table is for the distribution of the result by the representative server, which has the result of the all reducing, to other servers that are connected to the same leaf switch as the server.

The fourth communication unit 1017 determines whether or not $i=i_{max4}$ is established (Step S105). $i_{max4}$ is a maximum value of the phase number of the communication that is performed according to the fourth communication table. In a case where $i=i_{max4}$ is not established (No loop in Step S105), the fourth communication unit 1017 increments i by 1 (Step S107). Then, the processing proceeds to Step S99. It is noted that the ending of the phase is checked by the barrier synchronization.

On the other hand, in a case where $i=i_{max4}$ is established (Yes loop in Step S105), the processing is ended.

If the processing is performed as described above, the all reducing can be realized by the server that is connected to the operating switch (that is, the leaf switch that is equivalent to a point which is included in the lattice-shaped portion in the limited projective plane). As described above, because the channel contention does not occur in each phase of the communication, it is possible that the all reducing is realized while the communication time is kept from being lengthened.

Furthermore, with the method according to the present embodiment, it is possible that the all reducing is performed with an amount of calculation that is approximately O (log(N)) (N is the number of servers that participate in the all reducing).

Second Embodiment

In the first embodiment, the all-reducing communication is performed using the first communication table, but in a second embodiment, reducing communication is performed using the first communication table.

It is noted that the reducing communication is communication in which any one node has a result of an arithmetic operation that is performed using pieces of data that all target nodes have, and the reducing is such an arithmetic operation. In the reducing that is realized with the first communication table, the communication is performed in such a manner that a representative server connected to a leaf switch other than a representative switch.

Figure 47:
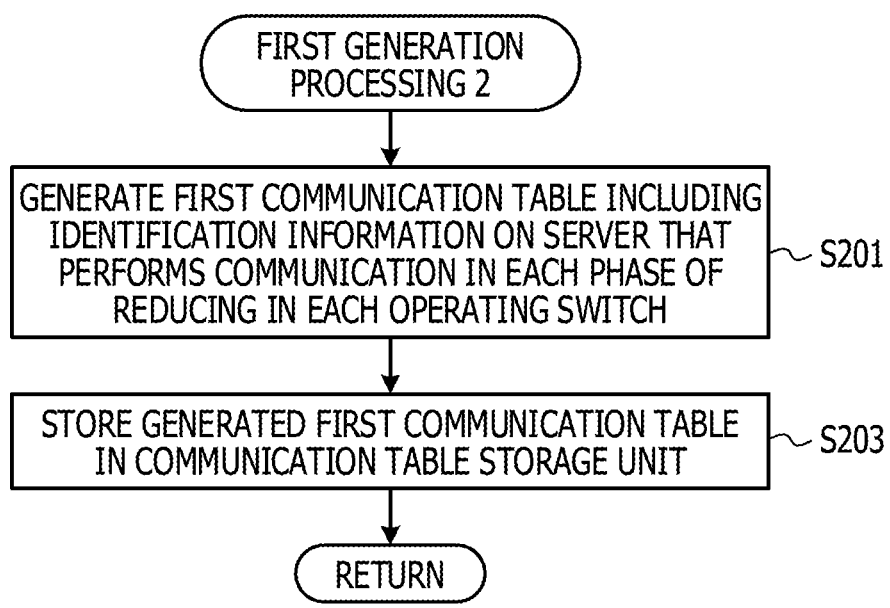
FIG. 47 is a diagram illustrating a processing flow for first generation processing according to a second embodiment.

FIG. 47 is a diagram illustrating a processing flow for first generation processing according to the second embodiment.

The first generation unit 3011 generates the first communication table that includes identification information on the server that performs communication in each phase of the reducing in each operating switch (Step S201 in FIG. 47).

Figure 48:
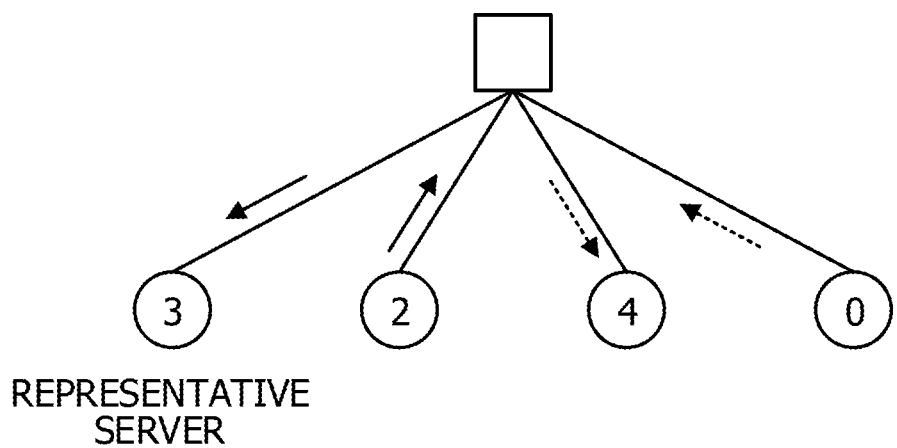
FIG. 48 is a diagram for describing the reducing that is realized with the first communication table according to the second embodiment.
Figure 49:
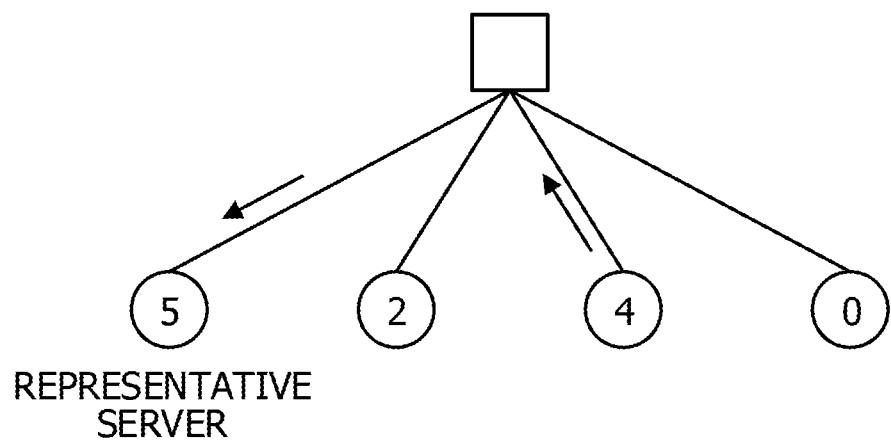
FIG. 49 is a diagram for describing the reducing that is realized with the first communication table according to the second embodiment.
Figure 50:
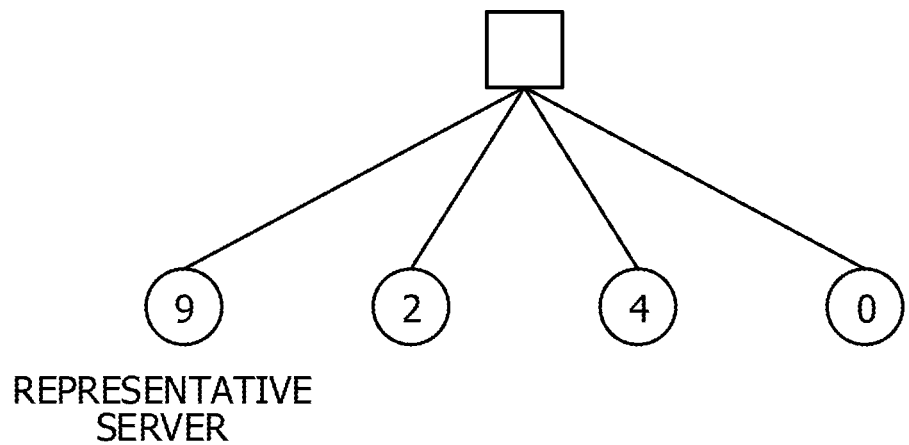
FIG. 50 is a diagram for the reducing that is realized with the first communication table according to the second embodiment.

The reducing that is realized with the first communication table according to the second embodiment will be described with reference to FIGS. 48 to 50. In FIGS. 48 to 50, as one example, one leaf switch and four servers that are connected to the leaf switch are illustrated and a server at the leftmost position is a representative server. The representative server receives a value from another server and performs an arithmetic operation.

To begin with, as illustrated in FIG. 48, a server at the leftmost position transmits a value of "0" to the second server from the right, and the third server from the right concurrently transmits a value of "2" to the representative server. The representative server and the second server from the right perform an arithmetic operation (here, addition).

When this is done, as illustrated in FIG. 49, the representative server has a value of "5" and the second server from the right has a value of "4." Then, the second server from the right transmits a value of "4" to the representative server. The representative server performs the arithmetic operation.

When this is done, as illustrated in FIG. 50, the representative server has a value of "9" that is equivalent to a sum of original four numbers. As described above, the reducing is realized. In any phase, because a link along which a plurality of packets is transmitted at the same time in the same direction is not present, the channel contention does not occur.

Returning to the description with reference to FIG. 47, the first generation unit 3011 stores the first communication table that is generated in Step S201, in the communication table storage unit 303 (Step S203). Then, the processing returns to the invoking processing. It is noted that the first communication table that is generated in the second embodiment is in the same format as the first communication table that is generated in the first embodiment, and thus that a detail description thereof is omitted here.

As described above, if the reducing is performed instead of the all reducing, network traffic can be reduced.

Third Embodiment

In the first embodiment, while the all reducing is performed using the second communication table and while the all reducing is performed using the third communication table, the spine switch that is not used is present. For example, in the case where the first slope is ∞, while the all reducing is performed using the second communication table, the spine switch L(0, 0), the spine switch L(0, 1), the spine switch L(0, 2), the spine switch L(1, 0), the spine switch L(1, 1), the spine switch L(1, 2), the spine switch L(2, 0), the spine switch L(2, 1), and the spine switch L(2, 2) are not used. If another group communication is performed using the spine switch that is not used, the utilization efficiency of the network efficiency in the Latin square Fat-Tree system 1000 can be increased.

Accordingly, a method will be described below in which, while certain all reducing is performed in the lattice-shaped portion, other all reducing is performed and thus the communication time is shortened.

Figure 51:
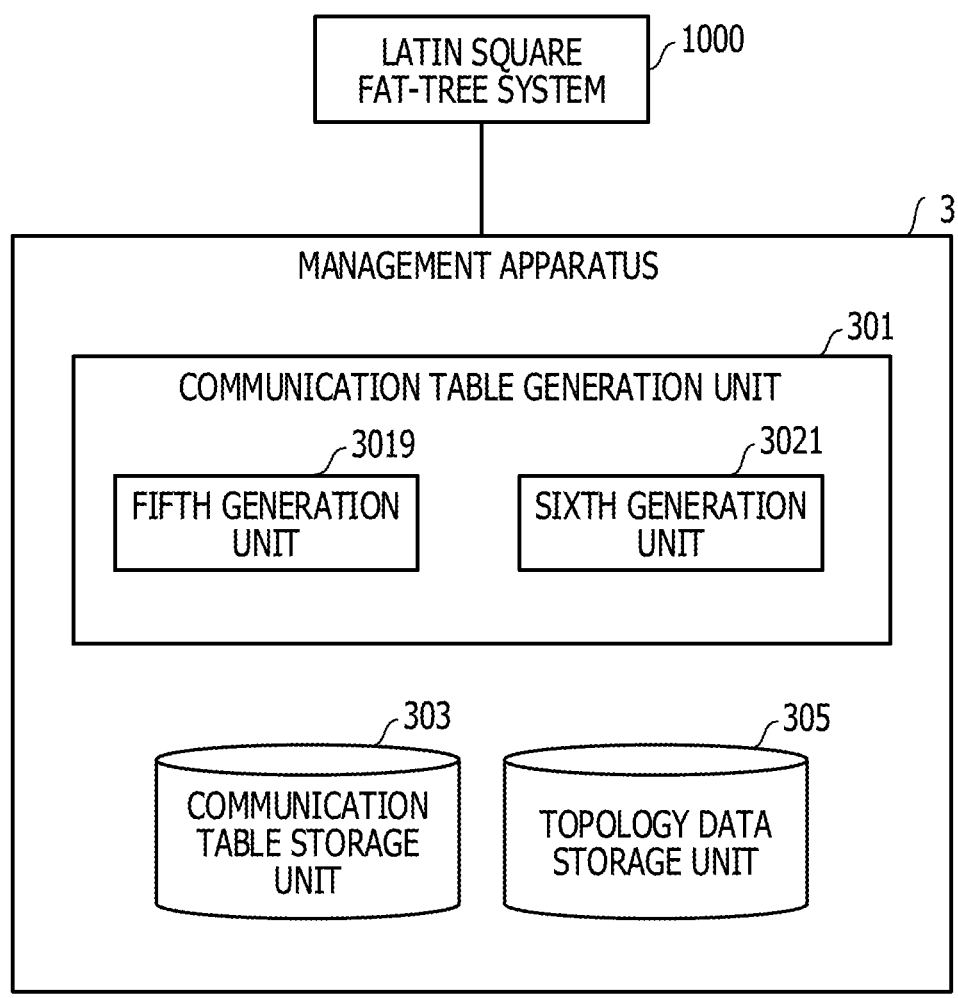
FIG. 51 is a functional block diagram of a management apparatus according to a third embodiment.

As illustrated in FIG. 51, a Latin square Fat-Tree system 1000 according to a third embodiment is connected to a management apparatus 3 through the LAN for management, and communication in the Latin square Fat-Tree system 1000 is managed by the management apparatus 3. The management apparatus 3 has the communication table generation unit 301, the communication table storage unit 303, and the topology data storage unit 305. The communication table generation unit 301 has a fifth generation unit 3019 and a sixth generation unit 3021. For example, a program that is loaded onto the memory 2501 in FIG. 66 is executed by the CPU 2503 in FIG. 66, and thus the communication table generation unit 301 is realized. The communication table storage unit 303 and the topology data storage unit 305, for example, are provided in the memory 2501 or the HDD 2505, which is illustrated in FIG. 66.

The fifth generation unit 3019 generates a fifth communication table based on the information on the network topology of the Latin square Fat-Tree system 1000, which is stored in the topology data storage unit 305, and stores the generated fifth communication table in the communication table storage unit 303. The sixth generation unit 3021 generates a sixth communication table based on the information on the network topology of the Latin square Fat-Tree system 1000, which is stored in the topology data storage unit 305, and stores the generated sixth communication table in the communication table storage unit 303. At a prescribed timing or according to a request, the communication table generation unit 301 transmits the fifth and sixth communication tables, which are stored in the communication table storage unit 303, to the server that is the leaf switch (that is, the leaf switch P(0, 0), the leaf switch P(0, 1), the leaf switch P(0, 2), the leaf switch P(1, 0), the leaf switch P(1, 1), the leaf switch P(1, 2), the leaf switch P(2, 0), the leaf switch P(2, 1), or the leaf switch P(2, 2)) that is equivalent to the point which is included in the lattice-shaped portion of the limited projective plane.

Figure 52:
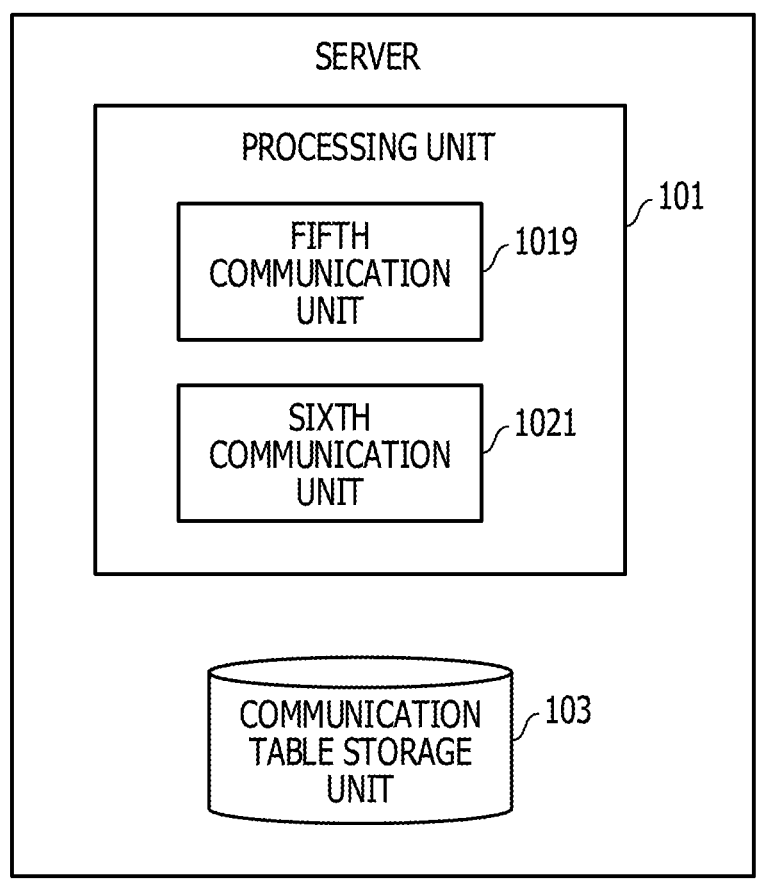
FIG. 52 is a functional block diagram of a server according to the third embodiment.

FIG. 52 is a functional block diagram of a server according to the third embodiment. The server has the processing unit 101 and the communication table storage unit 103. The processing unit 101 has a fifth communication unit 1019 and a sixth communication unit 1021. For example, a program that is loaded onto the memory 2501 in FIG. 66 is executed by the CPU 2503 in FIG. 66, and thus the processing unit 101 is realized. The communication table storage unit 103, for example, is provided in the memory 2501 or the HDD 2505, which is illustrated in FIG. 66.

Included in the communication table storage unit 103 are the fifth and sixth communication tables that are received from the management apparatus 3. The fifth communication unit 1019 performs communication according to the fifth communication table that is stored in the communication table storage unit 103. The sixth communication unit 1021 performs communication according to the sixth communication table that is stored in the communication table storage unit 103.

Figure 53:
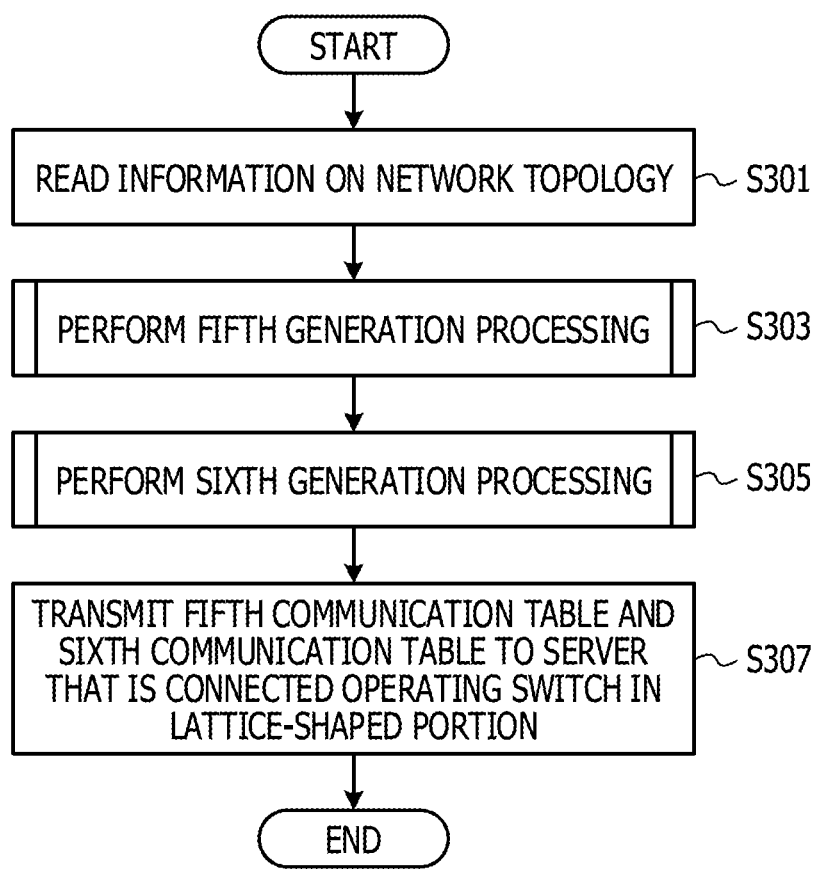
FIG. 53 is a diagram illustrating a processing flow for processing that is performed by the management apparatus according to the third embodiment.

Next, processing that is performed by the management apparatus 3 according to the third embodiment will be described with reference to FIGS. 53 to 60. FIG. 53 is a diagram illustrating a processing flow for processing that is performed by the management apparatus 3 according to the third embodiment.

The communication table generation unit 301 reads the information on the network topology of the Latin square Fat-Tree system 1000 from the topology data storage unit 305 (Step S301 in FIG. 53). The information on the network topology, for example, includes the information on the connection relationship between each of the spine switch and the leaf switch and the server.

Based on the information on the network topology that is read in Step S301, the fifth generation unit 3019 performs fifth generation processing that is processing which generates the fifth communication table (Step S303). The fifth generation processing will be described below.

Based on the information on the network topology that is read in Step S301, the sixth generation unit 3021 performs sixth generation processing that is processing which generates the sixth communication table (Step S305). The sixth generation processing will be described below.

Then, the communication table generation unit 301 reads the fifth and sixth communication tables that are stored in the communication table storage unit 303, and transmits the fifth and sixth communication tables that are read, to each server that is connected to the operating switch (Step S307). Then, the processing is ended.

If the processing is performed as described above, a server that receives the fifth and sixth communication tables can perform the all-reducing communication in a suitable procedure.

Figure 54:
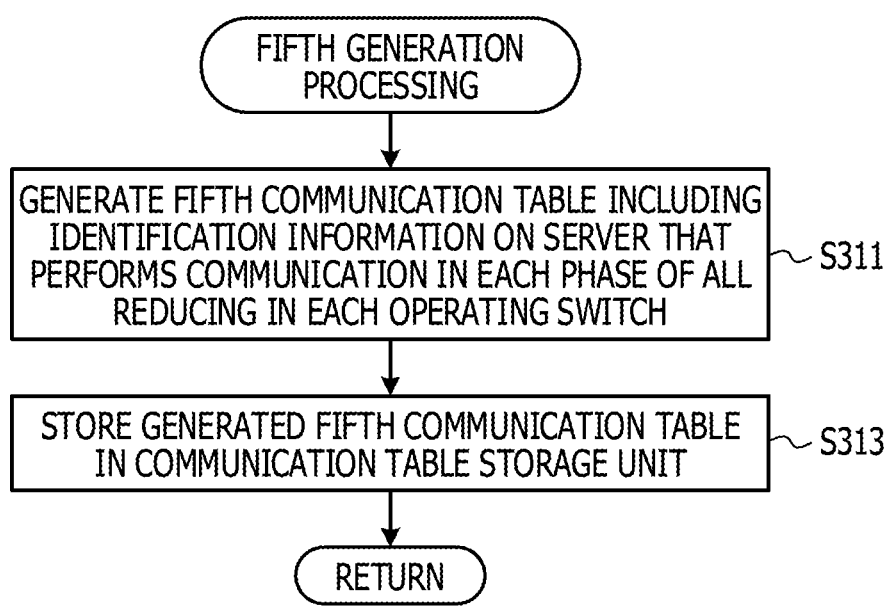
FIG. 54 is a diagram illustrating a processing flow for fifth generation processing.

Next, the fifth generation processing will be described with reference to FIG. 54. FIG. 54 is a diagram illustrating a processing flow for the fifth generation processing.

The fifth generation unit 3019 includes the fifth communication table that includes the identification information on the server that performs the communication in each phase of all reducing in each operating switch (Step S311 in FIG. 54). The processing that is performed in Step S311 is the same as the processing that is performed in Step S21, and thus a detailed description thereof is omitted here.

The fifth generation unit 3019 stores the fifth communication table that is generated in Step S311, in the communication table storage unit 303 (Step S313). Then, the processing returns to the invoking processing.

Figure 55:
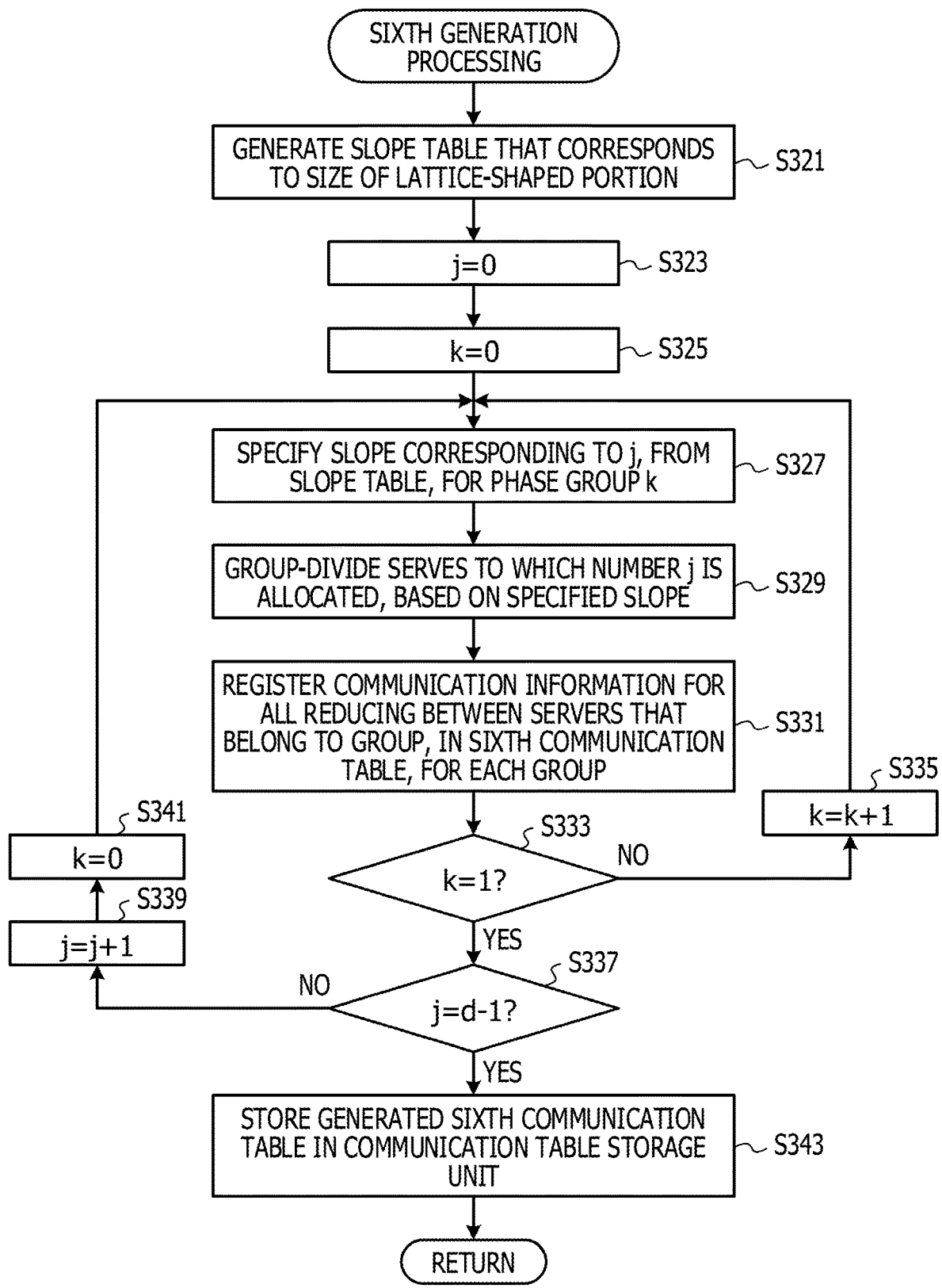
FIG. 55 is a diagram illustrating a processing flow for sixth generation processing.

Next, the sixth generation processing will be described with reference to FIGS. 55 to 60. FIG. 55 is a diagram illustrating a processing flow for the sixth generation processing.

The sixth generation unit 3021 generates a slope table that corresponds to a size (which is 3*3 because the order is 3 in the case of the present embodiment) of the lattice-shaped portion (Step S321 in FIG. 55).

Figure 56:
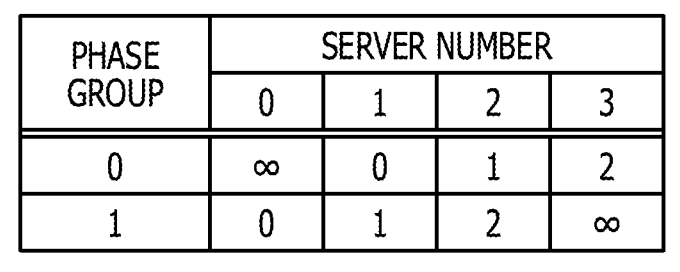

FIG. 56 is a diagram illustrating an example of the slope table in a case where the size of the lattice-shaped portion is 3*3. In an example in FIG. 56, a slope in each phase group, which corresponds to the spine switch that is used by the server for the all-reducing communication, is illustrated. For example, among servers that are connected to the operating switch, a server of which an allocated number is 1 performs the all-reducing communication using the spine switch which corresponds to a slope of 0 in a phase group 0, and performs the all-reducing communication using the spine switch that corresponds to a slope of 1 in a phase group 1. The phase group includes one phase or a plurality of phases.

Because in each phase group, a different slope is allocated to each server, the server itself performs the all-reducing communication using a different spine switch. Therefore, the channel contention does not occur in each phase group. Furthermore, a slope that varies between the phase group 0 and the phase group 1 is allocated to each server. Because each server performs the all reducing two times with a different slope at each time, the server itself can have a result of the all reducing.

As another example, the slope table in a case where the size of the lattice-shaped portion is 5*5 is illustrated in FIG. 57. In a case where the size of the lattice-shaped portion is 5*5, the slope is 0, 1, 2, 3, 4, or ∞. In the same manner as in the example in FIG. 56, in each phase group, a different slope is allocated to each server. Furthermore, a slope that varies between the phase group 0 and the phase group 1 is allocated to each server.

Returning to the description with reference to FIG. 55, the sixth generation unit 3021 sets a variable j, which represents a number that is allocated to a server, as j=0 (Step S323).

The sixth generation unit 3021 sets a variable k, which represents a number of the phase group, as k=0 (Step S325).

For a phase group k, the sixth generation unit 3021 specifies a slope, which corresponds to j, from the slope table (Step S327).

Based on the slope that is specified in Step S327, among servers that are connected to the operating switch, the sixth generation unit 3021 group-divides servers (hereafter referred to as servers "j") to which a number j is allocated, into groups of servers (Step S329).

In the present embodiment, in the case where the slope is 0, the servers to which the number j is allocated are group-divided into a group to which a server "j" that is connected to the leaf switch P(0, 0), a server "j" that is connected to the leaf switch P(1, 0), and a server "j" that is connected to the leaf switch P(2, 0) belong, a group to which a server "j" that is connected to the leaf switch P(0, 1), a server "j" that is connected to the leaf switch P(1, 1), and a server "j" that is connected to the leaf switch P(2, 1) belong, and a group to which a server "j" that is connected to the leaf switch P(0, 2), a server "j" that is connected to the leaf switch P(1, 2), and a server "j" that is connected to the leaf switch P(2, 2) belong.

In the case where the slope is 1, the servers to which the number j is allocated are group-divided into a group to which a server "j" that is connected to the leaf switch P(0, 0), a server "j" that is connected to the leaf switch P(1, 1), and a server "j" that is connected to the leaf switch P(2, 2) belong, a group to which a server "j" that is connected to the leaf switch P(0, 1), a server "j" that is connected to the leaf switch P(1, 2), and a server "j" that is connected to the leaf switch P(2, 0) belong, and a group to which a server "j" that is connected to the leaf switch P(0, 2), a server "j" that is connected to the leaf switch P(1, 0), and a server "j" that is connected to the leaf switch P(2, 1) belong.

In the case where the slope is 2, the servers to which the number j is allocated are group-divided into a group to which a server "j" that is connected to the leaf switch P(0, 0), a server "j" that is connected to the leaf switch P(1, 2), and a server "j" that is connected to the leaf switch P(2, 1) belong, a group to which a server "j" that is connected to the leaf switch P(0, 1), a server "j" that is connected to the leaf switch P(1, 0), and a server "j" that is connected to the leaf switch P(2, 2) belong, and a group to which a server "j" that is connected to the leaf switch P(0, 2), a server "j" that is connected to the leaf switch P(1, 1), and a server "j" that is connected to the leaf switch P(2, 0) belong.

In the case where the slope is ∞, the servers to which the number j is allocated are group-divided into a group to which a server "j" that is connected to the leaf switch P(0, 0), a server "j" that is connected to the leaf switch P(0, 1), and a server "j" that is connected to the leaf switch P(0, 2) belong, a group to which a server "j" that is connected to the leaf switch P(1, 0), a server "j" that is connected to the leaf switch P(1, 1), and a server "j" that is connected to the leaf switch P(1, 2) belong, and a group to which a server "j" that is connected to the leaf switch P(2, 0), a server "j" that is connected to the leaf switch P(2, 1), and a server "j" that is connected to the leaf switch P(2, 2) belong.

Figure 58:
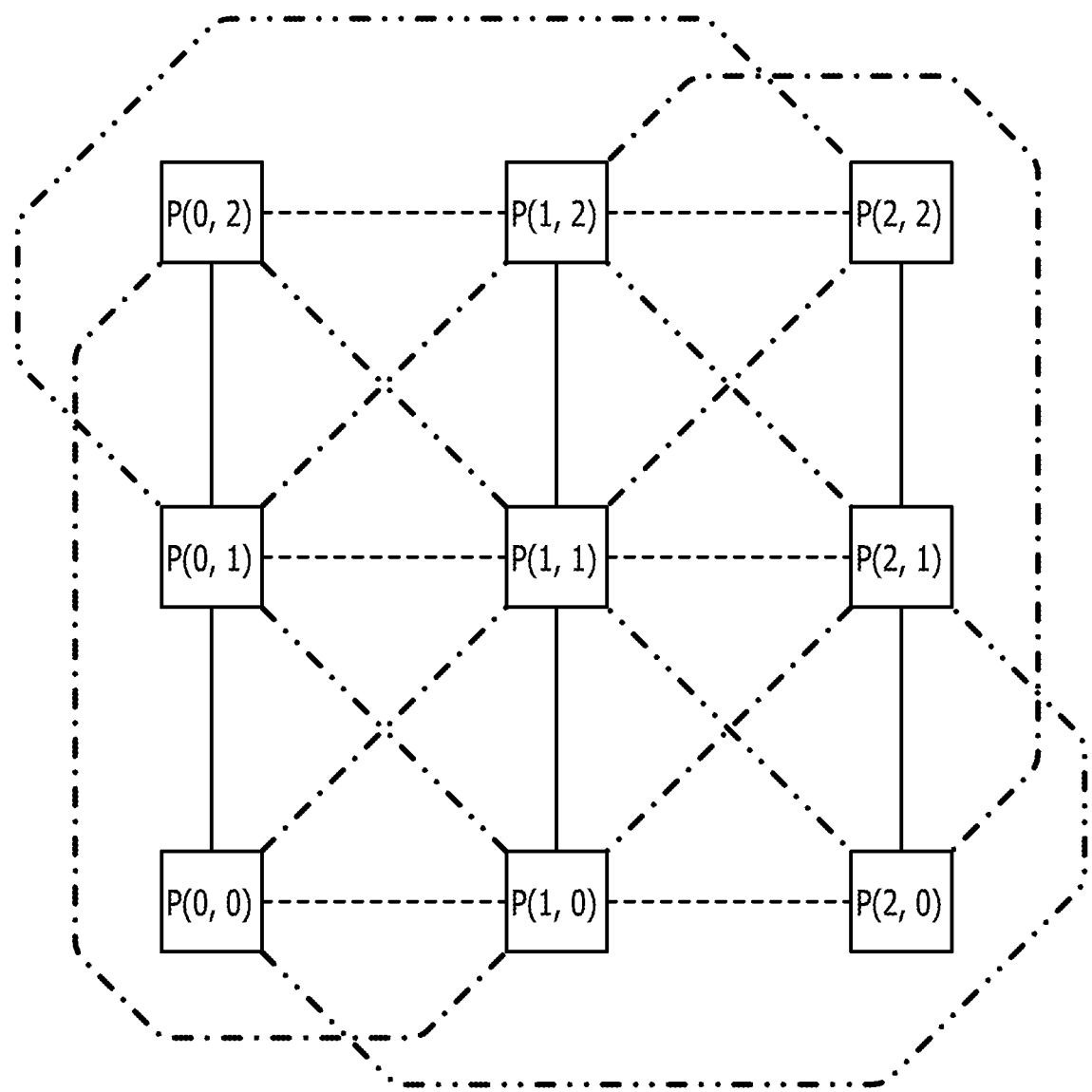
FIG. 58 is a diagram for describing group division.

Then, the all reducing among servers that belongs to the same group is performed. For example, in a case where the slope table is a slope table that is illustrated in FIG. 56, in the phase group 0, the communication is performed as illustrated in FIG. 58. Specifically, a server "0" that is connected to the leaf switch P(0, 0), a server "0" that is connected to the leaf switch P(1, 0), and a server "0" that is connected to the leaf switch P(2, 0) perform the all-reducing communication. A server "0" that is connected to the leaf switch P(0, 1), a server "0" that is connected to the leaf switch P(1, 1), and a server "0" that is connected to the leaf switch P(2, 1) perform the all-reducing communication. A server "0" that is connected to the leaf switch P(0, 2), a server "0" that is connected to the leaf switch P(1, 2), and a server "0" that is connected to the leaf switch P(2, 2) perform the all-reducing communication. A server "1" that is connected to the leaf switch P(0, 0), a server "1" that is connected to the leaf switch P(1, 1), and a server "1" that is connected to the leaf switch P(2, 2) perform the all-reducing communication. A server "1" that is connected to the leaf switch P(0, 1), a server "1" that is connected to the leaf switch P(1, 2), and a server "1" that is connected to the leaf switch P(2, 0) perform the all-reducing communication. A server "1" that is connected to the leaf switch P(0, 2), a server "1" that is connected to the leaf switch P(1, 0), and a server "1" that is connected to the leaf switch P(2, 1) perform the all-reducing communication. A server "2" is connected to the leaf switch P(0, 0), a server "2" that is connected to the leaf switch P(1, 2), and a server "2" that is connected to the leaf switch P(2, 1) perform the all-reducing communication. A server "2" that is connected to the leaf switch P(0, 1), a server "2" that is connected to the leaf switch P(1, 0), and a server "2" that is connected to the leaf switch P(2, 2) perform the all-reducing communication. A server "2" that is connected to the leaf switch P(0, 2), a server "2" that is connected to the leaf switch P(1, 1), and a server "2" that is connected to the leaf switch P(2, 0) perform the all-reducing communication. A server "3" that is connected to the leaf switch P(0, 0), a server "3" that is connected to the leaf switch P(0, 1), and a server "3" that is connected to the leaf switch P(0, 2) perform the all-reducing communication. A server "3" that is connected to the leaf switch P(1, 0), a server "3" that is connected to the leaf switch P(1, 1), and a server "3" that is connected to the leaf switch P(1, 2) perform the all-reducing communication. A server "3" that is connected to the leaf switch P(2, 0), a server "3" that is connected to the leaf switch P(2, 1), and a server "3" that is connected to the leaf switch P(2, 2) perform the all-reducing communication.

Figure 59:
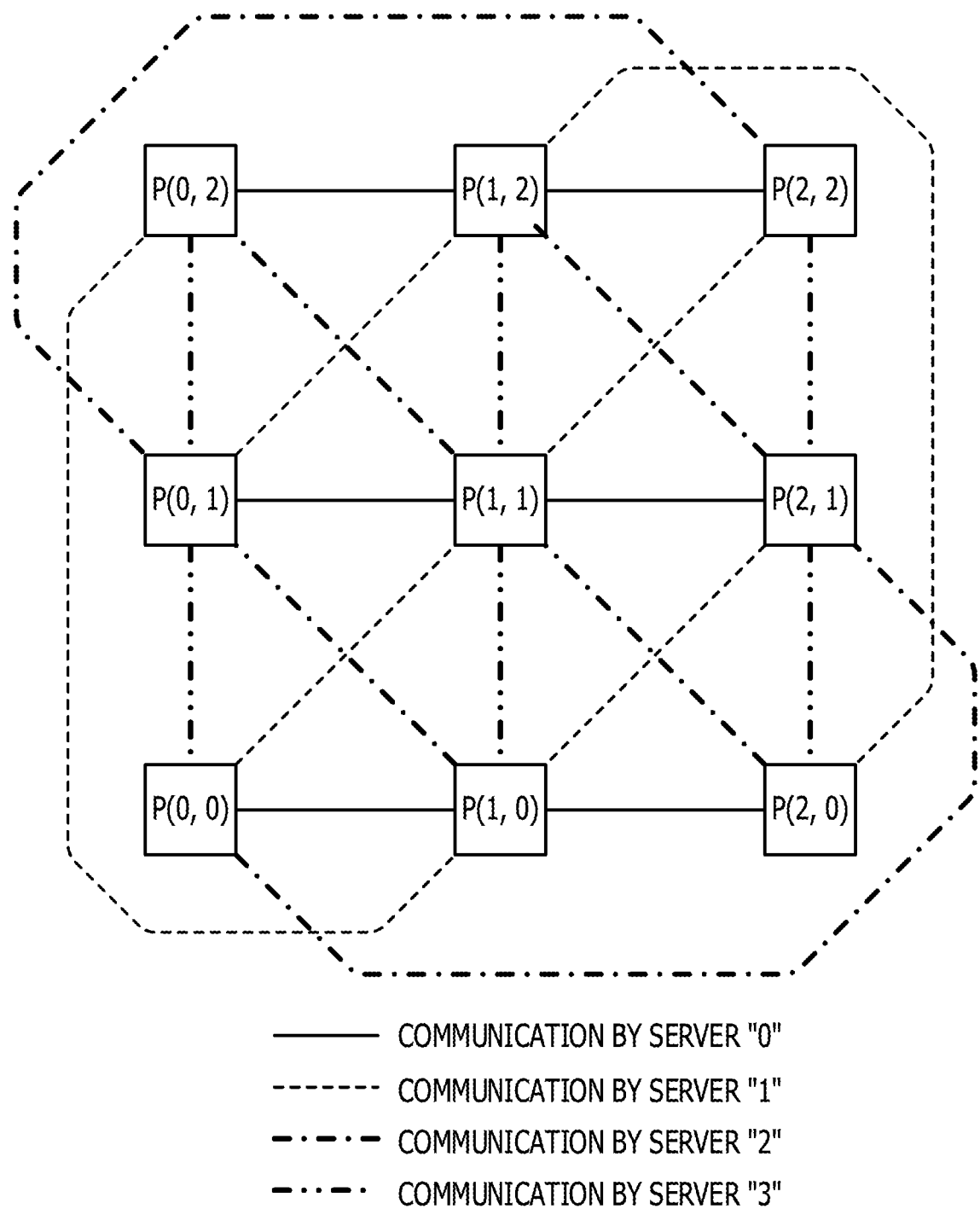
FIG. 59 is a diagram for describing the group division.

Furthermore, for example, in the case where the slope table is a slope table that is illustrated in FIG. 56, in the phase group 1, the communication is performed as illustrated in FIG. 59. Specifically, the server "1" that is connected to the leaf switch P(0, 0), the server "1" that is connected to the leaf switch P(1, 0), and the server "1" that is connected to the leaf switch P(2, 0) perform the all-reducing communication. The server "1" that is connected to the leaf switch P(0, 1), the server "1" that is connected to the leaf switch P(1, 1), and the server "1" that is connected to the leaf switch P(2, 1) perform the all-reducing communication. The server "1" that is connected to the leaf switch P(0, 2), the server "1" that is connected to the leaf switch P(1, 2), and the server "1" that is connected to the leaf switch P(2, 2) perform the all-reducing communication. The server "2" that is connected to the leaf switch P(0, 0), the server "2" that is connected to the leaf switch P(1, 1), and the server "2" that is connected to the leaf switch P(2, 2) perform the all-reducing communication. The server "2" that is connected to the leaf switch P(0, 1), the server "2" that is connected to the leaf switch P(1, 2), and the server "2" that is connected to the leaf switch P(2, 0) perform the all-reducing communication. The server "2" that is connected to the leaf switch P(0, 2), the server "2" that is connected to the leaf switch P(1, 0), and the server "2" that is connected to the leaf switch P(2, 1) perform the all-reducing communication. The server "3" that is connected to the leaf switch P(0, 0), the server "3" that is connected to the leaf switch P(1, 2), and the server "3" that is connected to the leaf switch P(2, 1) perform the all-reducing communication. The server "3" that is connected to the leaf switch P(0, 1), the server "3" that is connected to the leaf switch P(1, 0), and the server "3" that is connected to the leaf switch P(2, 2) perform the all-reducing communication. The server "3" that is connected to the leaf switch P(0, 2), the server "3" that is connected to the leaf switch P(1, 1), and the server "3" that is connected to the leaf switch P(2, 0) perform the all-reducing communication. The server "0" that is connected to the leaf switch P(0, 0), the server "0" that is connected to the leaf switch P(0, 1), and the server "0" that is connected to the leaf switch P(0, 2) perform the all-reducing communication.

The server "0" that is connected to the leaf switch P(1, 0), the server "0" that is connected to the leaf switch P(1, 1), and the server "0" that is connected to the leaf switch P(1, 2) perform the all-reducing communication. The server "0" that is connected to the leaf switch P(2, 0), the server "0" that is connected to the leaf switch P(2, 1), and the server "0" that is connected to the leaf switch P(2, 2) perform the all-reducing communication.

Returning to the description with reference to FIG. 55, for each group that is generated by a result of the group-dividing in Step S329, the sixth generation unit 3021 registers the communication information for the all reducing between servers that belong to the same group, in the sixth communication table (Step S331).

The sixth generation unit 3021 determines whether or not k=1 (Step S333). In a case where k=1 is not established (No loop in Step S333), the sixth generation unit 3021 increments k by 1 (Step S335). Then, the processing returns Step S327.

In a case where k=1 (Yes loop in Step S333), the sixth generation unit 3021 determines whether or not j=d−1 (Step S337). In a case where j=d−1 is not established (No loop in Step S337), the sixth generation unit 3021 increments j by 1 (Step S339) and sets k as k=0 (Step S341). Then, the processing returns Step S327.

In a case where j=d−1 (Yes loop in Step S337), the sixth generation unit 3021 stores the sixth communication table that is generated by the processing performed so far, in the communication table storage unit 303 (Step S343). Then, the processing returns to the invoking processing.

FIG. 60 is a diagram illustrating an example of the sixth communication table. In an example in FIG. 60, the contents of a communication in each phase are illustrated. In the same manner as in FIG. 19, a string of characters such as N000 represents the information on the server (for example, the LID). An arrow indicates transmission of data, and parentheses denote the all reducing. For example, "N000→N010" in a phase 0 means that a server N000 transmits data to a server N010, and "(N010, N020)" in the phase 1 means the all reducing between the server N010 and the server N020. Because three servers participate in the all reducing, the number of phases that are included in one phase group is 3. The sixth communication table is basically generated with the same method as the first communication table, and thus a detailed description thereof is omitted here.

Next, processing that is performed by a server according to the third embodiment will be described with reference to FIG. 61. The present processing is processing that is performed by each server that receives the fifth and sixth communication tables from the management apparatus 3.

Figure 61:
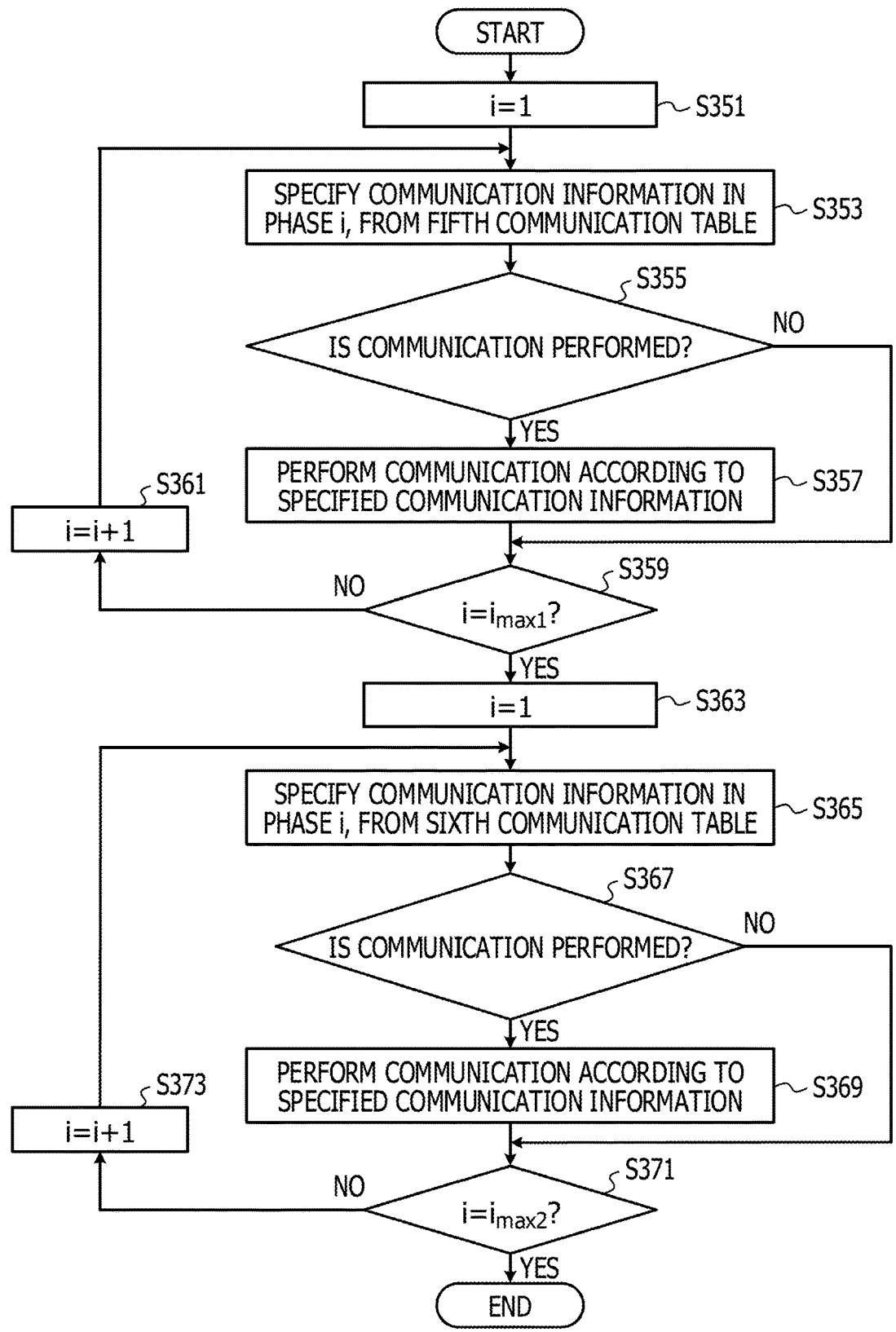
FIG. 61 is a diagram illustrating a processing flow for processing that is performed by the server according to the third embodiment.

FIG. 61 is a diagram illustrating a processing flow for the processing that is performed by the server according to the third embodiment.

The fifth communication unit 1019 in the server sets the variable i, which represents the phase number, to 1 (Step S351 in FIG. 61).

The fifth communication unit 1019 specifies the communication information in the phase i, from the fifth communication table that is stored in the communication table storage unit 103 (Step S353).

The fifth communication unit 1019 determines whether or not the server (that is, the server that performs the present processing) to which the fifth communication unit 1019 belongs performs the communication in the phase i (Step S355). Whether or not the server to which the fifth communication unit 1019 belongs performs the communication in the phase i is determined depending on whether or not the specified communication information is included in the identification information on the server to which the fifth communication unit 1019.

In a case where the server to which the fifth communication unit 1019 belongs does not perform the communication in the phase i (No loop in Step S355), the processing proceeds to Step S359. On the other hand, in a case where the server to which the fifth communication unit 1019 belongs performs the communication in the phase i (Yes loop in Step S355), the fifth communication unit 1019 performs the communication according to the communication information that is specified in Step S353 (Step S357).

As described above, the communication that is performed according to the fifth communication table is all-reducing communication between servers that are connected to the same leaf switch, and a server that receives a value from another server performs the arithmetic operation relating to the all reducing.

The fifth communication unit 1019 determines whether or not $i=i_{max5}$ is established (Step S359). $i_{max5}$ is a maximum value of the phase number of the communication that is performed according to the fifth communication table. In a case where $i=i_{max5}$ is not established (No loop in Step S359), the fifth communication unit 1019 increments i by 1 (Step S361). Then, the processing proceeds to Step S353. It is noted that the ending of the phase is checked by the barrier synchronization.

On the other hand, in a case where $i=i_{max5}$ is established (Yes loop in Step S359), the sixth communication unit 1021 sets the variable i, which represents the phase number, to 1 (Step S363).

The sixth communication unit 1021 specifies the communication information in the phase i, from the sixth communication table that is stored in the communication table storage unit 103 (Step S365).

The sixth communication unit 1021 determines whether or not the server (that is, the server that performs the present processing) to which the sixth communication unit 1021 belongs performs the communication in the phase i (Step S367). Whether or not the server to which the sixth communication unit 1021 belongs performs the communication in the phase i is determined depending on whether or not the specified communication information is included in the identification information on the server to which the sixth communication unit 1021.

In a case where the server to which the sixth communication unit 1021 belongs does not perform the communication in the phase i (No loop in Step S367), the processing proceeds to Step S371. On the other hand, in a case where the server to which the sixth communication unit 1021 belongs performs the communication in the phase i (Yes loop in Step S367), the sixth communication unit 1021 performs the communication according to the communication information that is specified in Step S365 (Step S369).

As described above, the communication that is performed according to the sixth communication table is all-reducing communication that is performed between servers which belong to the same group, and a server that receives a value from another server performs the arithmetic operation relating to the all reducing.

The sixth communication unit 1021 determines whether or not $i=i_{max6}$ is established (Step S371). $i_{max6}$ is a maximum value of the phase number of the communication that is performed according to the sixth communication table. In a case where $i=i_{max6}$ is not established (No loop in Step S371), the sixth communication unit 1021 increments i by 1 (Step S373). Then, the processing proceeds to Step S365. It is noted that the ending of the phase is checked by the barrier synchronization.

On the other hand, in a case where $i=i_{max6}$ is established (Yes loop in Step S371), the processing is ended.

If the processing is performed as described above, the all reducing can be realized by the server that is connected to the operating switch (that is, the leaf switch that is equivalent to a point which is included in the lattice-shaped portion in the limited projective plane). More specifically, a plurality of all reducing processing is concurrently performed, and thus a phase for the distribution of the result that is performed with the fourth communication table can be omitted. Consequently, the time that it takes to complete the all reducing can be shortened.

Furthermore, as described above, because the channel contention does not occur in each phase of the communication, it is possible that the all reducing is realized while the communication time is kept from being lengthened.

Furthermore, with the method according to the present embodiment, it is possible that the all reducing is performed with an amount of calculation that is approximately O (log(N)) (N is the number of servers that participate in the all reducing).

It is noted that if (1) a condition that a different slope is allocated to each server in each phase group and (2) a condition that a slope that varies between the phase group 0 and the phase group 1 is allocated to each server are satisfied, a slope table other than the slope tables that are illustrated in FIGS. 56 and 57 may be used.

No limitation to the embodiments described above is imposed. For example, in some cases, functional block configurations of the management apparatus 3 and the server are not consistent with actual program module configurations thereof.

Furthermore, the configuration of each of the tables described above is an example and thus does not necessarily have to be employed. Moreover, it is also possible that, if the result of the processing does not change, the order of processing is changed in the processing flow. Moreover, the concurrent performing may be allowable.

Furthermore, the addition is performed as the arithmetic operation for the all reducing and the reducing in the examples described above, but an arithmetic operation (for example, multiplication) other than the addition may be performed.

Appendix

In the present appendix, the Latin square Fat-Tree and the limited projective plane will be described.

Figure 62:
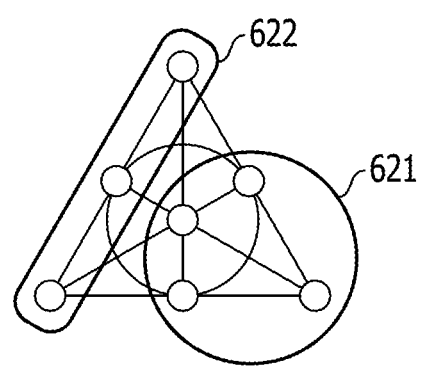
FIG. 62 is a diagram for describing a Latin square Fat-Tree and the limited projective plane.

The limited projective plane is equivalent to a plane that results from adding several infinite points to a normal plane and removing "two straight lines in parallel." FIG. 62 illustrates a structure of the limited projective plane in a case where the order (hereinafter assumed as n) is 2 and the number of ports is 6 (=2(n+1)). In FIG. 62, three (=n+1) leaf switches that are surrounded by a frame 622 are equivalent to infinite points.

In the limited projective plane, one point P is set, n points P(c) (c=0, 1, and so forth up to n−1) are set, and n2 points P(c, r) (c, r=0, 1, and so forth up to n−1) are set. Furthermore, one straight line L={P, P(0), and so forth up to P(n−1)} is set, n straight lines L={P, P(c, 0) and so forth up to P(c, n−1)}(c=0, 1, and so forth up to n−1) are set, and n2 straight lines L(c, r)={P(c) and P(i, (r+ci) mod n)}(i, c, r=0, 1, and so forth up to n−1) are set.

As an attribute of the limited projective plane, $(n^2+n+1)$ points are present and the number of straight lines is $(n^2+n+1)$. Any two straight lines intersect at one point, and one straight line that connects between any two points is present. However, there is a constraint that n be a prime number.

Figure 63A:
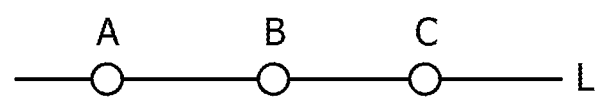
FIGS. 63A and 63B are diagrams for describing the Latin square Fat-Tree and the limited projective plane.
Figure 63B:
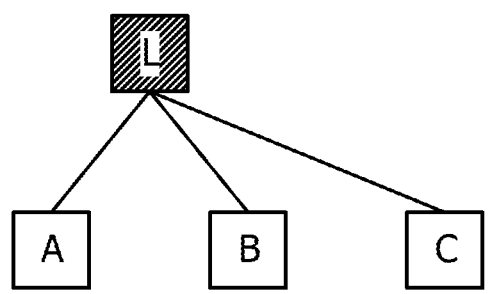

A structure of the limited projective plane is replaced with a topology structure. For example, the structure of the limited projective plane that is illustrated in FIG. 63A is replaced with the topology structure that is illustrated in FIG. 63B. In FIG. 63A, a straight line indicates the spine switch, and a point indicates the leaf switch. In FIG. 63B, a rectangle that is hatched indicates the spine switch, and a rectangle that is not hatched indicates the leaf switch.

Figure 64A:
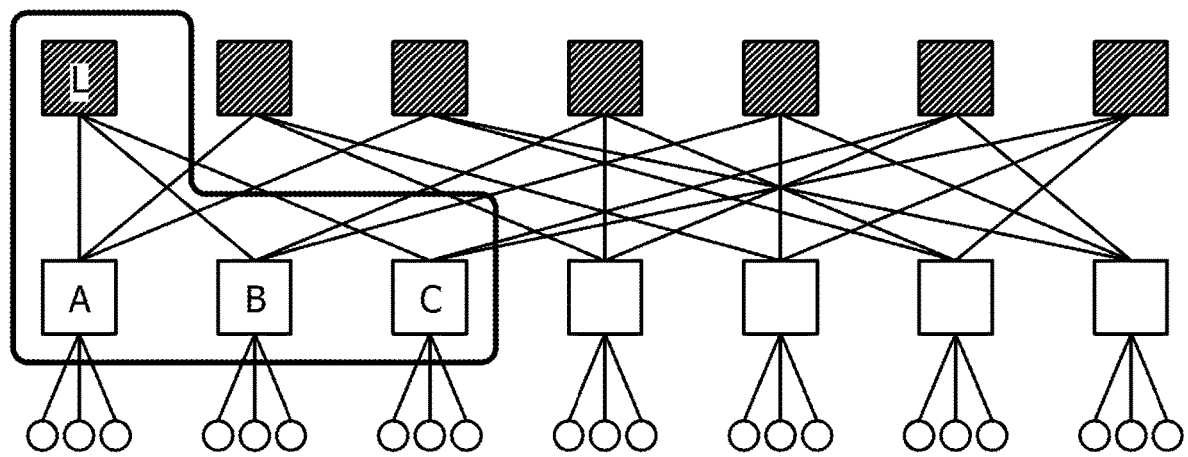
FIGS. 64A and 64B are diagrams for describing the Latin square Fat-Tree and the limited projective plane.
Figure 64B:
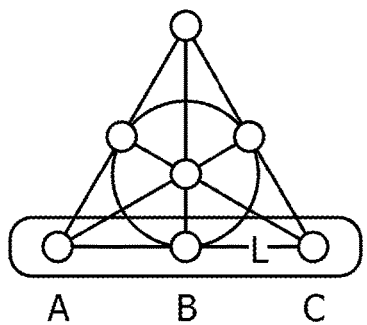

A topology structure that is illustrated in FIG. 64A is a topology structure of the Latin square Fat-Tree in which the number of spine switches is 7 and the number of leaf switches is 7, and corresponds to a structure of the limited projective plane that is illustrated in FIG. 64B. A topology structure of a portion that is surrounded by a bold line in FIG. 64A is the same as the topology structure in FIG. 63B. Furthermore, a structure of a portion that is surrounded by a bold line in FIG. 64B corresponds to a topology structure of a portion that is surrounded by a bold line in FIG. 64A.

Figure 65:
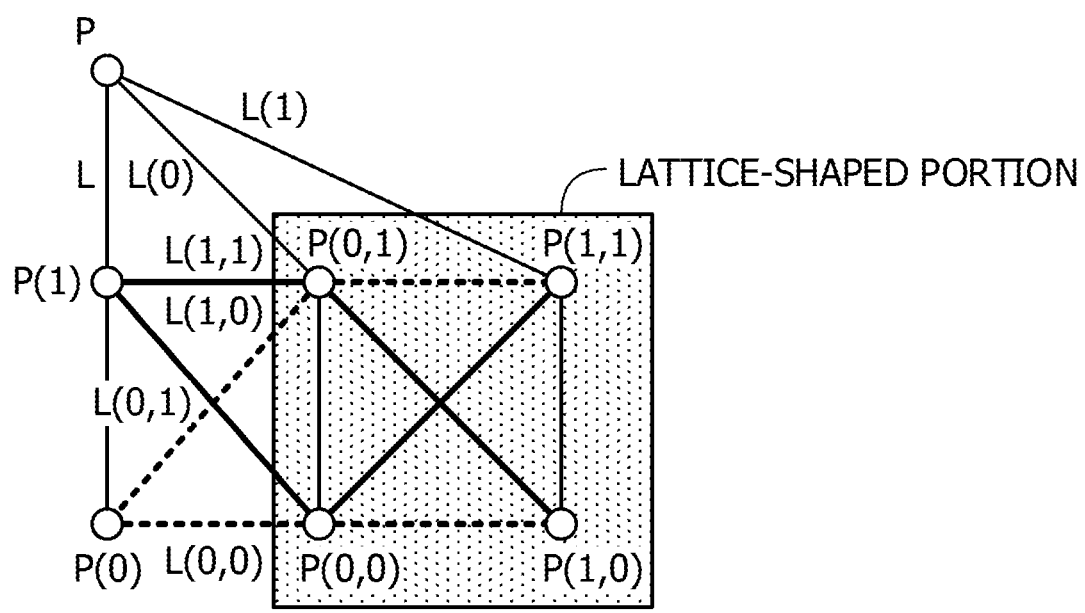
FIG. 65 is a diagram for describing the Latin square Fat-Tree and the limited projective plane.

A structure that is illustrated in FIG. 62 can be replaced with a structure that is illustrated in FIG. 65. In FIG. 65, four (=n*n) leaf switches that are included in a lattice-shaped portion that is hatched in FIG. 65 correspond to four leaf switches that are included in a portion which is surrounded by a frame 621 in FIG. 62. In-parallel straight lines in a group in the lattice-shaped portion are transformed in such a manner as to intersect at an additional point. That is, the straight lines that have the same slope are transformed in such a manner as to intersect.

The appendix ends with this.

It is noted that the management apparatus 3 and the server, which are described above, are computer apparatuses, and that, as illustrated in FIG. 66, the memory 2501, the CPU 2503, the HDD 2505, a display control unit 2507 that is connected to a display device 2509, a drive device 2513 for removable disk 2511, an input device 2515, and a communication control unit 2517 for connecting to a network are connected to each other with a bus 2519. An operating system (OS) and an application program for performing the processing according to the present embodiment are stored in the HDD 2505, and, when run by the CPU 2503, are read from the HDD 2505 to be loaded onto the memory 2501. The CPU 2503 controls the display control unit 2507, the communication control unit 2517, and the drive device 2513 according to a detail of processing by the application program, in such a manner that a prescribed operation is performed. Furthermore, data of which processing is in progress is stored in the memory 2501 in most cases, but may be stored in the HDD 2505. In the embodiments, the application program for performing the processing described above is recorded on a computer-readable removable disk 2511 for distribution, and is installed from the drive device 2513 on the HDD 2505. In some cases, the application program is installed on the HDD 2505 via a network such as the Internet and the communication control unit 2517. The computer apparatus with this configuration operates organically in cooperation with hardware pieces, such as the CPU 2503 and the memory 2501, which are described above, and with programs such as the OS and the application program, and thus realizes various functions as described above.

Figure 67:
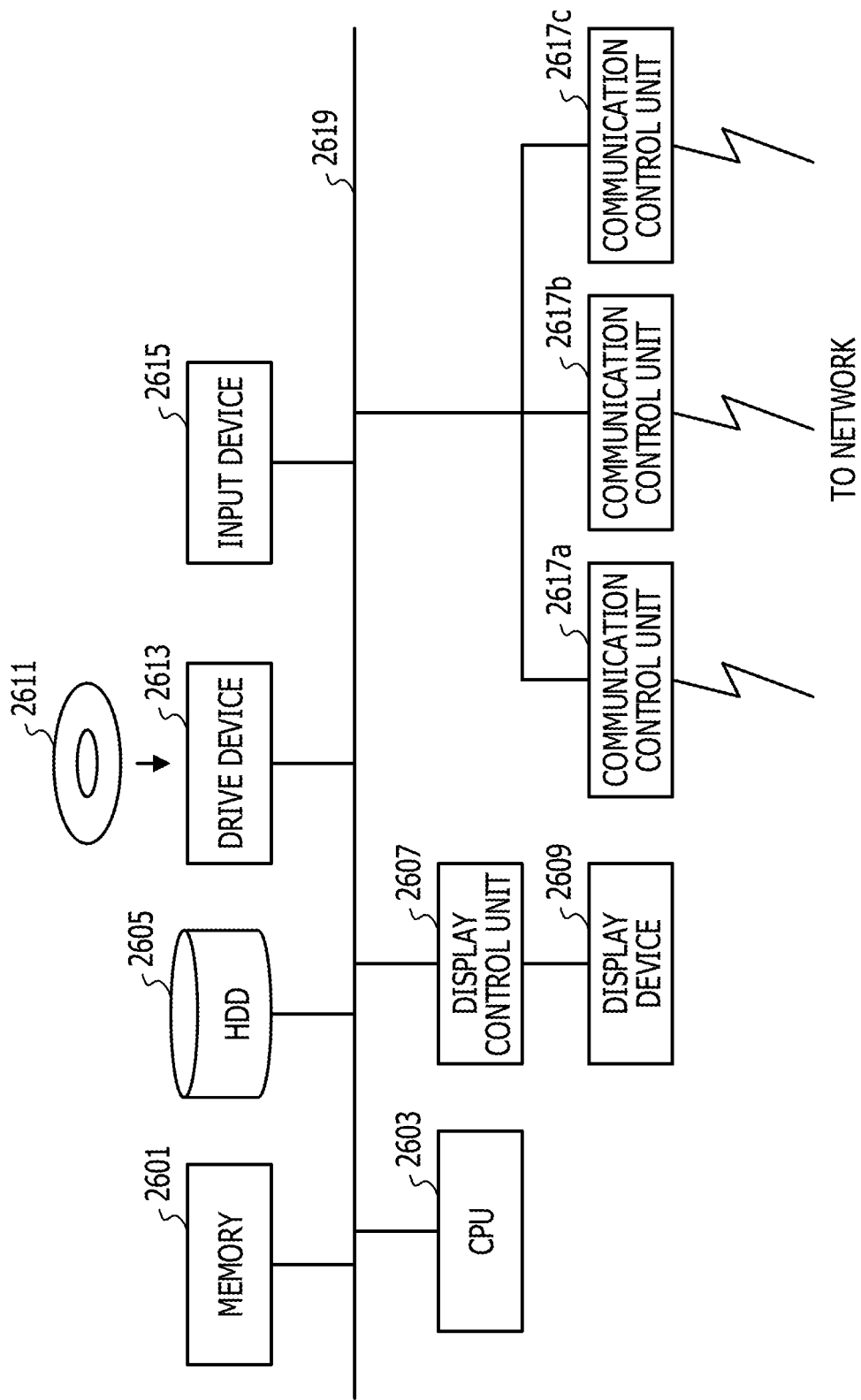
FIG. 67 is a functional block diagram of a switch.

Furthermore, in some cases, as illustrated in FIG. 67, the leaf switch and the spine switch, which are described above, have a configuration in which a memory 2601, a CPU 2603, a HDD 2605, a display control unit 2607 that is connected to a display device 2609, a drive device 2613 for a removable disk 2611, an input device 2615, and a communication control unit 2617 (2617a to 2617c in FIG. 67) for connecting to a network are connected to each other with a bus 2619. It is noted that, in some cases, depending on the situation, the display control unit 2607, the display device 2609, the drive device 2613, and the input device 2615 are not included. The operating system and the application program for performing the processing according to the present embodiment are stored in the HDD 2605, and, when run by the CPU 2603, are read from the HDD 2605 to be loaded onto the memory

2601. As requested, the CPU 2603 controls the display control unit 2607, the communication control unit 2617, and the drive device 2613 in such a manner that a desired operation is performed. It is noted that data which is input via any of the control units 2617 is output via the other communication control units 2617. The CPU 2603 controls the communication control unit 2617 in such a manner as to switch suitably between suitable destinations. Furthermore, data of which processing is in progress is stored in the memory 2601 and, as requested, is stored in the HDD 2605. In the embodiments of the present technology, the application program for performing the processing described above is recorded on a computer-readable removable disk 2611 for distribution, and is installed from the drive device 2613 on the HDD 2605. In some cases, the application program is installed on the HDD 2605 via a network such as the Internet and the communication control unit 2617. The computer apparatus with this configuration operates organically in cooperation with hardware pieces, such as the CPU 2603 and the memory 2601, which are described above, the OS, and a desired application program, and thus realizes various functions as described above.

The embodiments described above are summarized as follows.

An information processing system according to a first embodiment has (A) a plurality of spine switches (a spine switch according to the embodiment is an example of the spine switch described above), (B) a plurality of leaf switches (a leaf switch according to the embodiment is an example of the leaf switch described above), and (C) a plurality of information processing apparatuses (a server according to the embodiment is an example of the information processing apparatus described above), each of which is connected to any of the plurality of leaf switches. Then, a type of connection between each of the plurality of spine switches and each of the plurality of leaf switches is a Latin square Fat-Tree. Then, each of the information processing apparatuses that are connected to a first leaf switch which is equivalent to a point other than infinite points in a limited projective plane that corresponds to the Latin square Fat-Tree performs first all reducing or first reducing between the information processing apparatus and the other information processing apparatuses that are connected to the same first leaf switch as the information processing apparatus. For a result of the first all reducing and a result of the first reducing, each of the first information processing apparatus that has the result of the first all reducing or the result of the first reducing performs second all reducing between the first information processing apparatus and the other first information processing apparatuses that are connected to a leaf switch, which are connected to a first spine switch, using the first spine switch that corresponds to a first direction in an area which includes a point other than the infinite points in the limited projective plane. For the result of the second all reducing, each of the first information processing apparatus performs third all reducing between the first information processing apparatus and the other first information processing apparatuses that are connected to a leaf switch, which are connected to a second spine switch, using the second spine switch that corresponds to a second direction which is different from the first direction. Each of the first information processing apparatuses transmits a result of the third all reducing to the other information processing apparatuses that are connected to the same first leaf switch as the first information processing apparatus.

In a Latin square Fat-Tree system, the all reducing can be performed.

Furthermore, each of the information processing apparatuses that are connected to the first leaf switch may transmit data to an information processing apparatus that does not receive other data from an information processing apparatus other than the information processing apparatus, in a phase in which the information processing apparatus transmits the data, among phases for a communication for the first reducing.

Channel contention can be suppressed from occurring in the first reducing.

Furthermore, each of the first information processing apparatuses may transmit data to an information processing apparatus that does not receive other data from an information processing apparatus other than the first information processing apparatus, in a phase in which the first information processing apparatus transmits the data, among phases for communications for the first to third all-reducing.

The channel contention can be suppressed from occurring in the first to third all reducing.

Furthermore, each of the first information processing apparatuses may transmit the result of the third all reducing to an information processing apparatus that does not receive data from an information processing apparatus other than the first information processing apparatus, in a phase in which the result of the third all reducing is transmitted.

The channel contention can be suppressed from occurring during the transmission of the result of the third all reducing.

Furthermore, in a case where the first all reducing is performed, while the second all reducing is performed, for the result of the first all reducing, each of the second information processing apparatuses other than the first information processing apparatus, among the information processing apparatuses that are connected to the first leaf switch may perform fourth all reducing between the second information apparatus and the other second information processing apparatuses that are connected to a leaf switch, which are connected to a third spine switch, using the third spine switch that corresponds to a third direction that is different from the first direction. Furthermore, while the third all reducing is performed, for a result of the fourth all reducing, each of the second information processing apparatuses may perform fifth all reducing between the second information processing apparatus and the other second information processing apparatuses that are connected to a leaf switch, which are connected to a fourth spine switch, using the fourth spine switch that corresponds to a fourth direction which is different from the third direction and the second direction.

Other all reducing can be performed using a channel that is not used. Then, because processing that transmits the result of the third all reducing can be omitted, the time that it takes to complete the communication can be shortened.

An information processing method according to a second embodiment is performed in an information processing system that has a plurality of spine switches, a plurality of leaf switches, and a plurality of information processing apparatuses, each of which is connected to any of the plurality of leaf switches. Then, a type of connection between each of the plurality of spine switches and each of the plurality of leaf switches is a Latin square Fat-Tree. Then, processing is included in which each of the information processing apparatuses that are connected to a first leaf switch which is equivalent to a point other than infinite points in a limited projective plane that corresponds to the Latin square Fat-Tree performs first all reducing or first reducing between the information processing apparatus and other information processing apparatus that are connected to the same first leaf switch as the information processing apparatus, in which, for a result of the first all reducing and a result of the first reducing, each of the first information processing apparatus that has the result of the first all reducing or the result of the first reducing performs second all reducing between the first information processing apparatus and the other first information processing apparatuses that are connected to a leaf switch, which are connected to a spine switch, using the first spine switch that corresponds to a first direction in an area which includes a point other than the infinite points in the limited projective plane, in which, for the result of the second all reducing, each of the first information processing apparatus performs third all reducing between the first information processing apparatus and the other first information processing apparatuses that are connected to a leaf switch, which are connected to a second spine switch, using the second spine switch that corresponds to a second direction which is different from the first direction, and in which each of the first information processing apparatuses transmits a result of the third all reducing to the other information processing apparatuses that are connected to the same first leaf switch as the first information processing apparatus.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A communication system comprising:
   a plurality of spine switches;
   a plurality of leaf switches that are connected to the plurality of spine switches in topology of a Latin square Fat-Tree; and
   a plurality of information processing apparatus, each of which is connected to any of the plurality of leaf switches,
   wherein each of the information processing apparatuses that are connected to a first leaf switch which is equivalent to a point other than an infinite point in a limited projective plane corresponding to the Latin square Fat-Tree performs first all reducing or first reducing between the information processing apparatus and another information processing apparatus that is connected to the same first leaf switch,
   wherein each of first information processing apparatuses that have a result of the first all reducing or a result of the first reducing performs second all reducing, on the basis of the result of the first all reducing or the result of the first reducing, between each of the first information processing apparatus and another first information processing apparatus that is connected to a leaf switch connected to a first spine switch that corresponds to a first direction in an area which includes a point other than the infinite point in the limited projective plane,
   wherein each of the first information processing apparatuses performs third all reducing, on the basis of the result of the second all reducing, between each of the first information processing apparatus and another first information processing apparatus that is connected to a leaf switch connected to a second spine switch that corresponds to a second direction in the area, the second direction being different from the first direction, and
   wherein each of the first information processing apparatuses transmits a result of the third all reducing to the other information processing apparatus that is connected to the same first leaf switch.

2. The communication system according to claim 1, wherein one of the information processing apparatuses that are connected to the first leaf switch transmits data to a second information processing apparatus that does not receive other data from another information processing apparatus other than the one of the information processing apparatus in a phase in which the one of the information processing apparatus transmits the data among phases for a communication for the first reducing.

3. The communication system according to claim 1, wherein one of the first information processing apparatuses transmits data to a second information processing apparatus that does not receive other data from another information processing apparatus other than the one of the first information processing apparatus in a phase in which the one of first information processing apparatuses transmits the data among phases for communications for one of the first all-reducing, the second all-reducing, and the third all-reducing.

4. The communication system according to claim 1, wherein one of the first information processing apparatuses transmits the result of the third all reducing to the other information processing apparatus that does not receive data from an information processing apparatus other than the one of the first information processing apparatuses in a phase in which the result of the third all reducing is transmitted from the first information processing apparatuses.

5. The communication system according to claim 1, wherein, in a case where the first all reducing is performed, while the second all reducing is performed, each of second information processing apparatuses other than the first information processing apparatuses among the information processing apparatuses that are connected to the first leaf switch performs fourth all reducing, on the basis of the result of the first all reducing, between each of the second information processing apparatus and another second information processing apparatus, that is connected to a leaf switch which are connected to a third spine switch that corresponds to a third direction in the area, the third direction being different from the first direction, and
   wherein, while the third all reducing is performed, each of the second information processing apparatuses performs fifth all reducing, on the basis of a result of the fourth all reducing, between each of the second information processing apparatus and another second information processing apparatus that is connected to a leaf switch connected to a fourth spine switch that corresponds to a fourth direction in the area, the fourth direction being different from the third direction and the second direction.

6. A communication method by executed by a system that includes a plurality of spine switches, a plurality of leaf switches that are connected to the plurality of spine switches in topology of a Latin square Fat-Tree, and a plurality of information processing apparatus, each of which is connected to any of the plurality of leaf switches, the method comprising:

by each of the information processing apparatuses that are connected to a first leaf switch which is equivalent to a point other than an infinite point in a limited projective plane corresponding to the Latin square Fat-Tree, performing first all reducing or first reducing between the information processing apparatus and another information processing apparatus that is connected to the same first leaf switch, by each of first information processing apparatuses that have a result of the first all reducing or a result of the first reducing, performing second all reducing, on the basis of the result of the first all reducing or the result of the first reducing, between each of the first information processing apparatus and another first information processing apparatus that is connected to a leaf switch connected to a first spine switch that corresponds to a first direction in an area which includes a point other than the infinite point in the limited projective plane, by each of the first information processing apparatuses, performing third all reducing, on the basis of the result of the second all reducing, between each of the first information processing apparatus and another first information processing apparatus that is connected to a leaf switch connected to a second spine switch that corresponds to a second direction in the area, the second direction being different from the first direction, and by each of the first information processing apparatuses, transmitting a result of the third all reducing to the other information processing apparatus that is connected to the same first leaf switch.

7. The communication method according to claim 6, wherein one of the information processing apparatuses that are connected to the first leaf switch transmits data to a second information processing apparatus that does not receive other data from another information processing apparatus other than the one of the information processing apparatus in a phase in which the one of the information processing apparatus transmits the data among phases for a communication for the first reducing.

8. The communication method according to claim 6, wherein one of the first information processing apparatuses transmits data to a second information processing apparatus that does not receive other data from another information processing apparatus other than the one of the first information processing apparatus in a phase in which the one of first information processing apparatuses transmits the data among phases for communications for one of the first all-reducing, the second all-reducing, and the third all-reducing.

9. The communication method according to claim 6, wherein one of the first information processing apparatuses transmits the result of the third all reducing to the other information processing apparatus that does not receive data from an information processing apparatus other than the one of the first information processing apparatuses in a phase in which the result of the third all reducing is transmitted from the first information processing apparatuses.

10. The communication method according to claim 6, wherein, in a case where the first all reducing is performed, while the second all reducing is performed, each of second information processing apparatuses other than the first information processing apparatuses among the information processing apparatuses that are connected to the first leaf switch performs fourth all reducing, on the basis of the result of the first all reducing, between each of the second information processing apparatus and another second information processing apparatus, that is connected to a leaf switch which are connected to a third spine switch that corresponds to a third direction in the area, the third direction being different from the first direction, and wherein, while the third all reducing is performed, each of the second information processing apparatuses performs fifth all reducing, on the basis of a result of the fourth all reducing, between each of the second information processing apparatus and another second information processing apparatus that is connected to a leaf switch connected to a fourth spine switch that corresponds to a fourth direction in the area, the fourth direction being different from the third direction and the second direction.

11. A non-transitory computer-readable medium storing a communication program that causes a system that includes a plurality of spine switches, a plurality of leaf switches that are connected to the plurality of spine switches in topology of a Latin square Fat-Tree, and a plurality of information processing apparatus, each of which is connected to any of the plurality of leaf switches to execute a process comprising:

by each of the information processing apparatuses that are connected to a first leaf switch which is equivalent to a point other than an infinite point in a limited projective plane corresponding to the Latin square Fat-Tree, performing first all reducing or first reducing between the information processing apparatus and another information processing apparatus that is connected to the same first leaf switch, by each of first information processing apparatuses that have a result of the first all reducing or a result of the first reducing, performing second all reducing, on the basis of the result of the first all reducing or the result of the first reducing, between each of the first information processing apparatus and another first information processing apparatus that is connected to a leaf switch connected to a first spine switch that corresponds to a first direction in an area which includes a point other than the infinite point in the limited projective plane, by each of the first information processing apparatuses, performing third all reducing, on the basis of the result of the second all reducing, between each of the first information processing apparatus and another first information processing apparatus that is connected to a leaf switch connected to a second spine switch that corresponds to a second direction in the area, the second direction being different from the first direction, and by each of the first information processing apparatuses, transmitting a result of the third all reducing to the other information processing apparatus that is connected to the same first leaf switch.

12. The medium according to claim 11, wherein one of the information processing apparatuses that are connected to the first leaf switch transmits data to a second information processing apparatus that does not receive other data from another information processing apparatus other than the one of the information processing apparatus in a phase in which the one of the information processing apparatus transmits the data among phases for a communication for the first reducing.

13. The medium according to claim 11, wherein one of the first information processing apparatuses transmits data to a second information processing apparatus that does not receive other data from another information processing apparatus other than the one of the first information processing apparatus in a phase in which the one of first information processing apparatuses transmits the data among phases for communications for one of the first all-reducing, the second all-reducing, and the third all-reducing.

14. The medium according to claim 11, wherein one of the first information processing apparatuses transmits the result of the third all reducing to the other information processing apparatus that does not receive data from an information processing apparatus other than the one of the first information processing apparatuses in a phase in which the result of the third all reducing is transmitted from the first information processing apparatuses.

15. The medium according to claim 11, wherein, in a case where the first all reducing is performed, while the second all reducing is performed, each of second information processing apparatuses other than the first information processing apparatuses among the information processing apparatuses that are connected to the first leaf switch performs fourth all reducing, on the basis of the result of the first all reducing, between each of the second information processing apparatus and another second information processing apparatus, that is connected to a leaf switch which are connected to a third spine switch that corresponds to a third direction in the area, the third direction being different from the first direction, and wherein, while the third all reducing is performed, each of the second information processing apparatuses performs fifth all reducing, on the basis of a result of the fourth all reducing, between each of the second information processing apparatus and another second information processing apparatus that is connected to a leaf switch connected to a fourth spine switch that corresponds to a fourth direction in the area, the fourth direction being different from the third direction and the second direction.

\* \* \* \* \*